US005594830A

United States Patent [19]
Winston et al.

[11] Patent Number: 5,594,830
[45] Date of Patent: Jan. 14, 1997

[54] LUMINAIRE DEVICE

[75] Inventors: Roland Winston, Chicago; Robert L. Holman, Naperville; Benjamin A. Jacobson, Chicago; Robert M. Emmons, Rolling Meadows, all of Ill.

[73] Assignee: Minnesota Mining and Manufacturing Co., St. Paul, Minn.

[21] Appl. No.: 486,784

[22] Filed: Jun. 7, 1995

Related U.S. Application Data

[63] Continuation of Ser. No. 226,016, Apr. 11, 1994, Pat. No. 5,528,720, which is a continuation-in-part of Ser. No. 29,883, Mar. 11, 1993, Pat. No. 5,303,322, which is a continuation-in-part of Ser. No. 855,838, Mar. 23, 1992, Pat. No. 5,237,641.

[51] Int. Cl.⁶ ........................................ G02B 6/26
[52] U.S. Cl. ................... 385/146; 385/43; 385/901; 385/129; 385/131
[58] Field of Search ........................... 385/146, 147, 385/140, 129, 130, 131, 43, 901; 359/48, 50, 599, 833, 834; 362/19, 31, 32

[56] References Cited

U.S. PATENT DOCUMENTS

| | | | |
|---|---|---|---|
| 1,535,985 | 4/1925 | Clark | 359/49 |
| 2,347,665 | 5/1944 | Christensen et al. | 362/31 |
| 2,712,593 | 7/1955 | Merchant | 362/27 |
| 2,855,523 | 10/1958 | Berger | 250/216 |
| 3,308,709 | 3/1967 | Harrick | 385/146 |
| 3,386,787 | 6/1968 | Kaplan | 385/129 |
| 3,535,016 | 10/1970 | Malifaud | 385/146 |
| 3,617,109 | 11/1971 | Tien | 385/43 |
| 3,729,626 | 4/1973 | Thurlow et al. | 362/31 |
| 3,740,119 | 6/1973 | Sakurai et al. | 359/628 |
| 3,752,974 | 8/1973 | Baker et al. | 240/1 |
| 3,799,647 | 3/1974 | Luft | 359/247 |

(List continued on next page.)

FOREIGN PATENT DOCUMENTS

| | | |
|---|---|---|
| 81107927 | 10/1992 | China . |
| 167721A1 | 11/1985 | European Pat. Off. . |
| 0632229A1 | 1/1995 | European Pat. Off. . |
| 1363539 | 10/1964 | France . |
| 56843 | 8/1982 | Germany . |
| 52-21261 | 2/1977 | Japan . |
| 57-207204 | 12/1979 | Japan . |
| 3,832,028 | 8/1974 | Kapron ............................... 384/43 |
| 3,840,695 | 10/1974 | Fischer ............................. 348/761 |

(List continued on next page.)

OTHER PUBLICATIONS

"Flat Panel Backlight Reflecting Device," R. L. Garwin and R. T. Hodgson, *IBM Technical Disclosure Bulletin*, vol. 31, No. 2, Jul. 1988, pp. 190–191.

"Dielectric Totally Internally Reflecting Concentrators" Xiaohui, Ning, Roland Winston and Joseph O'Gallagher, *Applied Optics*, vol. 26, Jan. 15, 1987, pp. 300–305.

(List continued on next page.)

*Primary Examiner*—Rodney B. Bovernick
*Assistant Examiner*—Phan T. H. Palmer
*Attorney, Agent, or Firm*—Reinhart, Boerner, Van Deuren, Norris & Rieselbach, s.c.

[57] ABSTRACT

An optical device for collecting light and selectively outputting or concentrating the light. A wedge layer has an optical index of refraction $n_1$, and top, bottom and side surfaces intersecting to define an angle of inclination $\phi$. A back surface spans the top, bottom and side surface. A first layer is coupled to the bottom surface of the layer and has an index of refraction $n_2$. The first layer index $n_2$ causes light input through the back surface of the layer to be preferentially output into the first layer. A second layer is coupled to the bottom of the first layer and selectively causes output of light into ambient. Additional layers, such as a light polarization layer, a polarization converting layer and a post LCD diffuser layer can be used to make preferential use of polarized light or diffuse light having passed through the LCD layer to enhance viewing of the output light.

82 Claims, 40 Drawing Sheets

U.S. PATENT DOCUMENTS

| | | | |
|---|---|---|---|
| 3,864,019 | 2/1975 | Smolinsky et al. | 385/49 |
| 3,871,747 | 3/1975 | Andrews | 385/147 |
| 3,980,392 | 9/1976 | Auracher | 384/43 |
| 4,043,636 | 8/1977 | Eberhardt et al. | 359/42 |
| 4,052,120 | 10/1977 | Sick et al. | 385/33 |
| 4,059,916 | 11/1977 | Tachihara et al. | 40/130 |
| 4,111,538 | 9/1978 | Sheridon | 350/96.1 |
| 4,114,592 | 9/1978 | Winston et al. | 126/270 |
| 4,126,383 | 11/1978 | Doriguzzi et al. | 359/48 |
| 4,161,015 | 7/1979 | Dey et al. | 362/263 |
| 4,171,874 | 10/1979 | Bigelow et al. | 359/49 |
| 4,176,908 | 12/1979 | Wagner | 385/47 |
| 4,190,315 | 2/1980 | Brettle et al. | 385/129 |
| 4,212,048 | 7/1980 | Castleberry | 362/19 |
| 4,240,692 | 12/1980 | Winston | 350/96.1 |
| 4,257,084 | 3/1981 | Reynolds | 362/31 |
| 4,277,817 | 7/1981 | Hehr | 362/31 |
| 4,323,951 | 4/1982 | Pasco | 362/27 |
| 4,373,282 | 2/1983 | Wragg | 40/546 |
| 4,420,796 | 12/1983 | Mori | 362/32 |
| 4,453,200 | 6/1984 | Trcka et al. | 362/32 |
| 4,528,617 | 7/1985 | Blackington | 362/32 |
| 4,547,043 | 10/1985 | Penz | 362/32 |
| 4,573,766 | 3/1986 | Bournay, Jr. et al. | 350/345 |
| 4,618,216 | 10/1986 | Suzawa | 359/49 |
| 4,627,690 | 12/1986 | Fantone | 359/669 |
| 4,648,690 | 3/1987 | Ohe | 350/321 |
| 4,649,462 | 3/1987 | Dobrowolski et al. | 362/32 |
| 4,660,936 | 4/1987 | Nosker | 359/40 |
| 4,683,359 | 7/1987 | Wojtanek | 200/314 |
| 4,691,982 | 9/1987 | Nishimura et al. | 385/37 |
| 4,706,173 | 11/1987 | Hamada et al. | 362/341 |
| 4,714,983 | 12/1987 | Lang | 362/27 |
| 4,721,366 | 1/1988 | Nosker | 359/48 |
| 4,726,662 | 2/1988 | Cromack | 359/40 |
| 4,729,068 | 3/1988 | Ohe | 362/31 |
| 4,735,495 | 4/1988 | Henkes | 362/310 |
| 4,737,896 | 4/1988 | Mochizuki et al. | 362/301 |
| 4,747,223 | 5/1988 | Borda | 40/219 |
| 4,756,604 | 7/1988 | Nakatsuka et al. | 359/41 |
| 4,765,718 | 8/1988 | Henkes | 359/49 |
| 4,798,448 | 1/1989 | van Raalte | 400/124 |
| 4,799,050 | 1/1989 | Prince et al. | 340/765 |
| 4,799,137 | 1/1989 | Aho | 362/309 |
| 4,813,765 | 3/1989 | Negishi | 385/146 |
| 4,832,458 | 5/1989 | Fergason et al. | 350/338 |
| 4,838,661 | 6/1989 | McKee et al. | 350/345 |
| 4,842,378 | 6/1989 | Flasck et al. | 350/345 |
| 4,850,665 | 7/1989 | Whitehead | 359/133 |
| 4,907,044 | 3/1990 | Schellhorn et al. | 357/17 |
| 4,907,132 | 3/1990 | Parker | 362/32 |
| 4,914,533 | 4/1990 | Hamada et al. | 362/321 |
| 4,915,479 | 4/1990 | Clarke | 358/345 |
| 4,917,465 | 4/1990 | Conner et al. | 359/41 |
| 4,930,867 | 6/1990 | Negishi | 385/834 |
| 4,936,659 | 6/1990 | Anderson et al. | 359/49 |
| 4,950,059 | 8/1990 | Roberts | 362/32 |
| 4,958,911 | 9/1990 | Beiswenger et al. | 359/48 |
| 4,958,915 | 9/1990 | Okada et al. | 350/345 |
| 4,965,876 | 10/1990 | Foldi et al. | 362/247 |
| 4,974,122 | 11/1990 | Shaw | 362/31 |
| 4,974,353 | 12/1990 | Norfolk | 40/447 |
| 4,975,808 | 12/1990 | Bond et al. | 362/31 |
| 4,976,536 | 12/1990 | Vogeley et al. | 353/77 |
| 4,978,183 | 12/1990 | Vick | 359/15 |
| 4,984,872 | 1/1991 | Vick | 359/50 |
| 4,985,809 | 1/1991 | Matsui et al. | 362/31 |
| 4,989,933 | 2/1991 | Duguay | 350/96.1 |
| 4,991,918 | 2/1991 | Owen et al. | 385/146 |
| 4,992,916 | 2/1991 | Henkes | 362/255 |
| 4,998,188 | 3/1991 | Degelmann | 362/147 |
| 5,019,808 | 5/1991 | Prince et al. | 340/765 |
| 5,029,045 | 7/1991 | Sanai et al. | 362/26 |
| 5,037,172 | 8/1991 | Hekman et al. | 385/31 |
| 5,039,207 | 8/1991 | Green | 359/49 |
| 5,040,098 | 8/1991 | Tanaka et al. | 362/31 |
| 5,040,878 | 8/1991 | Eichenlaub | 350/345 |
| 5,044,734 | 9/1991 | Sperl et al. | 359/49 |
| 5,046,805 | 9/1991 | Simon | 385/31 |
| 5,046,829 | 9/1991 | Worp | 359/49 |
| 5,050,946 | 9/1991 | Hathaway et al. | 385/33 |
| 5,051,551 | 9/1991 | Doyle | 250/341 |
| 5,053,765 | 10/1991 | Sonehara et al. | 340/815.31 |
| 5,078,476 | 1/1992 | Shin | 359/48 |
| 5,083,120 | 1/1992 | Nelson | 340/784 |
| 5,101,325 | 3/1992 | Davenport et al. | 362/31 |
| 5,101,454 | 3/1992 | Blonder et al. | 385/14 |
| 5,117,472 | 5/1992 | Blyler, Jr. et al. | 385/28 |
| 5,123,077 | 6/1992 | Endo et al. | 385/129 |
| 5,126,882 | 6/1992 | Oe et al. | 359/619 |
| 5,128,783 | 7/1992 | Abileah et al. | 359/49 |
| 5,128,787 | 7/1992 | Blonder | 359/70 |
| 5,128,846 | 7/1992 | Mills et al. | 362/32 |
| 5,132,830 | 7/1992 | Fukutani et al. | 359/67 |
| 5,134,548 | 7/1992 | Turner | 362/29 |
| 5,146,354 | 9/1992 | Plesinger | 359/49 |
| 5,159,478 | 10/1992 | Akiyama et al. | 359/69 |
| 5,170,448 | 12/1992 | Ackley et al. | 385/31 |
| 5,202,938 | 4/1993 | Man et al. | 385/11 |
| 5,202,950 | 4/1993 | Arego et al. | 385/146 |
| 5,208,882 | 5/1993 | Strasser et al. | 385/37 |
| 5,233,679 | 8/1993 | Oyama | 385/146 |
| 5,237,641 | 8/1993 | Jacobson et al. | 385/146 |
| 5,253,089 | 10/1993 | Imai | 359/49 |
| 5,253,151 | 10/1993 | Mepham et al. | 362/126 |
| 5,255,029 | 10/1993 | Vogeley et al. | 353/122 |
| 5,262,880 | 11/1993 | Abileah | 359/40 |
| 5,268,985 | 12/1993 | Ando et al. | 385/129 |
| 5,272,601 | 12/1993 | McKillip | 362/27 |
| 5,291,184 | 3/1994 | Iino | 345/7 |
| 5,295,048 | 3/1994 | Park et al. | 362/26 |
| 5,303,322 | 4/1994 | Winston et al. | 385/146 |
| 5,309,544 | 5/1994 | Saxe | 385/146 |
| 5,333,073 | 7/1994 | Suzuki | 359/50 |
| 5,339,178 | 8/1994 | Phelps, III et al. | 359/49 |
| 5,339,179 | 8/1994 | Rudisill et al. | 359/49 |
| 5,339,382 | 8/1994 | Whitehead | 385/133 |
| 5,343,542 | 8/1994 | Kash et al. | 385/31 |
| 5,357,405 | 10/1994 | Park | 362/31 |
| 5,359,691 | 10/1994 | Tai et al. | 385/36 |
| 5,363,294 | 11/1994 | Yamamoto et al. | 362/330 |
| 5,390,276 | 2/1995 | Tai et al. | 385/146 |
| 5,394,308 | 2/1995 | Watanabe et al. | 362/31 |
| B1 4,660,936 | 1/1990 | Nosker | 350/339 D |

FOREIGN PATENT DOCUMENTS

| | | |
|---|---|---|
| 58-159517 | 8/1982 | Japan . |
| 61-241712 | 10/1986 | Japan . |
| 61-245104 | 10/1986 | Japan . |
| 63-55503 | 3/1988 | Japan . |
| 63-75704 | 4/1988 | Japan . |
| 63-168604 | 7/1988 | Japan . |
| 63-180905 | 7/1988 | Japan . |
| 63-208001 | 8/1988 | Japan . |
| 1-11203 | 1/1989 | Japan . |
| 3-111819 | 5/1991 | Japan . |
| 7-248495 | 3/1994 | Japan . |
| 6912153 | 12/1979 | Netherlands . |
| 342747 | 12/1989 | Netherlands . |
| 2124403 | 7/1984 | United Kingdom . |

| WO94/12898 | 6/1994 | WIPO . |
| WO95/06889 | 3/1995 | WIPO . |
| WO95/07435 | 3/1995 | WIPO . |

OTHER PUBLICATIONS

"Optics of Two–Stage Photovoltaic Concentrators with Dielectric Second Stages", Xiaohui, Ning, Roland Winston and Joseph O'Gallagher, *Applied Optics,* vol. 26, Apr. 1, 1987, pp. 1207–1212.

"New Backlighting Technologies for LCDs", Hathaway, et al., *Society for Information Display Digest,* vol. 22, May 1991, pp. 751–754.

"Parts that Glow", A. Blumenfeld and S. Jones, *Machine Design,* Jul. 1985, pp. 1–11.

"Directional Diffuser Lens Array for Backlit LCDs", R. I. McCartney and D. Syroid, *Japan Display,* pp. 259–262 (1992). No month.

"A Non–Imaging CCFT Coupier for LCD Backlighting", F. Lin, SID 94 *Applications Digest,* 1994 pp. 14–15. No month.

"Backlighting For Liquid Crystal Display", IBM Technical Disclosure Bulletin, vol. 29, No. 11, Apr. 1987, pp. 4838–4839.

"Flat–Panel Fluorescent Lamp Backlights with Reduced Illumination Angle: Backlight Optics at the Thermodynamic Limit," Jacobson, et al., Society for Information Display, International Symposium Digest, May 1992.

"Collimated Fluorescent Backlight," Biles, Society for Photonic Instr. Displays, vol. 1911, pp. 169–174, Feb. 1993.

"Formation of Light–Guiding Interconnections in an Integrated Optical Circuit by Composite Tapered–Film Coupling," Tien, et al., *Applied Optics,* Aug. 1973, vol. 12, No. 8, pp. 1909–1916.

"Optimum Excitation of Optical Surface Waves," R. Ulrich, *Journal of the Optical Society of America,* vol. 61, No. 11, Nov. 1971, pp. 1467–1476.

"Optical Read–Only Memory," H. R. Foglia, *IBM Technical Disclosure Bulletin,* vol. 4, NO. 4, Sep. 1961, p. 45.

"Flat Collimator: A Backlighting Assembly Utilizing Microprisms for High Energy Efficiency," Tai, et al., SID 94 *Applications Digest* Jun. 14, 1994, pp. 10–13.

"Retroflecting Sheet Polarizer," M. F. Weber, *SID 92 Digest,* May 1992, pp. 427–429.

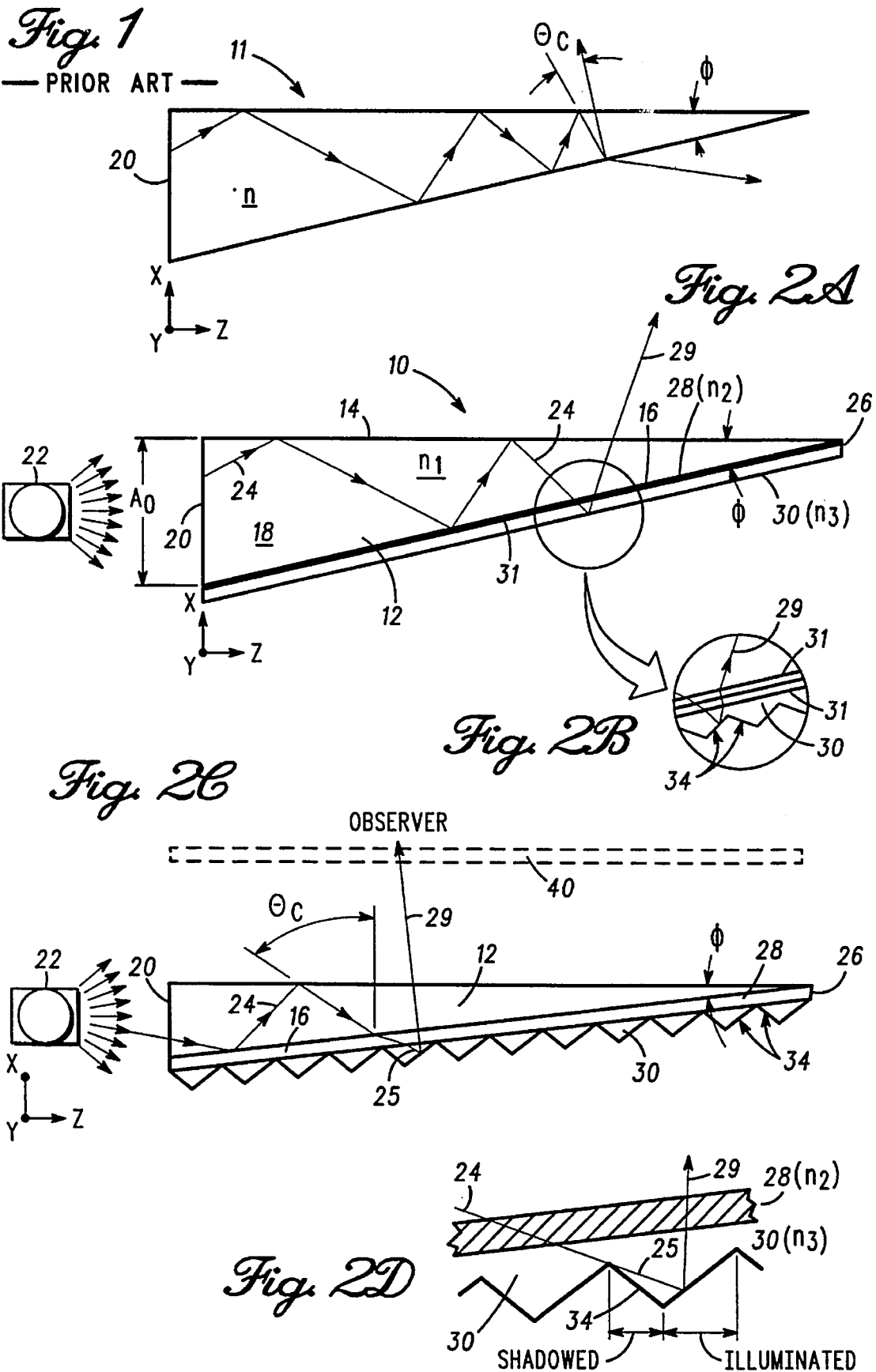

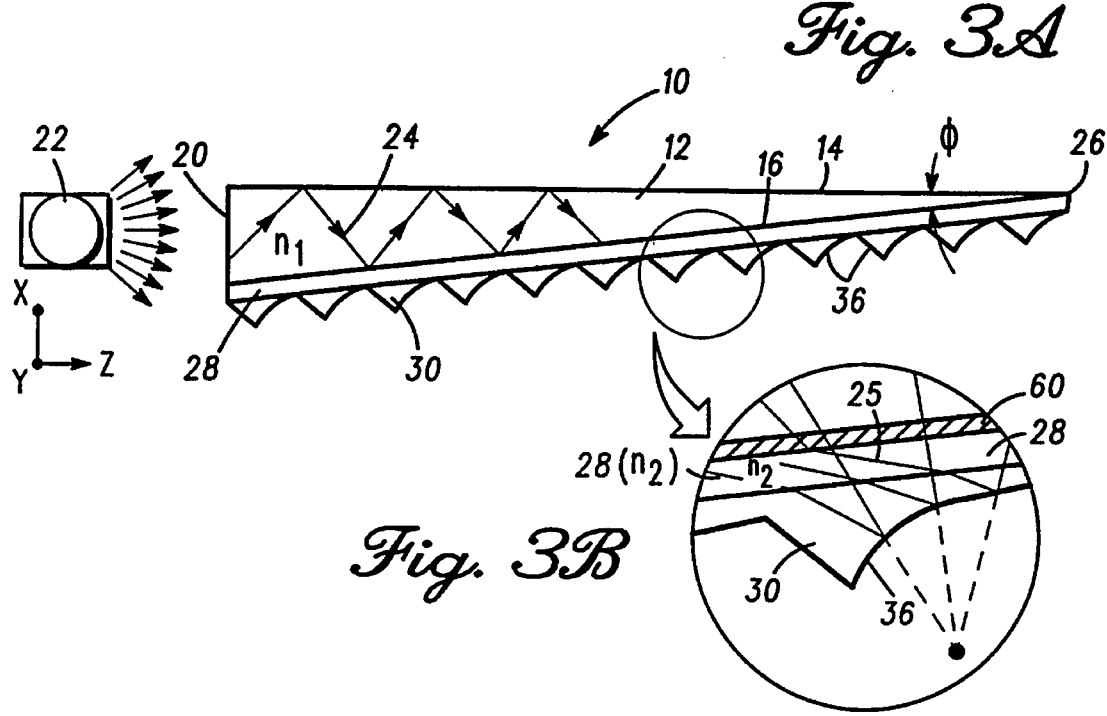
*Fig. 3A*
*Fig. 3B*
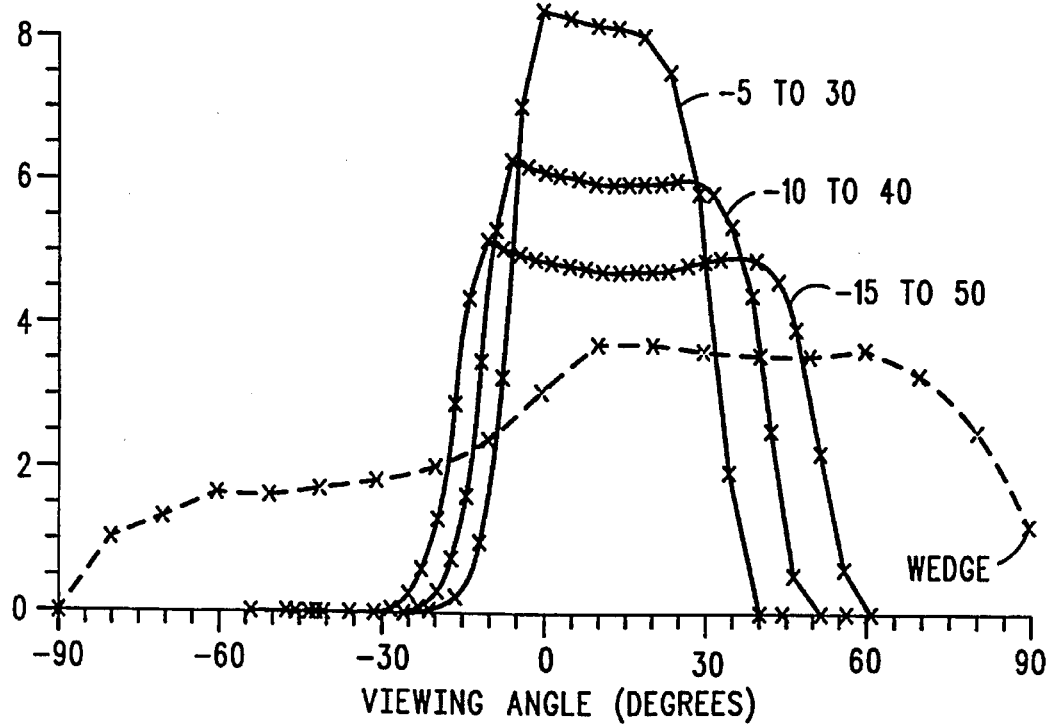
*Fig. 4A*

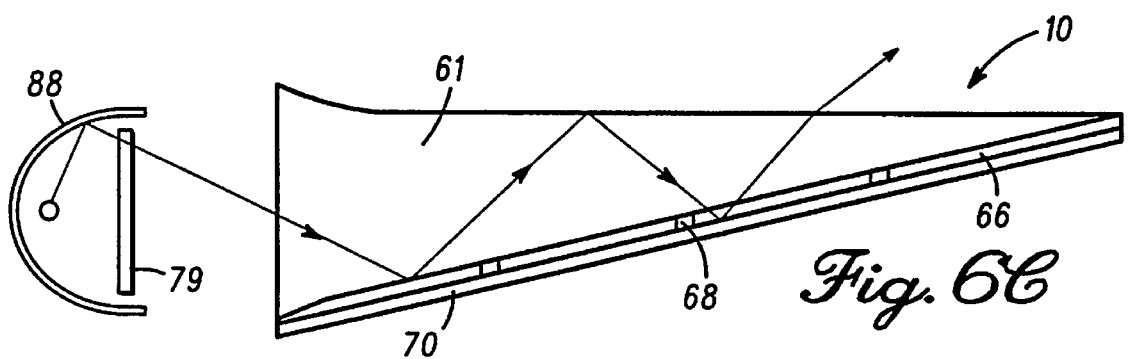
Fig. 6C
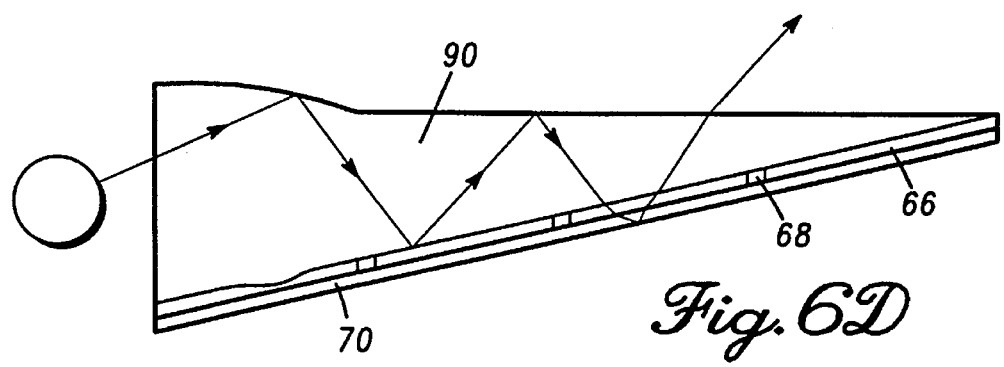
Fig. 6D
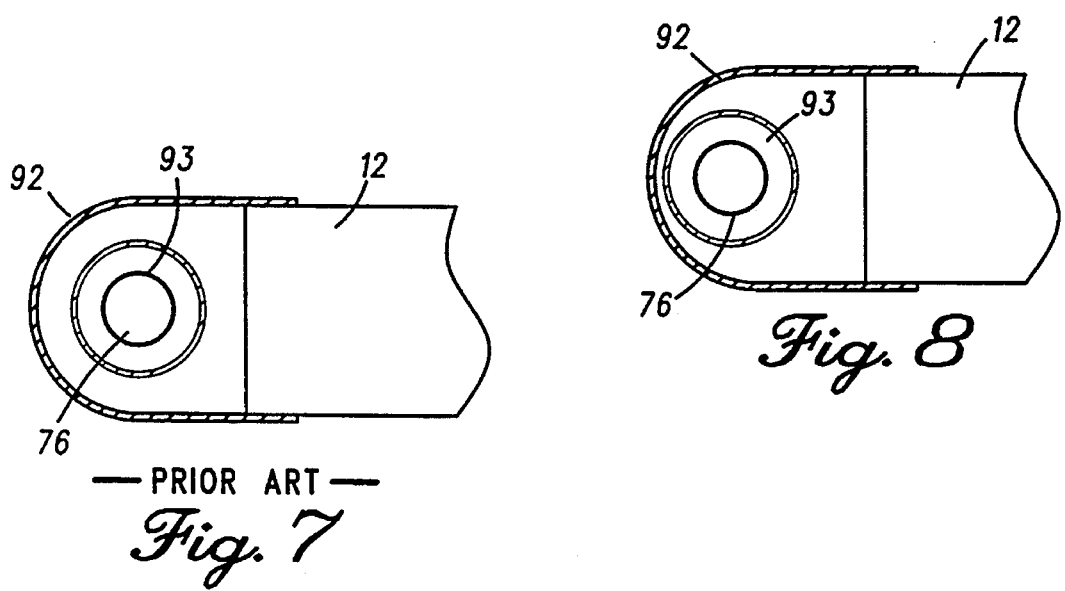
— PRIOR ART —
Fig. 7
Fig. 8

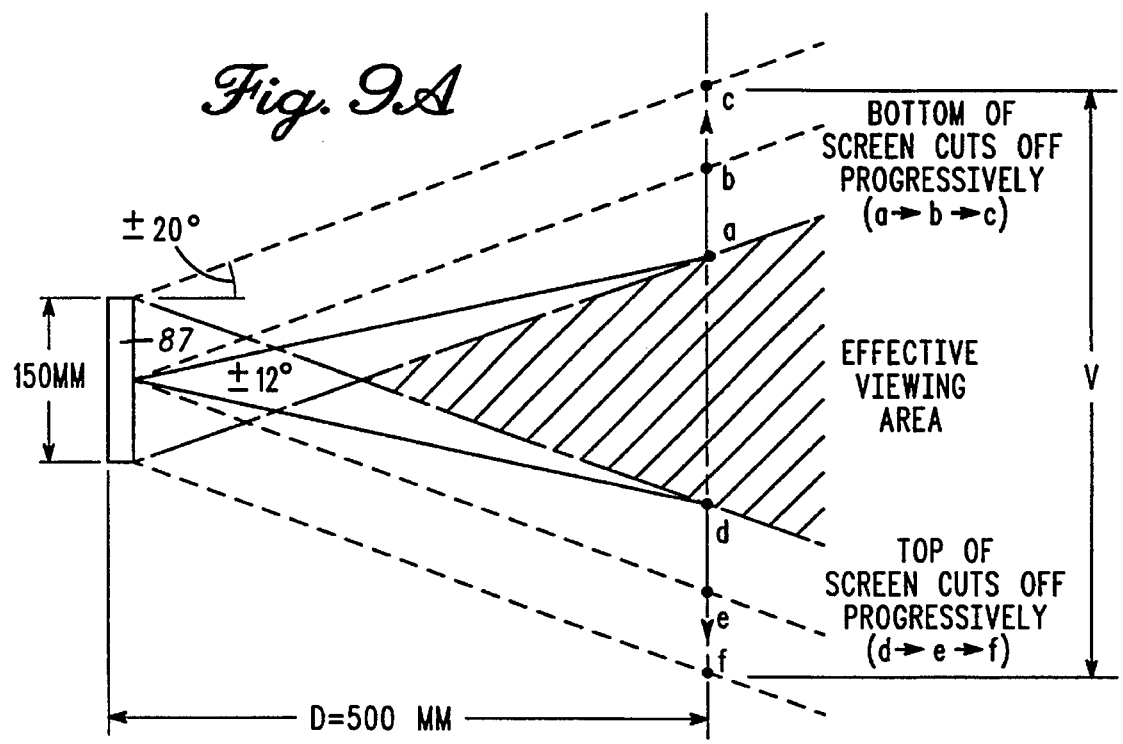
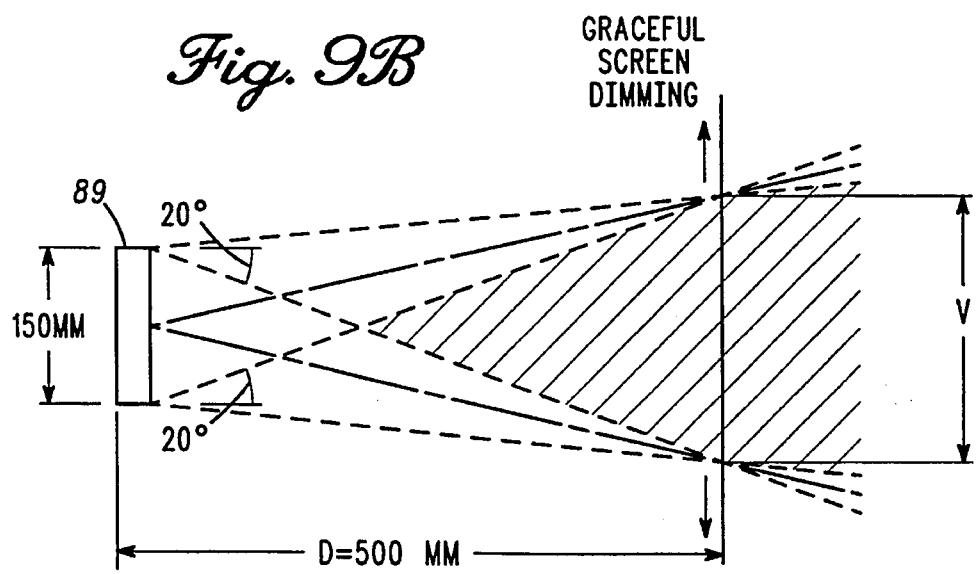

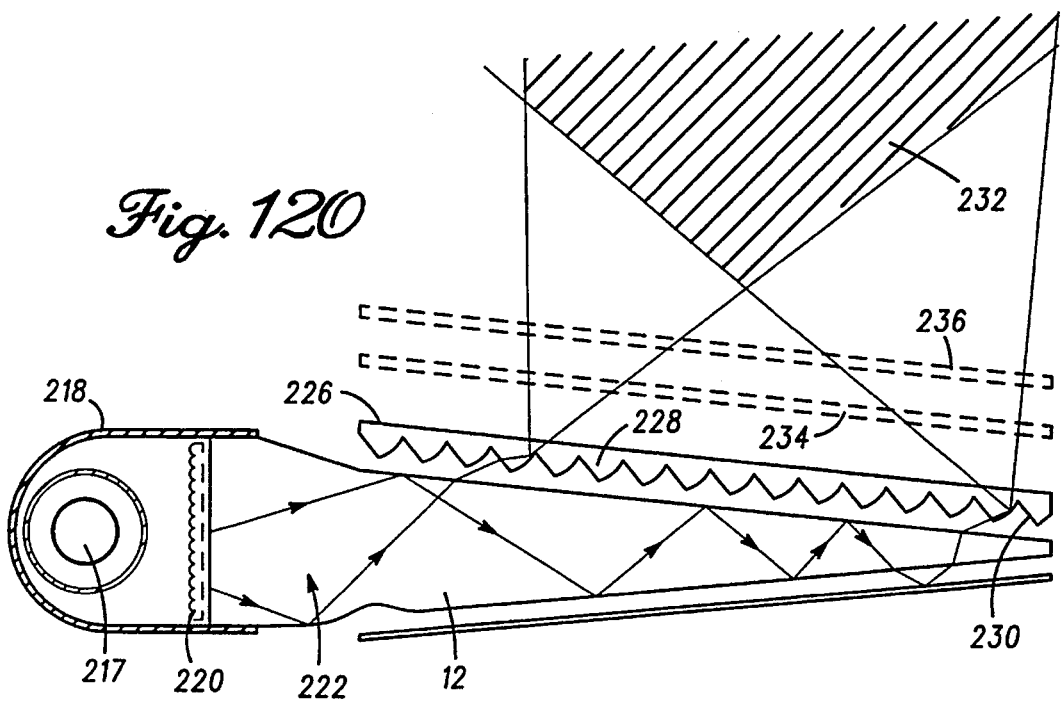
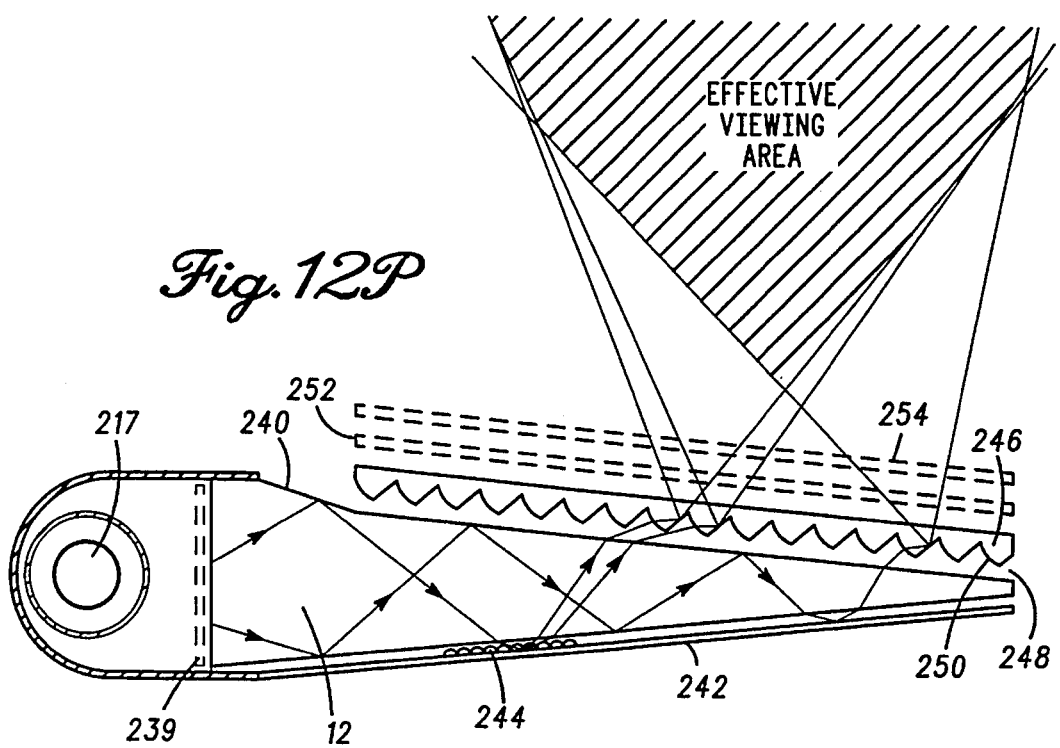

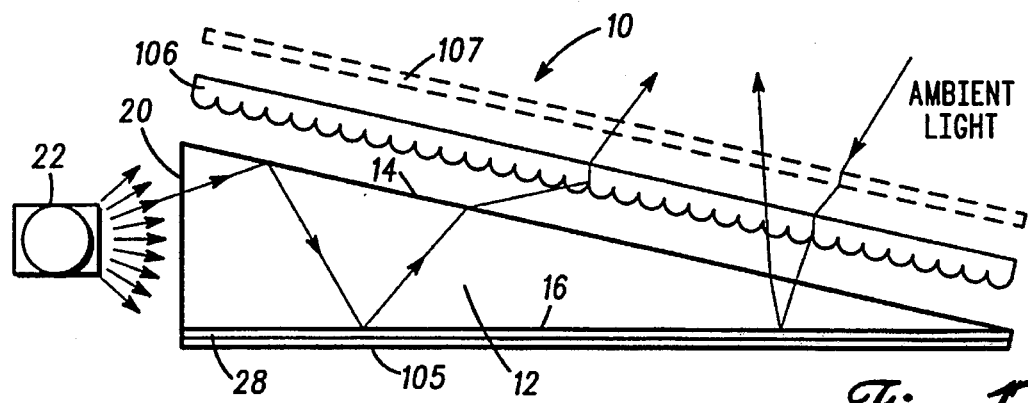
Fig. 17
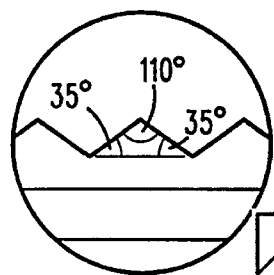
Fig. 18A
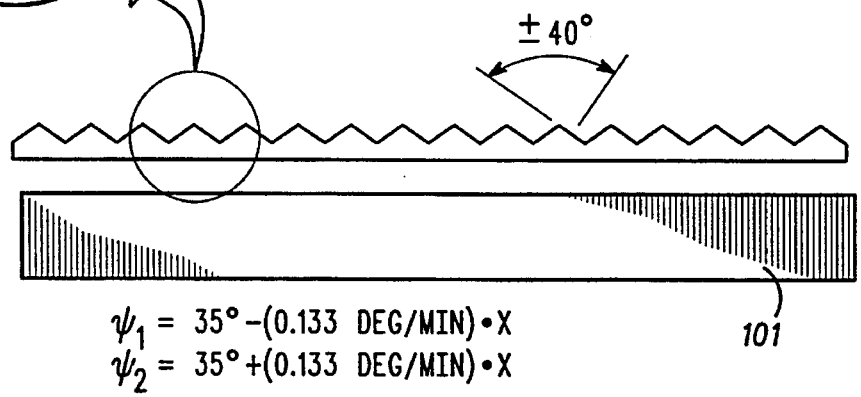
$\psi_1 = 35° - (0.133 \text{ DEG/MIN}) \cdot X$
$\psi_2 = 35° + (0.133 \text{ DEG/MIN}) \cdot X$
Fig. 18B
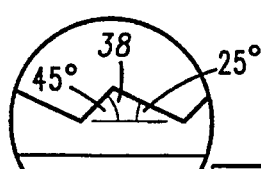
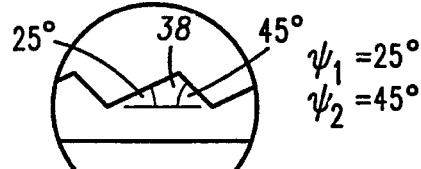
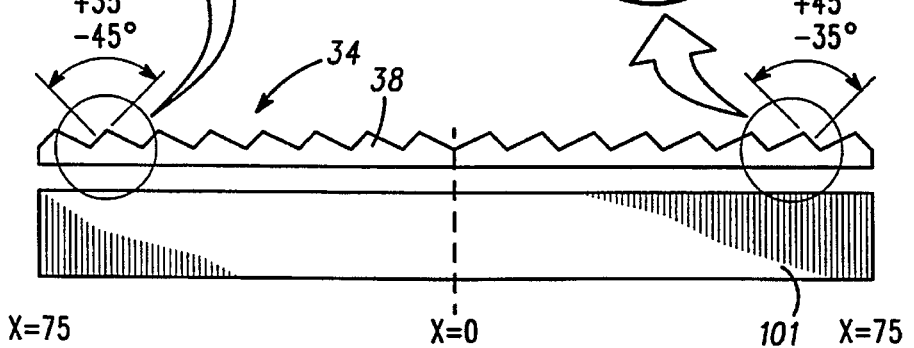

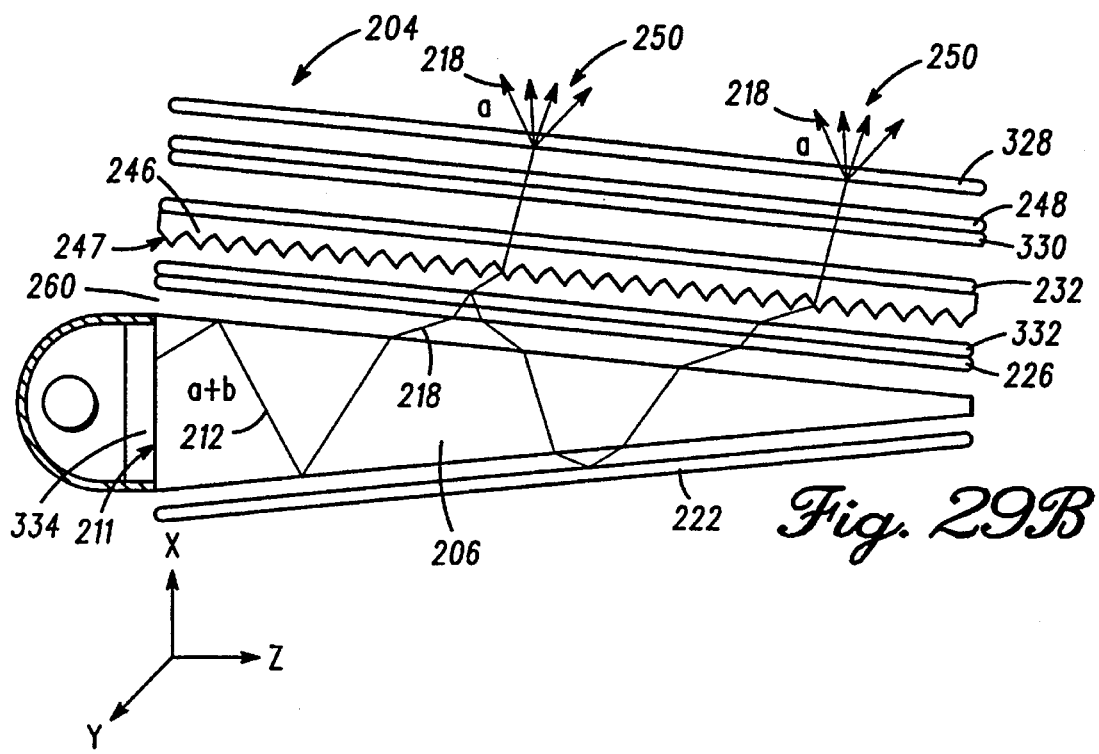
Fig. 29B
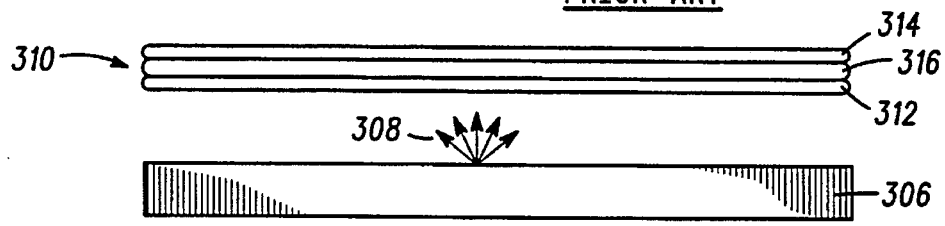
Fig. 30A
PRIOR ART
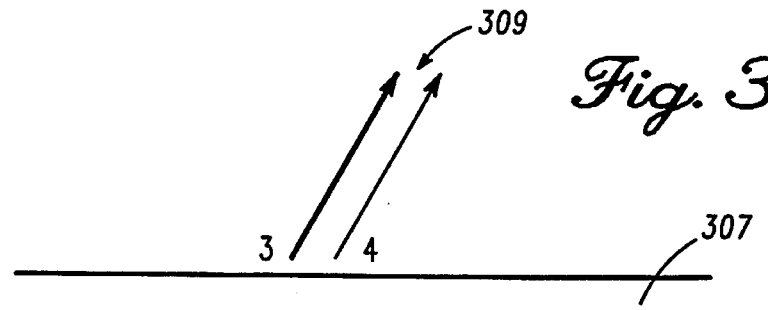
Fig. 30B
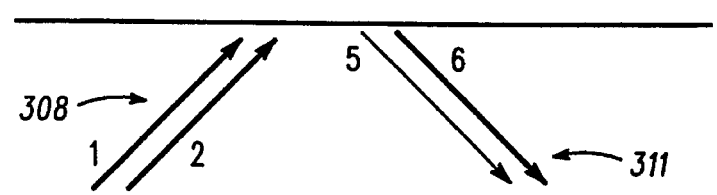

LUMINAIRE DEVICE

This is a continuation of application Ser. No. 08/226,016 filed on Apr. 11, 1994 (which is now U.S. Pat. No. 5,528, 720) which is a continuation in part of Ser. No. 08/029,883 filed on Mar. 11, 1993 (which is now U.S. Pat. No. 5,303, 322) which is a continuation in part of Ser. No. 07/855,838 which was filed Mar. 23, 1992, which is now U.S. Pat. No. 5,237,641.

The present invention is concerned generally with a luminaire device for providing selected light illumination. More particularly, the invention is concerned with tapered luminaires, such as a wedge or disc shape, for backlighting by selective post diffusion of light output from a liquid crystal display layer and also by manipulating light polarization and filtering selected light crystal display layer and also by manipulating light polarization and filtering selected light polarizations to enhance light illumination and image output.

A variety of applications exist for luminaire devices, such as, for liquid crystal displays. For flat panel liquid crystal displays, it is important to provide adequate backlighting while maintaining a compact lighting source. It is known to use wedge shaped optical devices for general illumination purposes. Light is input to such devices at the larger end; and light is then internally reflected off the wedge surfaces until the critical angle of the reflecting interface is reached, after which light is output from the wedge device. Such devices, however, have only been used to generally deliver an uncollimated lighting output and often have undesirable spatial angular output distributions. For example, some of these devices use white painted layers as diffuse reflectors to generate uncollimated output light.

It is therefore an object of the invention to provide an improved optical device and method of manufacture.

It is another object of the invention to provide a novel three dimensional luminaire.

It is a further object of the invention to provide an improved multilayer tapered luminaire for optical purposes, such as for controlled utilization of light polarization.

It is still another object of the invention to provide a novel tapered luminaire device for controlled transmission or concentration of light.

It is an additional object of the invention to provide a novel optical device for providing collimated polarized light illumination from the device.

It is yet a further object of the invention to provide an improved tapered luminaire having a polarization filter layer.

It is still another object of the invention to provide a novel luminaire allowing conversion of polarized light to enhance illumination output from the invention.

It is yet a further object of the invention to provide an improved illumination system wherein a combination of a polarization filter layer and light redirecting layer are utilized to provide improved light illumination over a controlled angular range of output to the viewer.

It is still a further object of the invention to provide a novel luminaire optical device wherein a combination of a polarization filter, polarization converting layer and a post LCD diffuser layer are used to enhance light illumination from the optical device.

It is yet a further object of the invention to provide an improved luminaire optical device wherein an LCD layer is disposed adjacent an overlying post LCD diffuser layer to enable control of light distribution over broader angles to viewers without loss of light output or image qualities.

Other objects, features and advantages of the present invention will be readily apparent from the following description of the preferred embodiments thereof, taken in conjunction with the accompanying drawings described below.

BRIEF DESCRIPTION OF THE DRAWINGS

FIG. 1 shows a prior art wedge shaped device;

FIG. 2A illustrates a multilayer tapered luminaire device constructed in accordance with the invention; FIG. 2B is a magnified partial view of the junction of the wedge layer, the first layer and the second faceted layer; FIG. 2C is an exaggerated form of FIG. 2A showing a greatly enlarged second faceted layer; FIG. 2D is a partial view of the junction of the three layers illustrating the geometry for brightness determinations.

FIG. 3A illustrates a multilayer wedge device with curved facets on the ambient side of the second layer and FIG. 3B shows a magnified partial view of the junction of the various layers of the device;

FIG. 6C illustrates another tapered luminaire in cross section with a variable parametric profile light source and a lenticular diffuser; and FIG. 6D shows another tapered luminaire in cross section with non-monotonic wedge layer thickness;

FIG. 7 illustrates a reflective element disposed concentrically about a light source;

FIG. 8 illustrates a reflective element disposed about a light source with maximum displacement between the reflector center of curvature and the center of the light source;

FIG. 9A illustrates use of a redirecting layer to provide a substantially similar angular distribution emanating from all portions of the device and FIG. 9B illustrates use of a redirecting layer to vary angular distribution emanating from different portions of the device, and specifically to focus the various angular distributions to enhance their overlap at a selected target distance;

FIG. 12O illustrates a luminaire with an eccentric light coupler and converging to the wedge shaped section; FIG. 12P shows a luminaire with an eccentric light coupler and a diffuser and roughened or lenticular reflector.

FIG. 17 shows a luminaire operative in ambient and active modes with a faceted redirecting layer and a lenticular diffuser; and FIGS. 18A–B illustrates a luminaire with an array of micro-prisms for a faceted surface disposed over a diffuse backlight;

FIG. 29A illustrates a luminaire with polarized light output in combination with an LCD layer and FIG. 29B is a variation on FIG. 29A;

FIG. 30A illustrates a conventional LCD display system; FIG. 30B shows a polarization filter layer.

DETAILED DESCRIPTION OF PREFERRED EMBODIMENTS

Figure 2E:
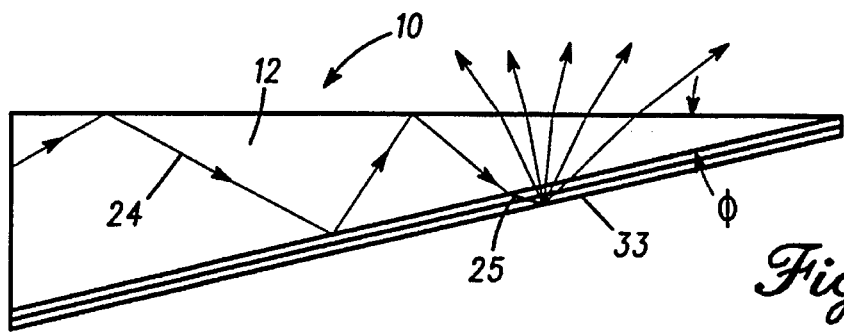
FIG. 2E is a multilayer wedge device with a light redirecting, internally transmitting layer on the bottom.

A multilayer luminaire device constructed in accordance with one form of the invention is illustrated in FIG. 2 and indicated generally at 10. A prior art wedge 11 is shown generally in FIG. 1. In this wedge 11 the light rays within the wedge 11 reflect from the surfaces until the angle of incidence is less than the critical angle ($\sin^{-1} 1/n$) where n is the index of refraction of the wedge 11. The light can exit equally from both top and bottom surfaces of the wedge 11, as well as exiting at grazing angles.

The multilayer luminaire device 10 (hereinafter "device 10") shown in FIG. 2A includes a base or wedge layer 12 which has a characteristic optical index of refraction of $n_1$. The term "wedge layer" shall be used herein to include all geometries having converging top and bottom surfaces with wedge shaped cross sectional areas. The x, y and z axes are indicated within FIGS. 2A and 2C with the "y" axis perpendicular to the paper. Typical useful materials for the wedge layer 12 include almost any transparent material, such as glass, polymethyl methacrylate, polystyrene, polycarbonate, polyvinyl chloride, methyl methacrylate/styrene copolymer (NAS) and styrene/acrylonitrile. The wedge layer 12 in FIG. 2A further includes a top surface 14, a bottom surface 16, side surfaces 18, edge 26 and a back surface 20 of thickness $t_o$ spanning the top, bottom and side surfaces. A light source, such as a tubular fluorescent light 22, injects light 24 through the back surface 20 into the wedge layer 12. The light 24 is internally reflected from the various wedge layer surfaces and is directed along the wedge layer 12 toward the edge 26. Other possible light sources can be used and will be described hereinafter. Generally, conventional light sources provide substantially incoherent, uncollimated light; but coherent, collimated light can also be processed by the inventions herein.

For the case where the surfaces 14 and 16 are flat, a single angle of inclination $\phi$ for a linear wedge is defined by the top surface 14 and the bottom surface 16. In the case of nonlinear wedges, a continuum of angles $\phi$ are definable; and the nonlinear wedge can be designed to provide the desired control of light output or concentration. Such a nonlinear wedge will be described in more detail later.

In the embodiment of FIG. 2A a first layer 28 is coupled to the wedge layer 12 without any intervening air gap, and the first layer 28 has an optical index of refraction $n_2$ and is optically coupled to the bottom surface 16. The first layer 28 can range in thickness from a few light wavelengths to much greater thicknesses and accomplish the desired functionality. The resulting dielectric interface between the wedge layer 12 and the first layer 28 has a higher critical angle than at the interface between the wedge layer 12 and ambient. As will be apparent hereinafter, this feature can enable preferential angular output and collimation of the light 24 from the device 10.

Coupled to the first layer 28 is a second layer 30 (best seen in FIG. 2B) having an optical index of refraction $n_3$ which is greater than $n_2$, and in some embodiments preferably greater than $n_1$. This configuration then allows the light 24 to leave the first layer 28 and enter the second layer 30. In the embodiment of FIG. 2A there are substantially no intervening air gaps between the first layer 28 and the second layer 30. In the preferred form of the invention illustrated in FIG. 2A, $n_1$ is about 1.5, $n_2 < 1.5$ and $n_3 \geq n_1$. Most preferably, $n_1 = 1.5$, $n_2 < 1.5$ (such as about one) and $n_3 \geq n_1$.

In such a multilayer configuration for the device 10 shown in FIG. 2, the wedge layer 12 causes the angle of incidence for each cyclic time of reflection from the top surface 14 to decrease by the angle of inclination $2\phi$ (relative to the normal to the plane of the bottom surface 16). When the angle of incidence with the bottom surface 16 is less than the critical angle characteristic of the interface between the wedge layer 12 and the first layer 28, the light 24 is coupled into the first layer 28. Therefore, the first layer 28 and the associated optical interface properties form an angular filter allowing the light 24 to pass when the condition is satisfied: $\theta < \theta_c = \sin^{-1}(n_2/n_1)$. That is, the described critical angle is higher than for the interface between air and the wedge layer 12. Therefore, if the two critical angles differ by more than $6\phi$, nearly all of the light 24 will cross into the interface between the wedge layer 12 and the first layer 28 before it can exit the wedge layer 12 through the top surface 14. Consequently, if the two critical angles differ by less than $\phi$, a substantial fraction, but less than half, of the light can exit the top surface 14. If the two angles differ by more than $\phi$ and less than $6\phi$, then substantially more than half but less than all the light will cross into the wedge layer 12 and the first layer 28 before it can exit the wedge layer 12 through the top surface 14. The device 10 can thus be constructed such that the condition $\theta < \theta_c$ is satisfied first for the bottom surface 16. The escaping light 24 (light which has entered the layer 28) will then enter the second layer 30 as long as $n_3 > n_2$, for example. The light 24 then becomes a collimated light 25 in the second layer 30 provided by virtue of the first layer 28 being coupled to the wedge layer 12 and having the proper relationship between the indices of refraction.

In order to generate an output of the light 24 from the device 10, the second layer 30 includes means for scattering light, such as a paint layer 33 shown in FIG. 2E or a faceted surface 34 shown in both FIGS. 2B and 2C. The paint layer 33 can be used to preferentially project an image or other visual information. The paint layer 33 can comprise, for example, a controllable distribution of particles having characteristic indices of refraction.

Figure 2F:
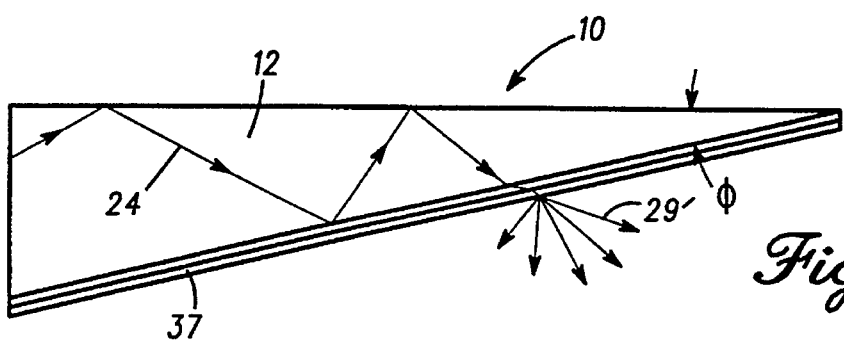
FIG. 2F shows a wedge device with a lower surface translucent layer.

By appropriate choice, light can also be redirected back through the wedge layer 12 and into ambient (see light 29 in FIGS. 2A and 2C) or output directly into ambient from the second layer 30 (see light 29' in FIG. 2F).

In other forms of the invention a further plurality of layers with associated "n" values can exist. In one preferred form of the invention the index of the lowest index layer can replace $n_2$ in equations for numerical aperture and output angle (to be provided hereinafter). Such further layers can, for example, be intervening between the wedge layer 12 and the first layer 28, intervening between the first layer 28 and the second layer 30 or be overlayers of the wedge layer 12 or the second layer 30.

Figure 2G:
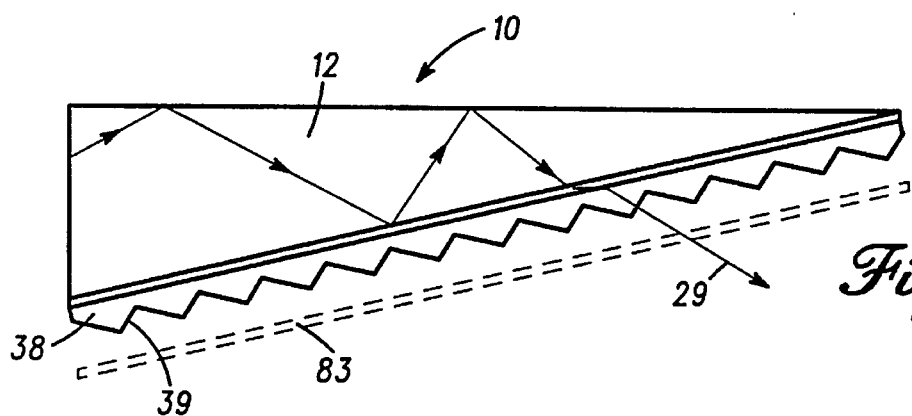
FIG. 2G shows a wedge layer with a lower surface refracting faceted layer.

In certain embodiments the preferred geometries result in output of light into ambient without being reflected back through the wedge layer 12. For example, in FIG. 2F the device 10 can include a translucent layer 37. In another form of this embodiment shown in FIG. 2G, a refracting layer 38 is shown. The refracting layer 38 can include flat facets 39 for providing a collimated output. Also shown in phantom in FIG. 2G is a transverse lenticular diffuser 83 which will be described in more detail hereinafter. The diffuser layer 83 can be used with any of the invention geometries, including above the wedge layer 12 as in FIG. 6A.

Figure 2H:
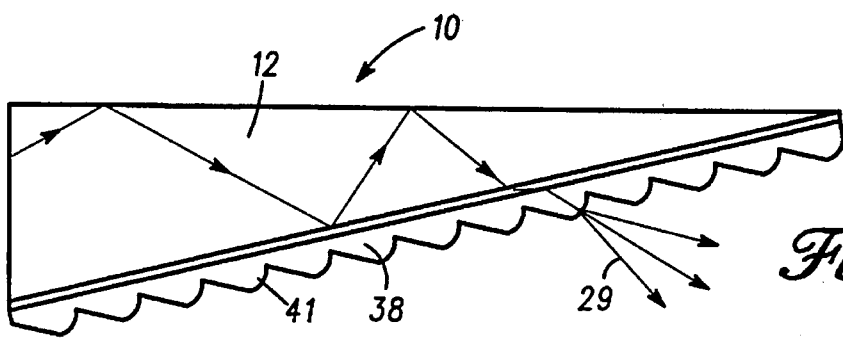
FIG. 2H shows a wedge layer with a lower surface refracting layer and curved facets thereon.
Figure 2I:
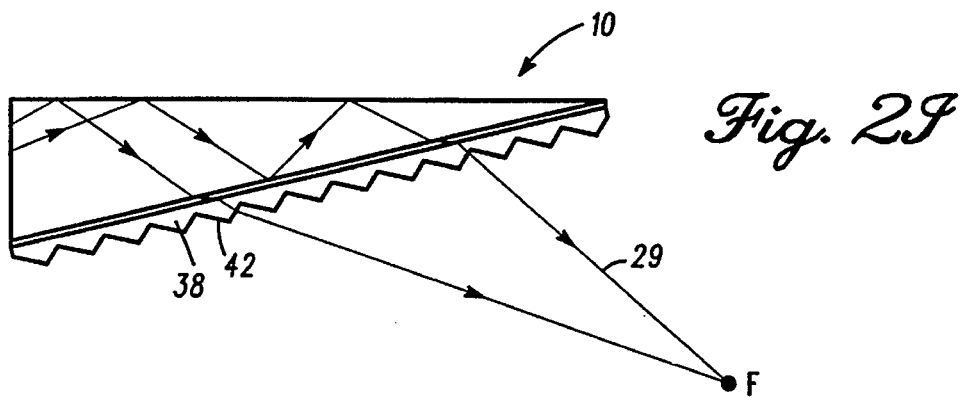
FIG. 2I shows a wedge layer with a refracting layer of facets having variable facet angles.
Figure 2J:
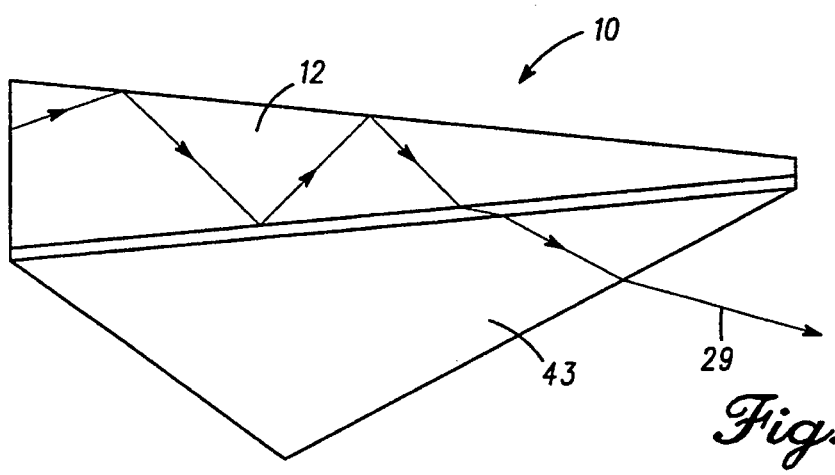
FIG. 2J shows a single refracting prism coupled to a wedge layer.
Figure 2K:
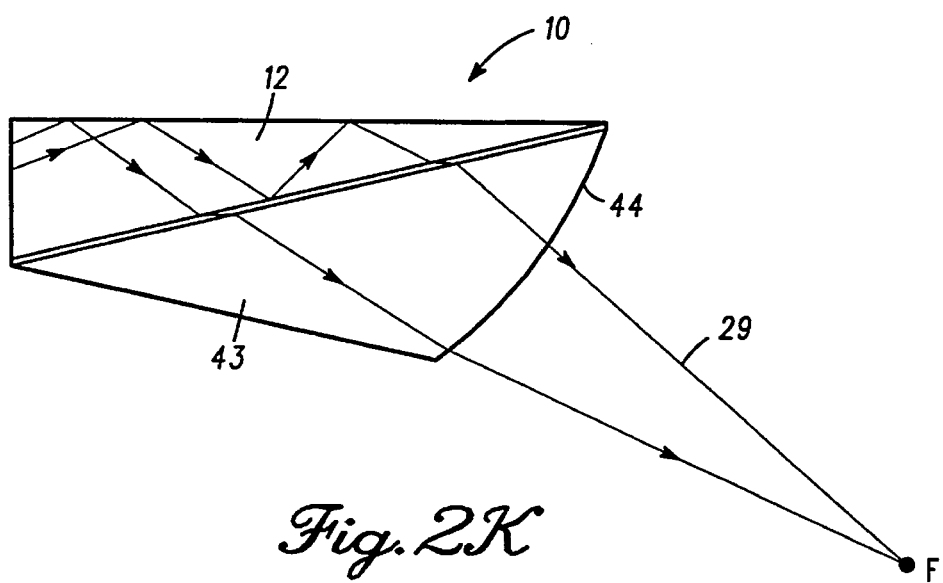
FIG. 2K shows a single refracting prism coupled to a wedge layer and with an integral lens.
Figure 2L:
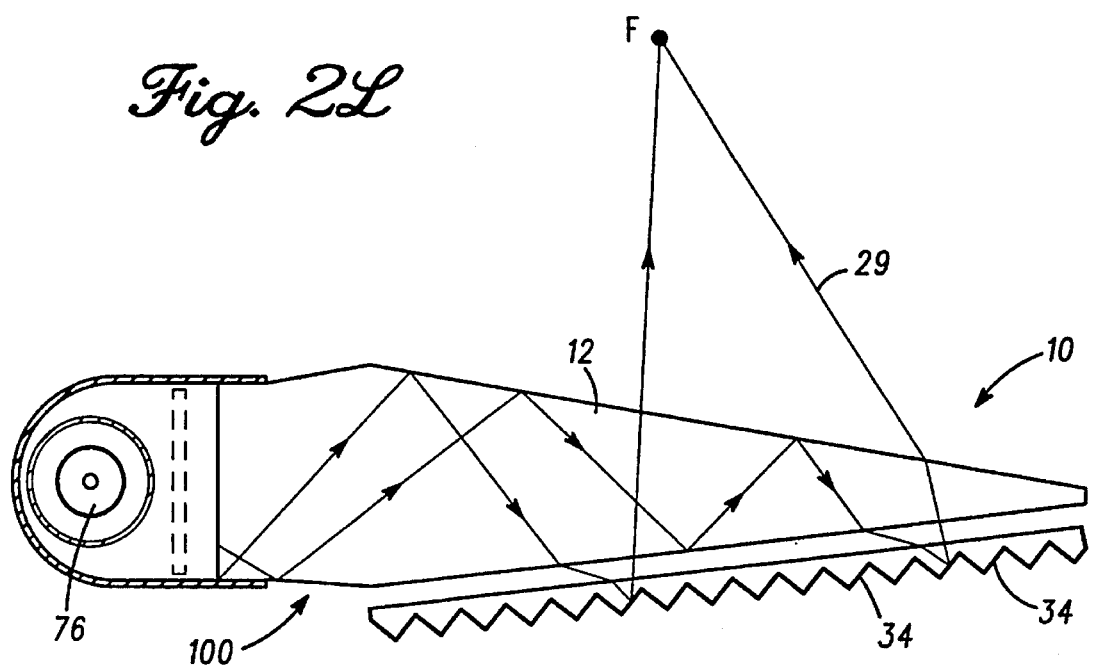
FIG. 2L shows a reflecting faceted layer coupled to a wedge device.
Figure 2M:
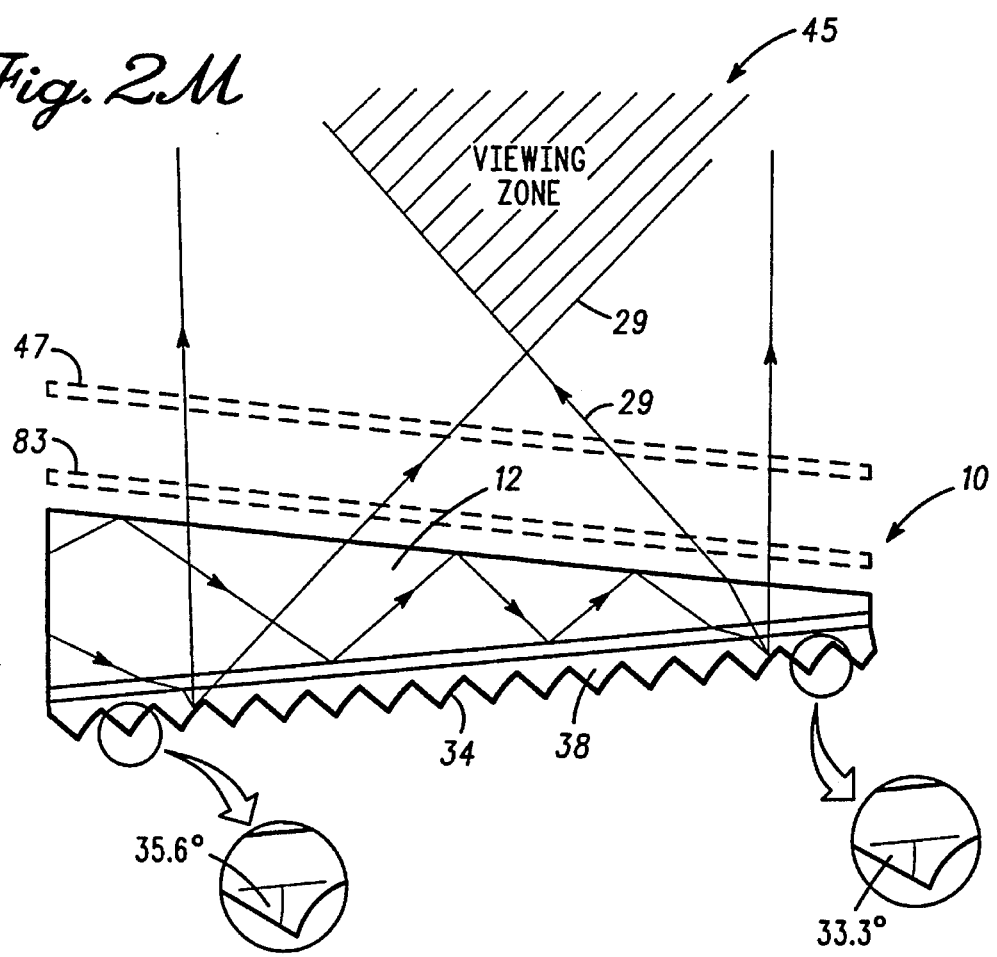
FIG. 2M shows a reflecting faceted layer with curved facet angles and coupled to a wedge device.
Figure 2N:
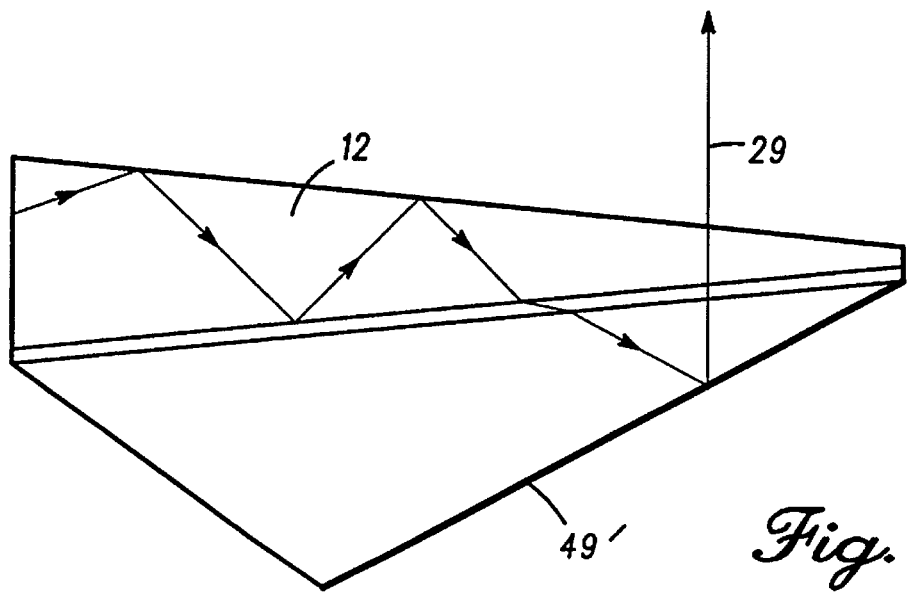
FIG. 2N shows a flat reflecting facet on a wedge layer and FIG. 2O shows a curved reflecting facet on a wedge layer.
Figure 2O:
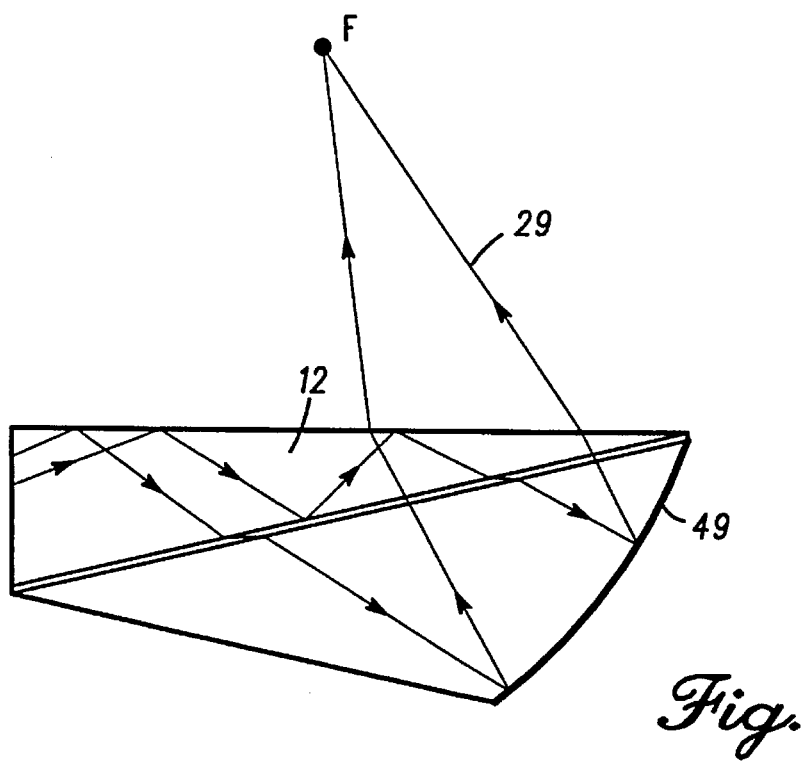

In yet another example shown in FIG. 2H, the refracting layer 38 can include curved facets 41 for providing a smoothly broadened output over a desired angular distribution. In a further example shown in FIG. 2I, the refracting layer 38 includes variable angle facets 42. These facets 42 have facet angles and/or curvature which are varied with position across the facet array to focus output light in a desired manner. Curved facets would enable producing a softly focused region within which the entire viewing screen appears to be illuminated. Examples of the application to computer screen illumination will be described hereinafter. In FIGS. 2J and 2K are shown, respectively, a single refracting prism element 43 and the prism element 43 with an integral lens 44 to focus the output light. FIGS. 2L and M show the faceted surface 34 with the facets angularly disposed to control the output distribution of light. In FIGS. 2K and 2L the light is output to a focal point "F", while in FIG. 2M the output is over an approximate viewing range 45. FIGS. 2N and 2O illustrate flat reflecting facets 48 and curved reflecting facet 49 for providing a collimated light output or focused light output, respectively.

As shown in FIGS. 2A and C the faceted surface 34 optically reflects and redirects light 29 through the second layer 30, the first layer 28 and then through the wedge layer 12 into ambient. Only a fraction of each facet is illuminated, causing the output to appear alternately light and dark when viewed on a sufficiently small scale. Since this pattern is typically undesirable, for the preferred embodiment shown in FIG. 2B the period of spacing between each of the faceted surfaces 34 is preferably large enough to avoid diffraction effects, but small enough that the individual facets are not detected by the intended observing means. The spacing is also chosen to avoid forming Moiré interference patterns with any features of the device to be illuminated, such as a liquid crystal display or CCD (charge coupled device) arrays. Some irregularity in the spacing can mitigate undesirable diffraction Moiré effects. For typical backlighting displays, a spacing period of roughly 0.001–0.003 inches can accomplish the desired purpose.

The faceted surface 34 in FIGS. 2B and 2C, for example, can be generally prepared to control the angular range over which the redirected light 29 is output from the device 10.

The minimum distribution of output angle in the layer 30 has a width which is approximately equal to:

$$\Delta\theta = 2\phi[(n_1^2 - n_2^2)/(n_3^2 - n_2^2)]^{1/2}$$

Thus, since $\phi$ can be quite small, the device 10 can be quite an effective collimator. Therefore, for the linear faceted surface 34, the exiting redirected light 29 has a minimum angular width in air of approximately:

$$\Delta\theta_{air} = n_3 \Delta\theta = 2\phi(n_1^2 - n_2^2)^{1/2}[1 - (n_2/n_3)^2]^{1/2}.$$

As described hereinbefore, and as shown in FIGS. 2H, 2I, 2K, 2L, 2M, and FIG. 3, the facet geometry can be used to control angular output in excess of the minimum angle and also focus and control the direction of the output light.

Fresnel reflections from the various interfaces can also broaden the output angle beyond the values given above, but this effect can be reduced by applying an anti reflection coating 31 on one or more of the internal interfaces, as shown in FIG. 2B.

The brightness ratio ("BR") for the illustrated embodiment can be determined by reference to FIG. 2D as well as by etendue match, and BR can be expressed as:

$$B.R. = \frac{\text{output brightness}}{\text{source brightness}}$$

or, $B.R.$ = illuminated area/total area $B.R. = [1 - (n_2/n_3)^2]^{1/2} = 0.4 - 0.65$ (for most transparent dielectric materials). For example, the wedge layer 12 can be acrylic ($n_1 = 1.49$), the first layer 28 can be a fluoropolymer ($n_2 = 1.28 - 1.43$) or Sol-gel ($n_2 = 1.05 - 1.35$, fluoride salts ($n_2 = 1.38 - 1.43$) or silicone based polymer or adhesive ($n_2 = 1.41 - 1.45$); and the second layer 30 can be a faceted reflector such as polycarbonate ($n_3 = 1.59$), polystyrene ($n_3 = 1.59$) epoxy ($n_3 = 1.5 - 1.55$) or acrylic ($n_3 = 1.49$) which have been metallized at the air interface.

Figure 4B:
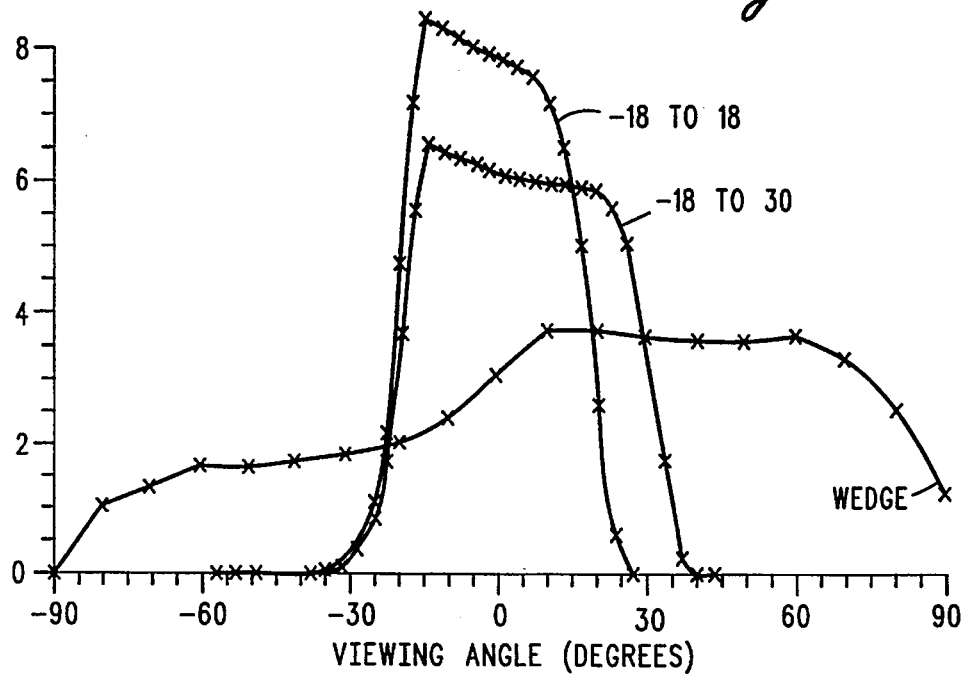
FIG. 4B shows calculated brightness distribution performance over angle for a more symmetric angle range.
Figure 4C:
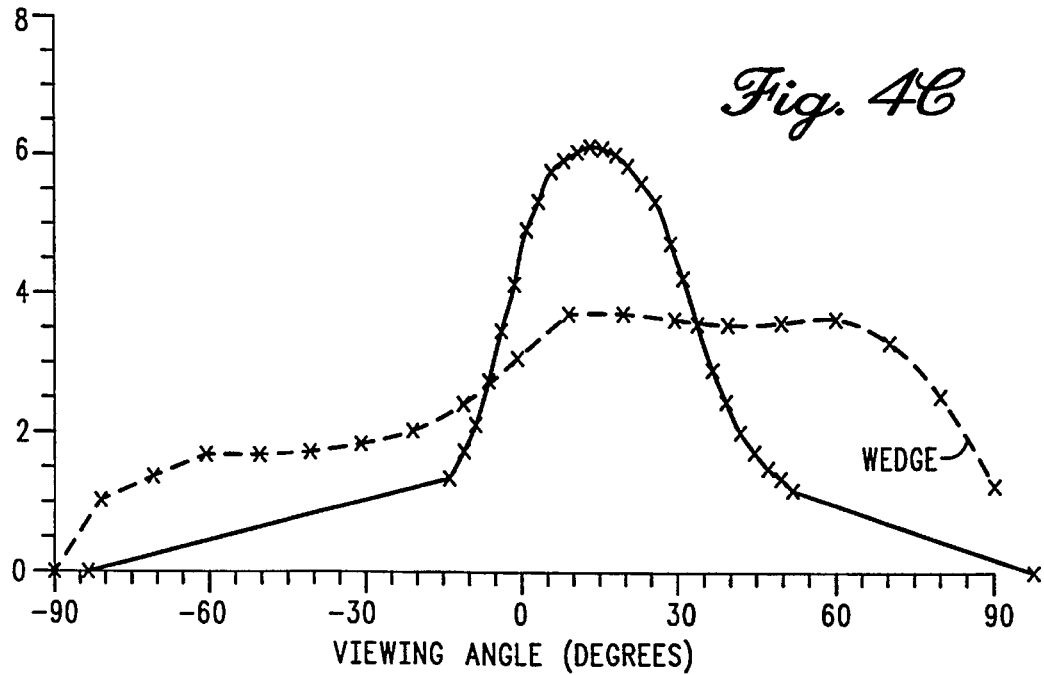
FIG. 4C illustrates calculated brightness performance over angle for the symmetry of FIG. 4B and adding an external diffuser element.
Figure 4D:
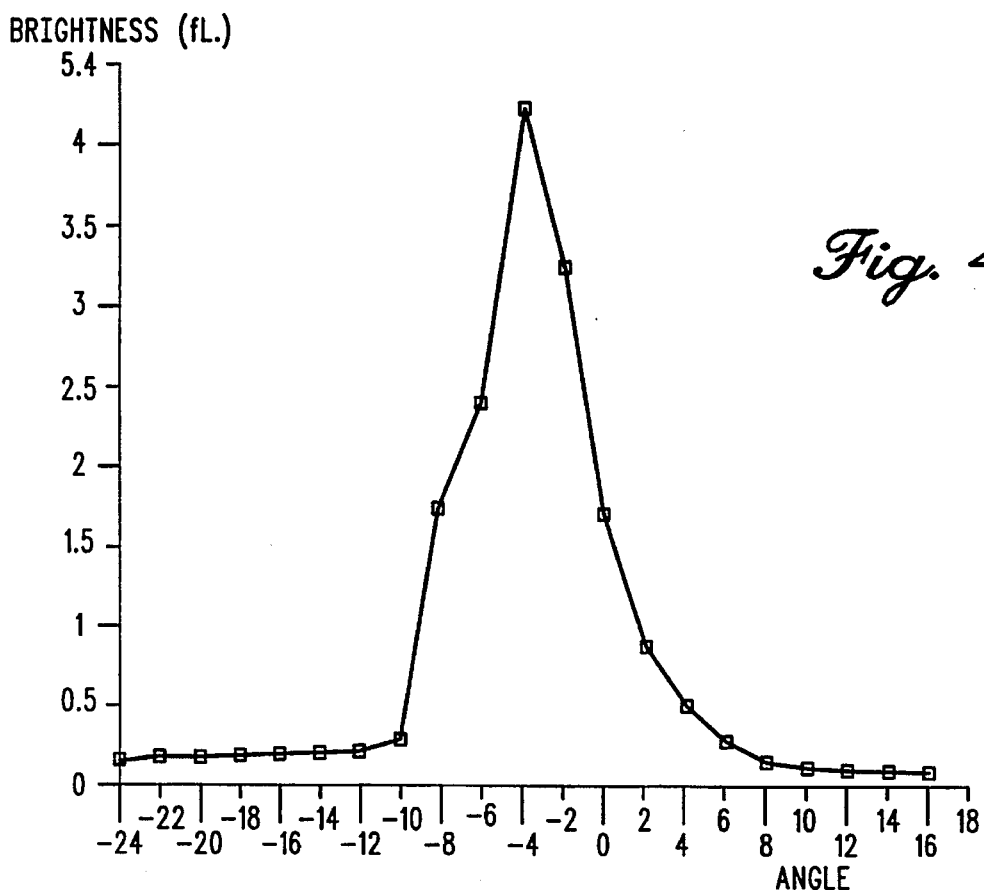
FIG. 4D illustrates an output using flat reflecting facets, no parallel diffuser; full-width at half-maximum brightness (FWHM)=7 degrees.

The flat, or linear, faceted surfaces 34 shown, for example, in FIGS. 2B and 2C can redirect the incident light 24 to control direction of light output and also substantially preserve the angular distribution of light $\Delta\theta$ which is coupled into the second layer 30 by the angle-filtering effect (see, for example, FIG. 4D). For example, in one preferred embodiment shown in FIG. 2L, the faceted surfaces 34 reflect light with the flat facet angles varied with position to focus the output light. In FIG. 2M the faceted surfaces 34 include curved facet angles which vary with position to produce a softly focused viewing zone 45 within which the entire screen appears to be illuminated (see also, for example FIGS. 4F and 4G). Also show in phantom in FIG. 2M is an exemplary liquid crystal display 47 usable in conjunction with the invention. As further shown in FIGS. 3A and B, curved facets 36 also redirect the incident light 24, but the facet curvature increases the resulting range of angular output for the redirected light 29 (see for comparison for flat facets FIG. 2D). For example, it is known that a concave trough can produce a real image, and that a convex trough can produce a virtual image (see, for example, FIG. 3B). In each case the image is equivalent to a line source emitting light uniformly over the desired angular output range. Consequently, an array of such trough shaped facets 36 can redirect the incoming form of collimated light 25 from the first layer 28 (see FIG. 2C), and a plurality of such line source images then form the redirected light 29. By arranging the spacing of the curved facets 36 to less than human eye resolution, the resulting array of line sources will appear very uniform to an observer. As previously mentioned, the choice of about three hundred to five hundred lines/inch or 0.002 to 0.003 inches for the period of facet spacing provides such a result. For a typical LCD display viewing distances of approximately twenty inches or greater are conventional.

Other useful facet shapes can include, for example, parabolic, elliptical, hyperbolic, circular, exponential, polynomial, polygonal, and combinations thereof. The user can thus construct virtually arbitrary distributions of averaged brightness of illumination using different facet designs. For example, polygon shaped facets can be used to produce output angular distributions having multiple peaks.

Figure 4E:
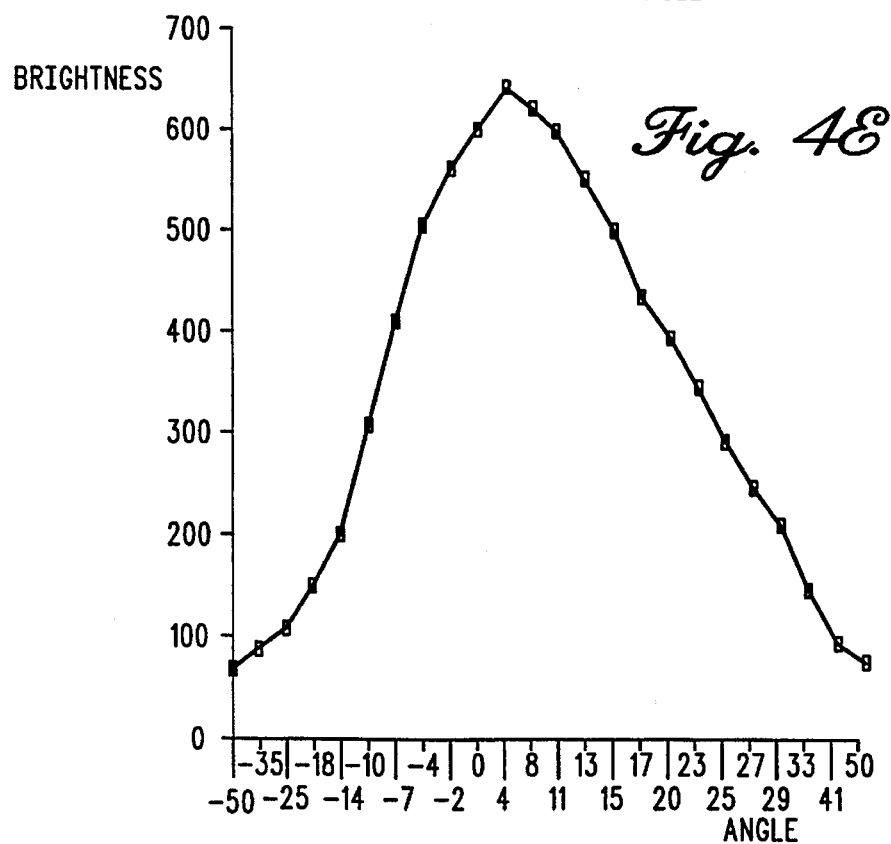
FIG. 4E illustrates an example of nearly symmetrical output distribution; measured using flat facets with parallel lenticular diffuser; FWHM=34 degrees.
Figure 4F:
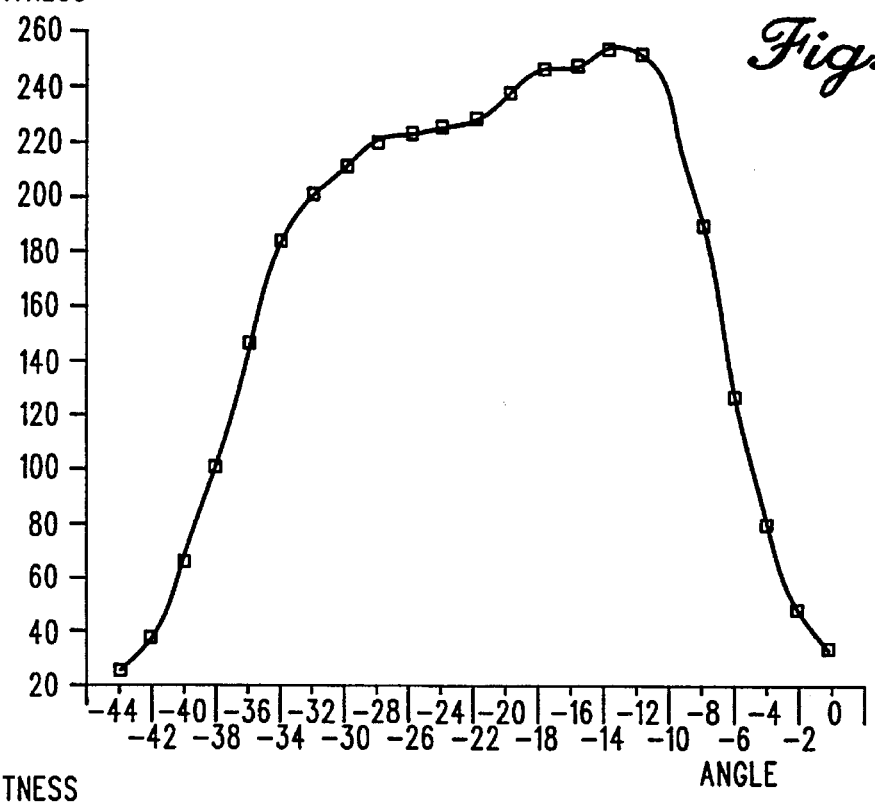
FIG. 4F illustrates an example of asymmetrical output distribution, measured using curved facets; FWHM=32 degrees.
Figure 4G:
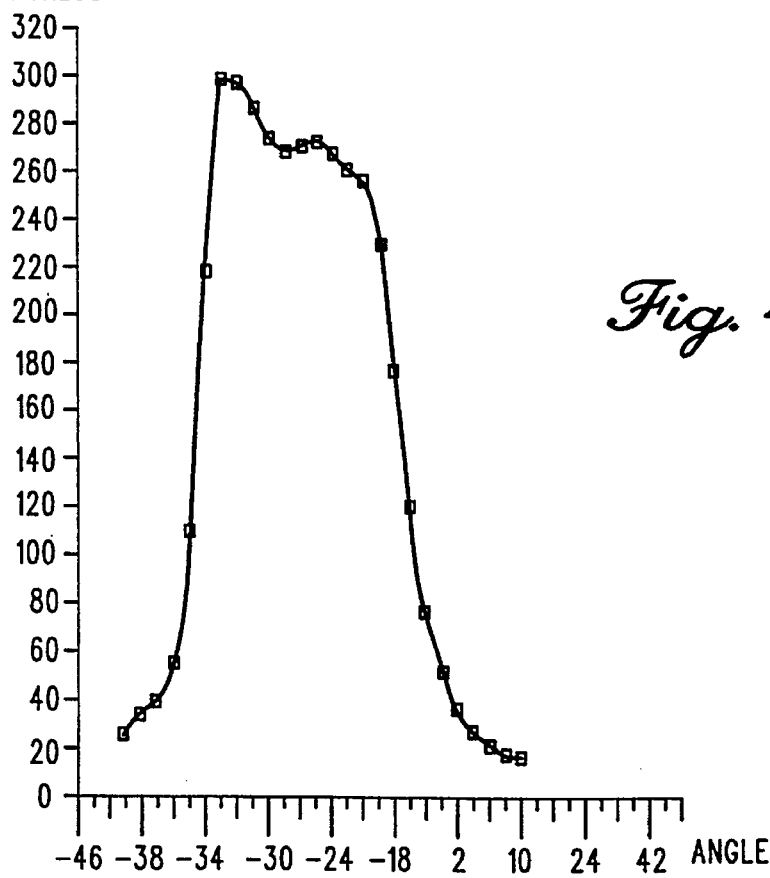
FIG. 4G illustrates an example asymmetrical output distribution, measured using curved facets; FWHM=26 degrees.
Figure 4H:
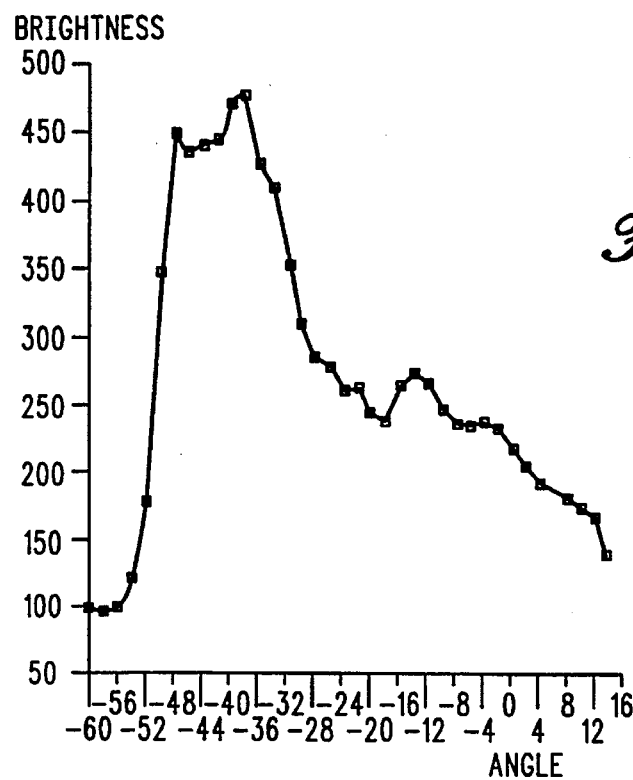
FIG. 4H illustrates an example of a bimodal output distribution, measured using one faceted reflecting layer and one faceted refractive layer.
Figure 4J:
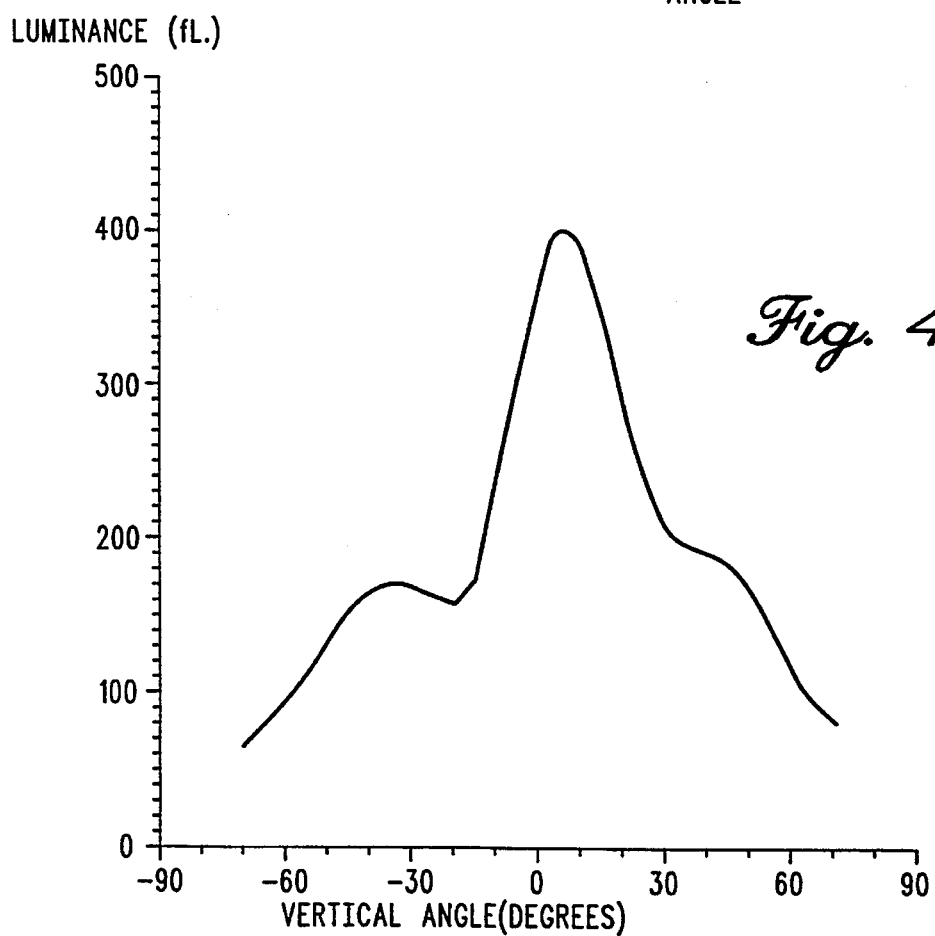
FIG. 4A shows calculated brightness performance over angle for an asymmetric range of angles of illumination.
FIG. 4I illustrates an example of an output distribution with large "tails", measured using a diffuse reflective bottom redirecting layer and a refracting/internally-reflecting top redirecting layer.

Examples of brightness distribution over various ranges of angular output using a curved-faceted reflector are illustrated in FIGS. 4A–4C, 4F and 4G. FIGS. 4C and 4E shows the brightness distribution in the case of a reflector having linear facets, and further including a diffuser element 40 (shown in phantom in FIG. 2C). The predicted performance output is shown for the various angular ranges (see FIGS. 4A–4C) and compared with the measured angular output of light for a commercially available source (labeled "Wedge"), such as a "Wedge Light" unit, a trademark of Display Engineering. The preferred angular range can readily be modified to accommodate any particular viewing and collimation requirements up to the minimum angle $\Delta\theta$ (air) described hereinbefore by the equation in terms $\phi$, $n_1$, $n_2$ and $n_3$. This modification can be accomplished by progressively changing the curvature of the curved facets 36 in the manner shown in FIG. 2M and discussed hereinbefore. In addition to the illustrated control of the vertical viewing angular range, modification of the horizontal viewing range can also be accomplished by appropriate changes of the shape of the curved facets 36. The above described angular distributions shown in FIGS. 4A–4I are representative when the device 10 is processing the light 24 within the numerical aperture $NA=(n_1^2-n_2^2)^{1/2}$. When light is outside this range, additional techniques can be applied to help control the angular output range.

FIGS. 9A and 9B further illustrate the use of redirecting means to provide a tightly overlapping focused illumination output and a less overlapping focused illumination output, respectively. These concepts can be applied practically by considering that a typical portable computer screen 87 has a vertical extent "V" of about 150 mm, while a typical viewing distance, "D", is 500 mm. A viewer at distance "D", positioned normal to the vertical center of the computer screen 87 will view different areas of the screen 87 at angles ranging from −8.5° measured at the top of the screen 87 to +8.5° measured at the bottom of the screen 87. This variation in viewing angle can, however, cause undesirable effects in use of a system having such screen illumination. Such a limited illumination angle for the screen 87 implies a limited range of positions from which a viewer can see a fully illuminated screen 87 (see FIG. 9A). Defining the viewer position in terms of the angle and distance from the center of the screen 87, then the effective angular range is substantially reduced below the nominal illumination angle. For example, if the nominal illumination range is ±20° measured at each individual facet, then the effective viewing range is reduced to ±12° in the typical flat panel illuminator shown in FIG. 9A. The resulting illumination between 12°–20°, either side of center for the screen 87, will appear to be nonuniform to the viewer.

The invention herein can be used to overcome the above described nonuniformities by controlling the orientation of the faceted surface 34. As illustrated, for example, in FIG. 2M both surfaces of the facets are rotated progressively such that the flat facet surface is varied from 35.6° to 33.3° relative to, or parallel to, the edges of the planes defining the various layers of the device 10. This systematic variation from the top to the bottom of screen 89 (see FIG. 9B) results in the redirected output illustrated. The faceted surface 34 can further be combined with the diffuser 83 and the like to produce a variable, but controllable light illumination output distribution. A flat faceted surface 168 can further be combined with a diffuser 170. Therefore, as shown in FIG. 9B the ability to rotate the angular distributions of light at different points on the screen 89 enable compensation for the variation in viewing angle with position. Systematic variations in the faceted surface 34 can further include variations in one or more facet angles, the spacing of the facets 38, or the depth and width of the individual facets 38. In other embodiments, the same principles can be applied to focus the output of any faceted redirecting layer. Examples are shown in FIGS. 2I and 2L.

In another example of overcoming nonuniformities of illumination, an array of micro-prisms for the faceted surface 34 can be laid over a conventional diffuse backlight 101 (see FIG. 18A). This faceted surface 34 operates by a combination of refraction and total internal reflection to permit only a limited angular range to be output through the layer into ambient. This angular range depends on the facet angles. For the case of acrylic film (n=1.49), highest brightness is typically achieved with a prism included angle of 90–100 degrees, resulting in a viewing angle of approximately ±35 degrees. Backlights using such a geometry show a sharp "curtaining" effect which is disconcerting to many viewers. This effect can be ameliorated by rotating the facets 38 from top to bottom of the screen to produce a focusing effect (see FIG. 18B). Simple ray-tracing shows that, for included angles in the range of 100°–110°, a facet rotated by an angle $\theta$ will produce an angular distribution rotated by approximately $\theta/2$. In the embodiment shown in FIG. 18 the progressive variation of facet face angle can vary as position $\chi$ along the faceted surface 34 wherein, for example:

$$\psi_1 = 35° - (0.133°/mm) \cdot \chi$$

$$\psi_2 = 35° + (0.133°/mm) \cdot \chi$$

This progressive facet angle change will produce an angular distribution which varies by approximately ten degrees across the screen 89, and satisfies the generic constraints outlined above.

Whatever the desired facet shapes, the faceted surface 34 (see, FIG. 2D) is preferably formed by a conventional process such as molding or other known milling processes. Details of manufacture will be described hereinafter: Nonlinear Wedges.

In another form of the invention the wedge layer 12, which is the primary lightguide, can be other than the linear shape assumed hereinbefore. These shapes allow achievement of a wide variety of selected light distributions. Other shapes can be more generally described in terms of the thickness of the wedge layer 12 as a function of the wedge axis "z" shown in FIGS. 2B and C (the coordinate axis which runs from the light input edge to the small or sharp edge 26). For the linear shaped wedge, $$A(z) = A_o - C \cdot z \tag{1}$$

$A_o$=maximum wedge thickness (see FIG. 2A)

$C$=constant=$\tan \phi$

A large range of desired spatial and angular distributions can be achieved for the light output power (power coupled to the second layer 30). This light output power is thus the light available for output to the ambient by the appropriately faceted surfaces 34 or 36, or even by the diffuse reflector 33 (see FIG. 2E) or other means.

For example, if L and M are direction cosines along the x and y axes, respectively, then $L_o$ and $M_o$ are the values of L and M at the thick edge (z=0). This initial distribution is Lambertian within some well-defined angular range, with little or no light outside that range. This distribution is especially important because ideal non-imaging optical elements have limited Lambertian output distributions. The key relationship is the adiabatic invariant, $A(z)\cos(\theta_c)$ which is approximately equal to $A_0 L_0$ and which implicitly gives the position (z) of escape. To illustrate this concept, suppose we desire uniform irradiance so that dP/dz=constant. Suppose further that the initial phase space uniformly fills an elliptical area described by the following expression:

$$L_o^2/\sigma^2 + M_o^2/\tau^2 = 1 \qquad (2)$$

where $\tau$ is the dimension of an ellipse along the M axis and $\sigma$ is the dimension of the ellipse along the L axis.

Then, $dP/dL = \text{const} \cdot [1-L^2/\sigma^2]^{1/2}$ but $dA/dz = [A_o L_c] \, dL_o/dZ$ where $L_c = \cos\theta c$. Therefore, $[1-(L_c A)^2/(A_o \sigma)^2]^{1/2}$ dA=constant times dz. Suppose $\sigma = L_c$ in the preferred embodiment. This result can be interpreted by the substitution $A/A_0 = \sin u$, so that $A = A_0 \sin u$ and $u + \frac{1}{2} \sin(2u) = (\pi/2)(1-z/D)$ where D is the length of the wedge layer 12.

If the desired power per unit length is dP/dz, more generally, then the desired shape of the wedge layer 12 is determined by the differential equation:

$$dA(z)/dz = \frac{-dP/dz(A_o/[1-(n_2/n_1)^2]^{1/2})}{dP/dL_o} \qquad (3)$$

Note that in all these cases the output distribution has only approximately the desired form because it is modified by Fresnel reflections. Note also that even when the wedge device 10 is curved, if the curvature is not too large, it may still be useful to define an average angle $\phi$ which qualitatively characterizes the system.

In another aspect of the invention the geometry of the above examples has an x,y interface between two refractive media with indices $n_1$ and $n_2$. The components nM, nN are conserved across the interface so that $n_1 M_1 = n_2 M_2$, $n_1 N_1 = n_2 M_2$. The angle of incidence projected in the x,z plane is given by $\sin \theta_{eff} = N/(L^2-N^2)^{1/2}$. Then using the above relations, $\sin \theta_{2eff}/\sin \theta_{1\ eff} = (n_1/n_2)[1-M_1^2]^{1/2}[1-(n_1/n_2)^2 M_1^2]^{1/2} = (n_1/n_2)_{eff}$. For example, for $n_1=1.49$, $n_2=1.35$, $M_1=0.5$, the effective index ratio is $1.035(n_1/n_2)$, which is only slightly larger than the actual index ratio.

Variation of Index of Refraction Over Spatial Parameters.

In the general case of tapered light guides, the wedge layer 12 is generally along the z axis with the narrow dimension along the x axis (see, for example, FIG. 2A). If we introduce optical direction cosines (nL,nM,nM) where L,M,N are geometric direction cosines along x,y,z, then n is the refractive index which may vary with spatial position. For guided rays in the wedge layer 12, the motion in x is almost periodic, and the quantity $\phi$nLdx for one period is almost constant as the ray propagates along z. This property is called adiabatic invariance and provides a useful framework for analyzing the lightguide properties.

In a first example the wedge device 10 shown in FIG. 2A has a uniform index in the wedge layer 12 and is linearly tapered in z with width $A(z)=A_0-C \cdot z$. Then, along the zigzag ray path, L(z)A(z) is approximately equal to a constant by adiabatic invariance. If a ray starts at z=0 with $L=L_0$, then $(A_0-C \cdot z)L(z)$ is approximately equal to $L_0 A_0$. The ray will leak out of the wedge layer 12 when $L=\cos\theta_c$ where $\theta_c$ is the critical angle $=[1-(n_2/n_1)^2]^{1/2}$. Thus, the condition for leaving the wedge layer 12 is $A_0-C \cdot z = L_0 A_0/\cos\theta_c$. This will occur at $z=(A_0/C)(1-L_0/\cos\theta c)$. Consequently, the density of rays emerging in z is proportional to the density of rays in the initial direction cosine $L_0$. For example, the density will be uniform if the initial distribution in $L_0$ is uniform.

In a second example, the index profile is no longer uniform but falls off both in x and in z. If the fall-off in z is much slower than in x, the light ray path is still almost periodic, and the above adiabatic invariance still applies. Then, as the light ray 24 propagates in z, the path in x,nL space is almost periodic. Therefore the maximum value of L(z) increases and at some z may reach the critical value for escape. The z value for escape depends on the details of the index (n) profile. When this is specified, the analysis proceeds as in example one above. Thus, for a parabolic index profile, the index profile has the form $n^2(x)=n^2_0[1-2\Delta(x/\rho)^2]$ for $-\rho < x \rho$, $=n_1^2=n^2_0[1-2\Delta]$ for $|x|>\rho$. Then, the critical angle at x=0 is still given by $\sin^2 \sigma_c = 2\Delta = 1-(n_1/n_0)^2$. Then, if we have $n_0$ a slowly decreasing function of z, the slope $\theta$ at x=0 will slowly increase by the adiabatic invariance of $\phi$nLdx, while $\theta_c$ decreases so that light rays will escape. The details of the light ray distributions will depend on how the index (n) varies with z.

Nonwedge Tapered Geometries

In the most general case the light can be input into any shape layer (e.g., parallelepiped, cylinder or non-uniform wedge), and the principles described herein apply in the same manner, In addition, the index of refraction can be varied as desired in (x,y,z) to achieve the appropriate end result when coupled to means to output light to ambient.

Figure 5A:
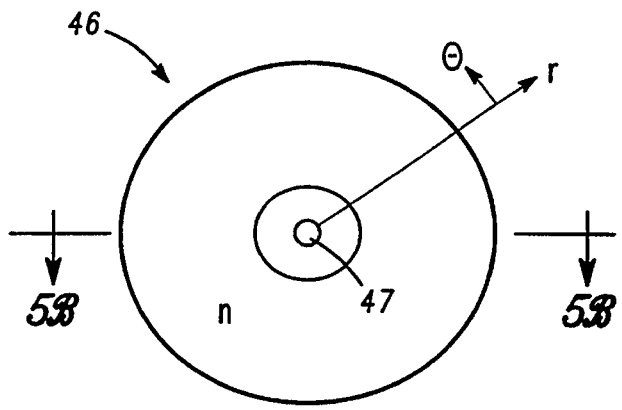
FIG. 5A shows a top view of a disc shaped light guide and FIG. 5B illustrates a cross section taken along 5B—5B in FIG. 5A.
Figure 5B:
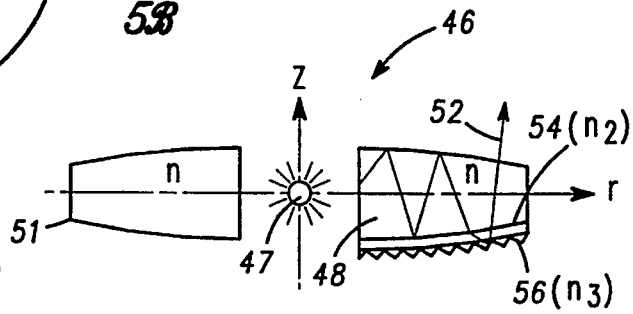

For example, consider a disc-shaped light guide 46 which is tapered in the radial direction r shown in FIG. 5. The direction cosines in cylindrical polar coordinates are $k_r$, $k_\theta$, $k_z$. Light 48 propagating in this guide 46 satisfies the relationship:

$$\phi n k_z dz \sim \text{constant. (adiabatic invariance)} \qquad (4)$$

$$nrk_{74} = \text{constant. (angular momentum conservation)} \qquad (5)$$

The adiabatic invariance condition is identical with that for the wedge device 10, and the previous discussions pertinent to the wedge device 10 also thus apply to the light guide 46. The angular momentum conservation condition requires that as the light streams outward from source 47 with increasing radius, the $k_{74}$ value decreases. Therefore, the light becomes collimated in the increasing radial direction. This makes the properties fundamentally like the wedge device 10, and the light 48 can be made to emerge as light 52 at a selected angle to face 51, collimated along the z direction.

For purposes of illustration we take the guide material to have a constant index of refraction n. For such geometries the light rays 48 along the two-dimensional cross sectional plane taken along 5B—5B behave just as in the case of the wedge device 10 counterpart described hereinbefore. Similarly, various additional layers 54 and 56 and other means can be used to achieve the desired light handling features. For example, for the disc light guide 46 a preferred facet array 56 is a series of circles, concentric with the disk 46. Thus, if the facets 56 are linear in cross section, the light rays 52 will emerge in a direction collimated within a full angle of 2 $\phi$ times a function of the indices of refraction as in the device 10 described hereinbefore.

Tapered Luminaires with Two Low-index Layers.

Figure 6A:
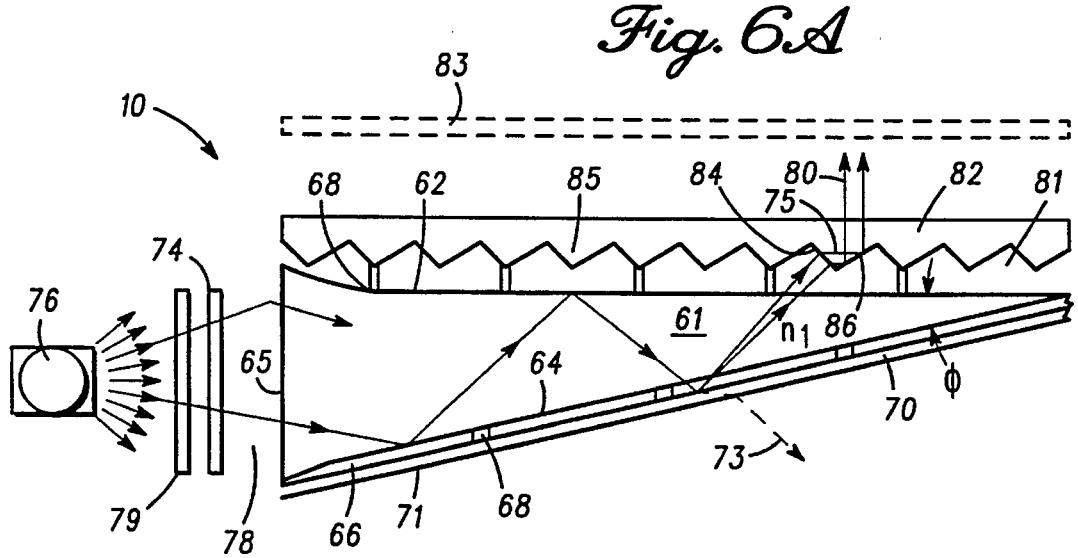
FIG. 6A shows a cross sectional view of a multilayer tapered luminaire device with an air gap layer included.

In another form of the invention shown in FIG. 6A, the device 10 includes a first layer 61 having an optical index of refraction $n_1$ and a first or top layer surface 62 and a second or bottom layer surface 64 converging to establish at least one angle of inclination φ. The first layer 61 also includes a back surface 65 spanning the top layer surface 62 and the bottom layer surface 64.

Adjacent the first layer 61 is layer means, such as a bottom transparent layer means, like a first intermediate layer 66 of index $n_2$ disposed adjacent to, or underlying, the bottom layer surface 64. In addition, the layer means can embody a top transparent layer means, second intermediate layer 81 of index $n_2$ disposed adjacent to the top layer surface 62. At least one of the layers 66 and 81 can be an air gap, or other gas or a transparent dielectric gap.

An air gap can be established by conventional means, such as by external supports, such as suspending the layers under tension (not shown) or by positioning spacers 68 between the first layer 61 and the adjacent light redirecting layer 70. Likewise, the spacers 68 can be positioned between the first layer 61 and the second light redirecting layer 82. Alternatively, solid materials can be used for the transparent dielectric to constitute layers 66 and 81 and can improve structural integrity, robustness and ease of assembly. Such solid materials can include, for example, sol-gels ($n_2$= 1.05–1.35), fluoropolymers ($n_2$=1.28–1.43), fluoride salts ($n_2$=1.38–1.43), or silicone-based polymers and adhesives ($n_2$=1.40–1.45). Such solid materials for the transparent dielectric need no separate means to support or maintain it, but can result in lower N.A. acceptance since the index is higher than for an air gap.

The layers 66 and 81 allow transmission of light received from the first layer 61. In this embodiment, part of the light will achieve $\theta_c$ first relative to the top layer surface 62, and light will enter the layer 81 for further processing by the light redirecting layer 82. The remaining light will thereby achieve $\theta_c$ first relative to the bottom layer surface 64, thus entering the layer 66 for further processing by the light redirecting layer 70.

In one preferred form of the invention (see FIG. 6A) both the layers 66 and 81 are present and can have similar, but significantly different indices $n_{2a}$ and $n_{2b}$, respectively. The indices are considered similar when they establish critical angles at the interfaces 62 and 64 which are similar in magnitude to the wedge angle φ, for example:

$$|\arcsin(n_{2a}/n_1) - \arcsin(n_{2b}/n_1)| 6\phi \tag{6}$$

In this case significant, but unequal, fractions of light will enter each of the layers 66 and 81 for further processing by redirecting layers 70 and 82, respectively. The larger fraction will enter the layer having the higher of the two indices $n_{2a}$ and $n_{2b}$. The redirecting layer 70 processes only the fraction which enters the layer 66. Therefore, the influence of the redirecting layer 70 on the output angular distribution of light can be changed by varying the relationship between the indices $n_{2a}$ and $n_{2b}$.

In another preferred form of the invention the layers 66 and 81 can be the same transparent material of index $n_2 < n_1$. In general, lower values of $n_2$ will enhance the efficiency of the device 10 by increasing the numerical aperture at the light input surface 65. Therefore, collection efficiency can be maximized when the layers 66 and 81 are gaps filled with air or other gases (with $n_2$=1–1.01).

Figure 12A:
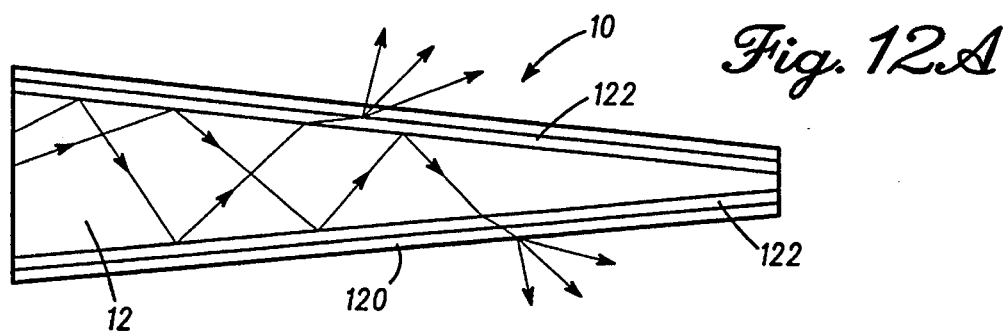
FIG. 12A illustrates a wedge shaped luminaire having a pair of diffraction gratings or hologram layers.
Figure 12B:
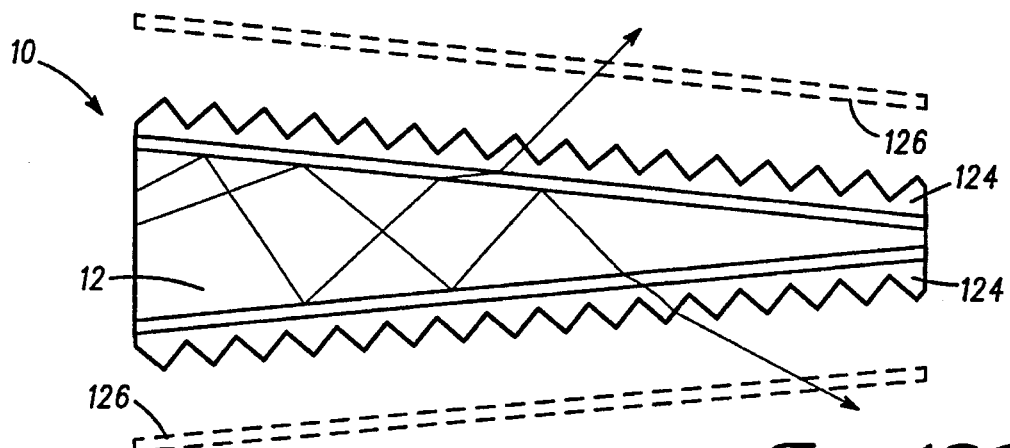
FIG. 12B shows a wedge shaped luminaire with a pair of refracting facet layers and diffusers.
Figure 12C:
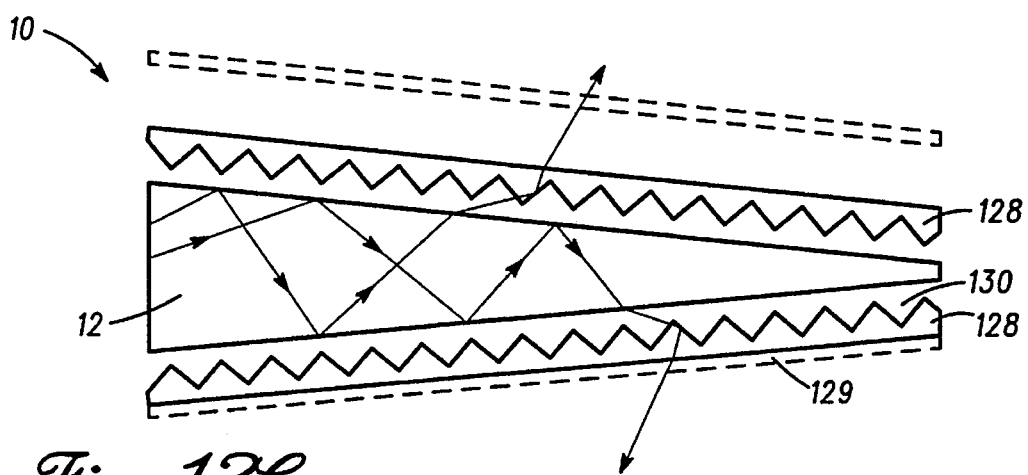
FIG. 12C illustrates a wedge shaped luminaire with a pair of faceted layers.
Figure 12D:
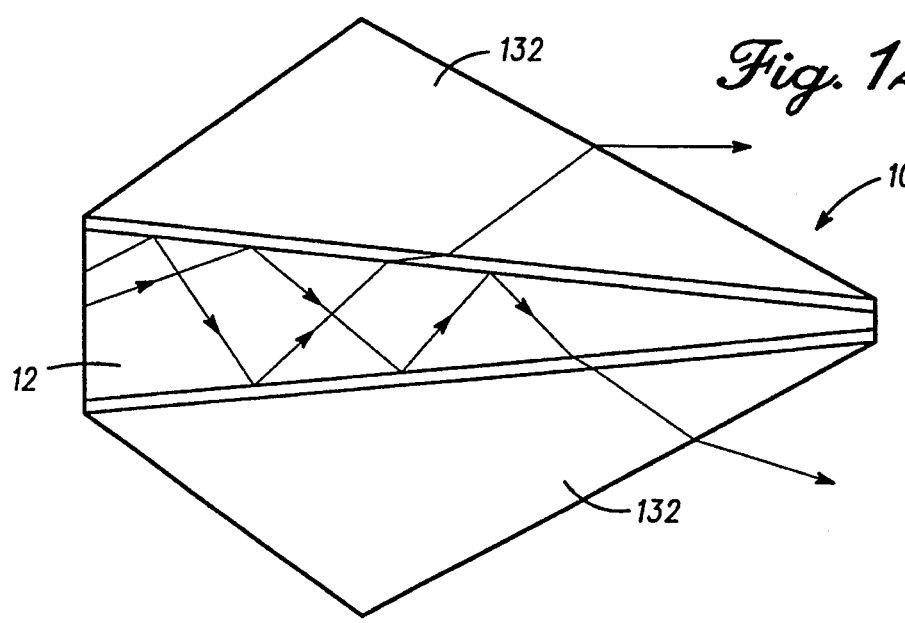
FIG. 12D shows a wedge shaped luminaire with two refracting single facet layers.

The thickness of the layers 66 and 81 can be selectively varied to control the output power spatial distribution of the device 10 or to enhance its visual uniformity. For example, increasing the thickness of the layer 81 by 0.002"–0.030" sharply reduces non-uniformities which tend to appear at the thicker end of the device 10. The thickness of layers 66 and 81 can also be smoothly varied with position to influence a desired spatial distribution of the light being output (see FIG. 12L).

In one preferred form of the invention shown in FIG. 6A, the light redirecting layer 70 includes a reflective layer 71 which reflects the light back through the layer 66 and the first layer 61. The light is then output into the first layer 61 through the top layer surface 62, and ultimately through the light redirecting layer 82 for further processing. The reflective layer 71 can, for example, be any combination of a planar specular reflector, a partially or completely diffuse reflector, or a faceted reflector.

Use of a planar specular reflector leads to the narrowest angular distribution within the layer 81. Therefore, the reflector can simplify design of the light redirecting layer 82 when the desired output angular distribution is unimodal. Diffuse or faceted reflectors can also be used for the layer 71 in order to achieve a large range of angular distributions (see FIGS. 4H and I) or to increase uniformity (see FIG. 4N). Diffuse reflectors are preferred if the desired angular distribution has large "tails" (see, in particular, FIG. 4I). Faceted reflectors can produce a bimodal angular distribution within the layer 81 (see FIG. 4H). Therefore, such faceted reflectors are preferred if the desired output angular distribution is bimodal. For example, a bimodal "batwing" distribution is preferred from luminaires for room illumination because it reduces glare.

In general each facet of the layer 71 can be shaped to control the angular distribution of the light reflected back through the layer 66 and the first layer 61 for further processing by the redirecting layer 82. The angular distribution within the device 10 will in turn influence the angular distribution of the light output into ambient from the redirecting layer 82. For example, curved facets can be used to smoothly broaden the angular distribution, as well as providing a diffusing effect to improve uniformity. The reflective layer 71 can also influence the output power spatial distribution as well as the angular distribution. The reflectivity, specularity, or geometry of the reflective layer 71 can be varied with position to achieve a desired output distribution. For example, as described hereinbefore, small variations in the slope (see FIG. 12L) of each element of the reflective layer 71 as a function of position significantly change the light output distribution.

The light redirecting layer 82 has an index $n_3 > n_2$, and is substantially transparent or translucent. The light in the low-index layer 81 enters the layer 82 and is redirected into ambient. The transmissive redirecting layer 82 also redirects the light which has been processed by reflection from the redirecting layer 71 then transmitted back through the low-index layer 66 and the first layer 61. The transparency or geometry of the layer 82 can be varied with position to further influence the output spatial distribution of the device 10. In one preferred form of the invention the redirecting layer 82 includes a faceted surface at the interface with the low-index layer 81, as shown in FIG. 6A. Light entering the layer 82 is refracted by one side 84 of each facet 85 as it enters, and then is totally internally reflected by second side 86 of each of the facets 85. In one form of the invention the redirecting layer 82 can be a "Transparent Right-Angle Film" (hereinafter, TRAF), which is a trademark of 3M Corp., and this product is commercially available from 3M Corp. This TRAF operates by refraction and total internal reflection to turn incident light through approximately a ninety degree angle, as would be desired in a typical LCD backlighting application. The acceptance angle of the prior art TRAF is about twenty-one degrees, which is large enough to redirect a large fraction of light 75 which enters the low-index layer 81. In a more preferred form of the invention, the facet angles are chosen to redirect more of the light 75 which enters the low-index layer 81 by the described mechanism of refraction plus total internal reflection. Either one or both of the facet surfaces 84 and 86 can be shaped to control the output angular distribution. For example, the use of curved facets smoothly broadens the distribution, as well as providing a light diffusing effect which can improve uniformity.

Figure 12E:
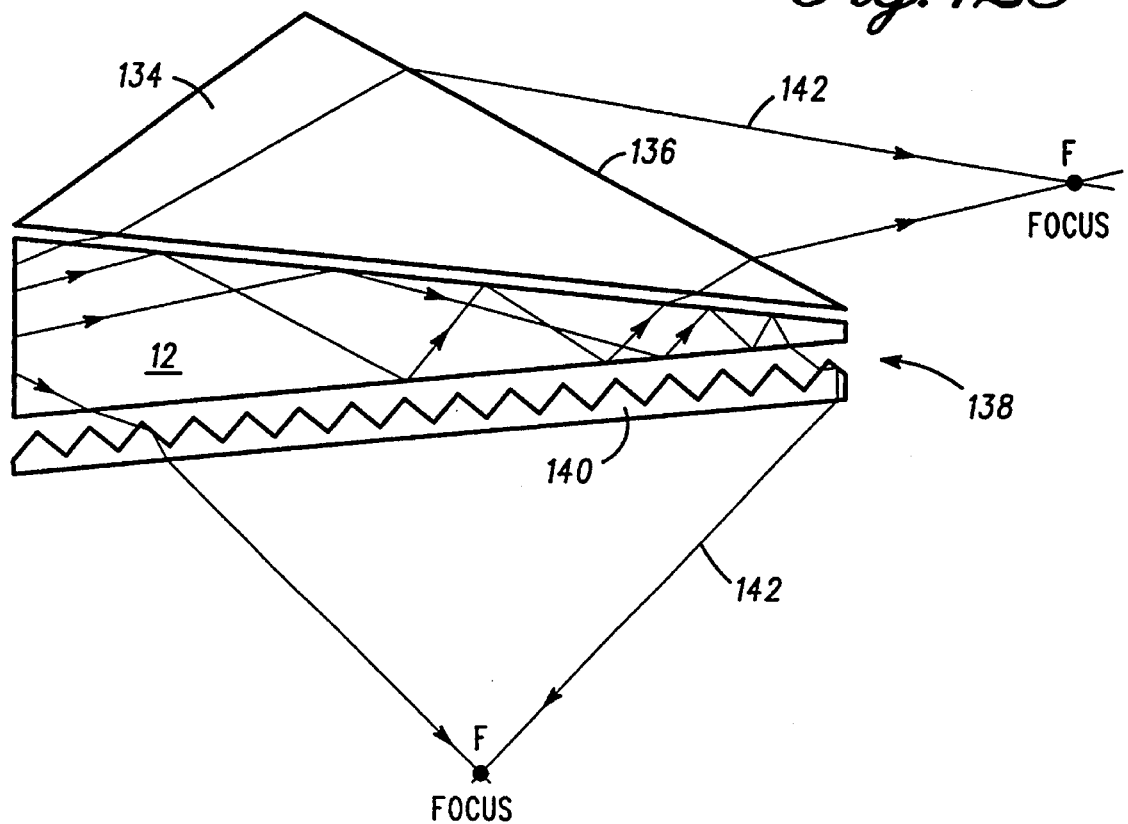
FIG. 12E illustrates a wedge shaped luminaire with a refracting single facet layer and a bottom surface redirecting layer.
Figure 12F:
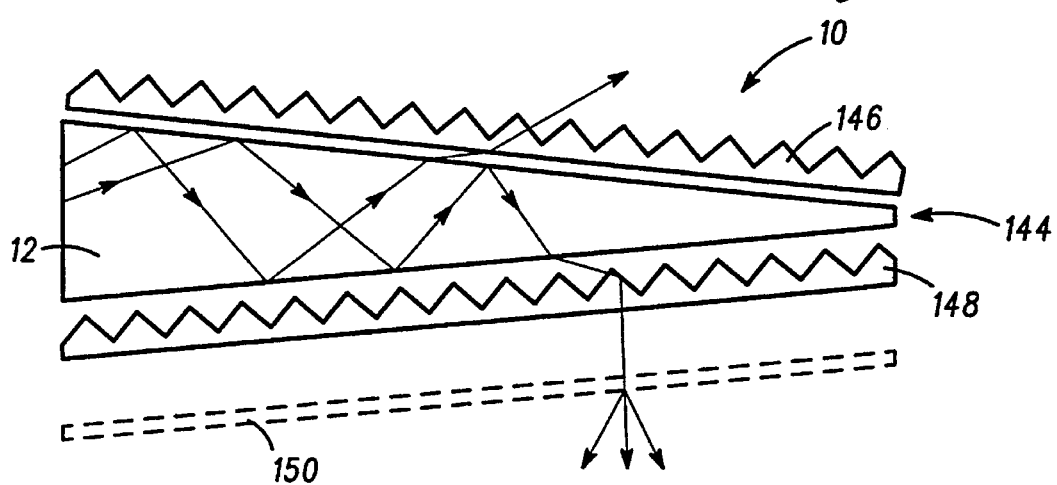
FIG. 12F shows a luminaire with a top surface redirecting layer of a refracting faceted layer and a bottom surface refracting and internally reflecting layer.
Figure 12G:
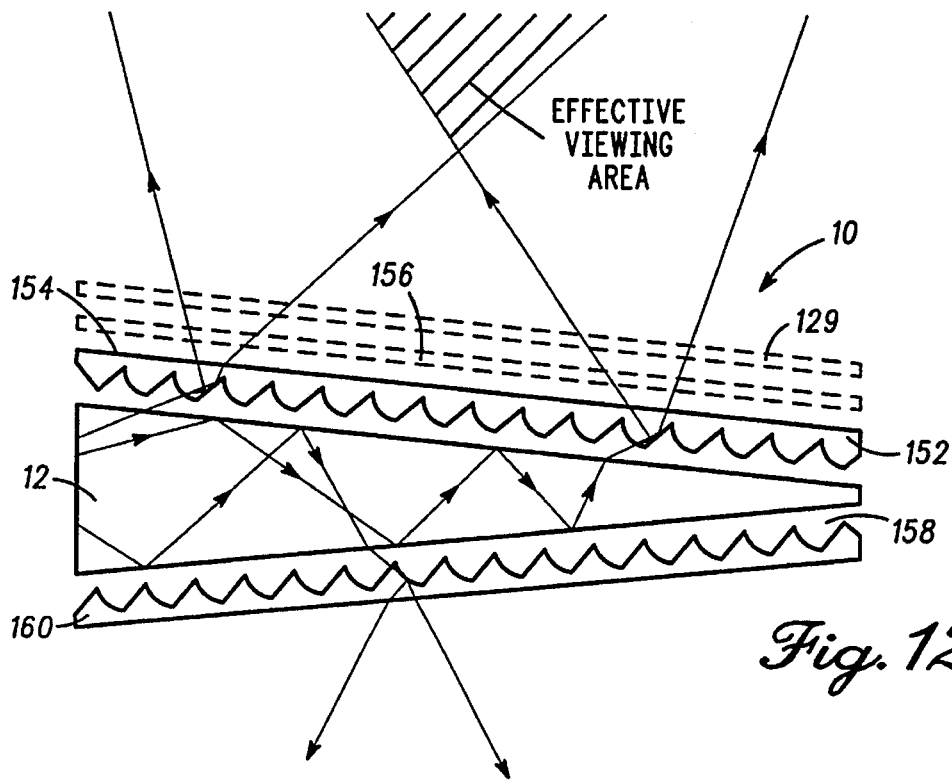
FIG. 12G illustrates a luminaire with a top surface refracting/internally reflecting faceted layer and a bottom surface refracting/internally reflecting faceted layer.

In another preferred embodiment, the facet angle surfaces of the redirecting layer 82 can be varied progressively to compensate for the variation in viewing angle with position, when viewed from typical viewing distances. The details of such a compensation effect were described earlier in reference to the design of the reflecting facet layer in the embodiment shown in FIG. 2M. Similar principles can be applied to the design of any faceted redirecting layer, including refracting layers and refracting/internally-reflecting layers. Examples of embodiments which can, for example, make use of such progressively varied faceted layers are shown in FIGS. 12E (layer 140), 12G (layer 152), 12H (layer 166), 12K (layer 186), 12N (layer 210), 12O (layer 228), and 12P (layer 246).

In another form of invention the layers 66 and 81 can have similar but slightly different indices $n_2$ and $n_2'$, respectively. The operating principles of the device 10 will be substantially similar as long as the critical angles associated with interfaces between the first layer 61 and the two layers 66 and 81 do not differ by more than the first layer convergence angle:

$$|\arcsin(n_2'/n_1) - \arcsin(n_2/n_1)| < \phi \qquad (7)$$

Therefore, in this case approximately equal fractions of the light will enter layers 66 and 81, for further processing by the redirecting layers 70 and 82, respectively.

All forms of the invention can further include an output diffuser layer 40, shown in phantom in FIG. 2C or transmissive or translucent diffuser layer 83 shown in FIG. 6A. In general this diffuser layer 40 can be a surface diffuser, a volume diffuser, or at least one array of micro lenses having at least a section of a cylinder (known as a "lenticular array"). These layers 40 and 83 can increase light uniformity or broaden the angular distribution into ambient. Lenticular arrays are advantageous because they have low back-scattering in comparison to surface or volume diffusers, and because they have sharper output angle cut-offs when illuminated by collimated light. Lenticular arrays also preferentially diffuse only those features which would otherwise run in the general direction of the axis of each cylindrical micro lens.

Figure 10:
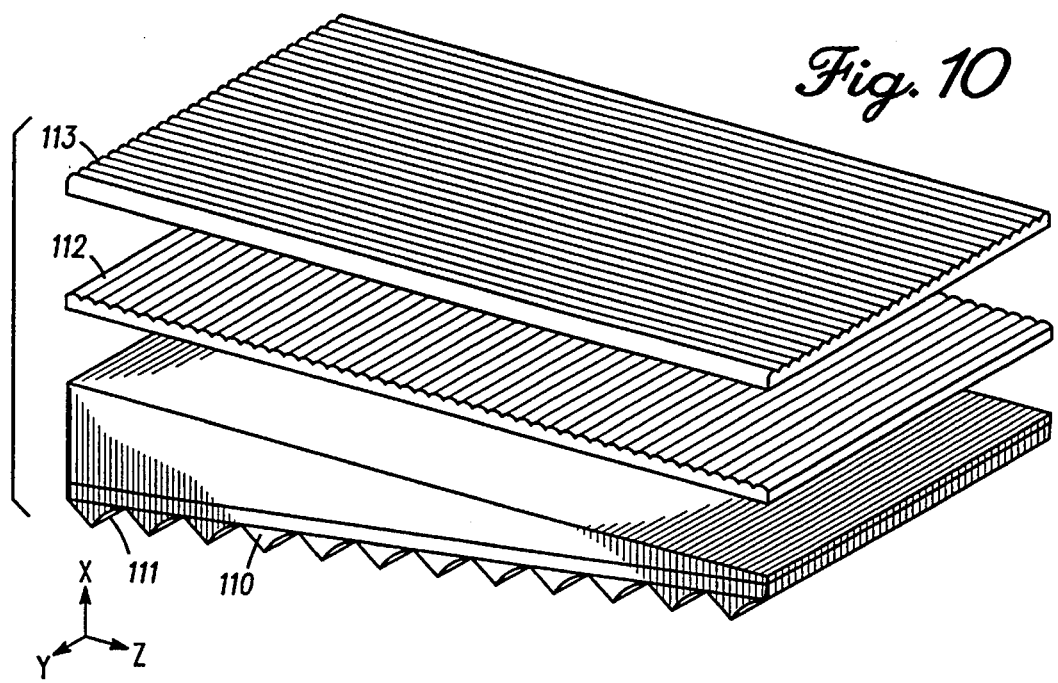
FIG. 10 illustrates one form of pair of lenticular arrays of a luminaire.

In one preferred embodiment shown in FIG. 10, the light redirecting layer 10 makes use of flat facets 111 such that the output light is highly collimated. The desired output angular distribution is further controlled by including a lenticular diffuser 112 having an appropriate focal ratio, with its cylindrical micro lenses running approximately parallel to the y-axis. The lenticular diffuser 112 also diffuses non-uniformities which would otherwise appear to be running in the general direction of the y-axis. In this embodiment a second lenticular diffuser 113 can be included to diffuse non-uniformities which would otherwise appear running in the general direction of the z-axis. This second lenticular diffuser's micro lenses run approximately parallel to the z-axis (see FIGS. 12H and 12N). Note that the order of positioning of the diffusers 112 and 113 can be interchanged without loss of optical advantage. Similarly, the lenticular diffuser 112 and 113 can be inverted and can have concave contours rather than convex contours shown in FIG. 10. While such changes can affect the details of the performance, the diffuser layers 112 and 113 can still provide the general advantages described.

Figure 11:
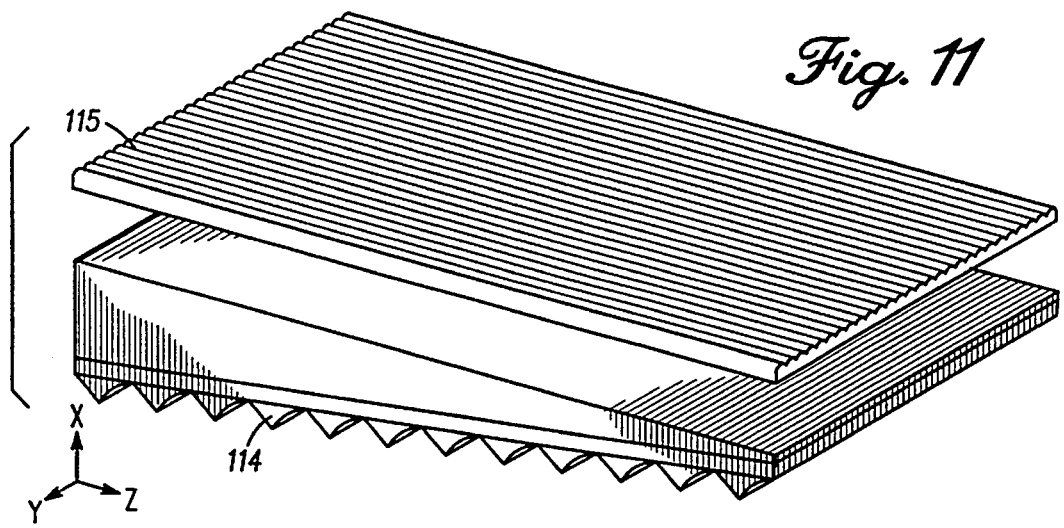
FIG. 11 illustrates a lenticular diffuser array and curved facet layer of a luminaire.

In another preferred embodiment shown in FIG. 11, the functions of the flat-faceted light redirecting layer 110 and the parallel lenticular diffuser 112 in FIG. 10 can both be performed by a light redirecting layer 114 having curved facets (see also, for example, FIGS. 2H, 2M and 3A illustrating curved facets). These curved-facet layers redirect the light, control the angular output by having an appropriate facet curvature, and act as a diffuser for non-uniformities running in the general direction of the y-axis. By combining these functions in a single-layer the number of components is reduced, which improves thickness, cost, and manufacturability. In this embodiment, a single lenticular diffuser 115 can be included to diffuse the remaining non-uniformities which would otherwise appear running in the general direction of the z-axis. This type of lenticular diffuser micro lens runs approximately parallel to the z-axis. Note that the lenticular diffuser 115 can be inverted and can have concave contours rather than the convex contours shown in FIG. 10. Again, such changes can affect performance details, but the layers 114 and 115 perform as intended.

In all embodiments using multiple micro-structured layers, the facet or lenslet spacings of these layers described hereinbefore can be chosen to have non-rational ratios, in order to avoid undesirable Moiré patterns. Similarly, each layer's feature spacing can be designed to have non-rational ratios with the apparatus to be illuminated, such as a liquid crystal display or charge-coupled detector (CCD) array. Each of the lenticular diffuser layers 113, 112 and 115 can be tilted up to about 20° from the configuration shown in the figures in order to reduce Moiré interaction between layers or with a liquid crystal display.

Similar lenticular diffusers can be used with non-wedge geometries having wedge shaped cross-sections, with similar advantages if the diffuser cross sections are approximately as shown in FIGS. 10 and 11. One example is the tapered disk illustrated in FIG. 5. In this case the lenticular diffuser analogous to layer 112 in FIG. 10 would have micro lenses whose axes run in concentric circles about the disk's axis of rotations. A diffuser analogous to the layer 113 in FIG. 10 and 115 in FIG. 11 would have micro lenses whose axes emanate radially from the disk's central axis.

Light Sources and Couplers

In a more preferred form of the invention shown in FIGS. 2A and B, a faceted layer 30 has been included for optically redirecting the light. The facets 34 can be integral to the layer 30 or a separate facet layer. Details of operation of such a faceted layer have been discussed hereinbefore. As shown further in FIG. 6A an input faceted layer 74 can also be disposed between a light source 76 and the first layer 61. The faceted layer 74 can be a prismatic facet array which provides a collimating effect for input light 78 which provides brighter or more uniform output light 80 into ambient.

Linear prisms parallel to the y-axis can improve uniformity by adjusting the input angular distribution to match more closely the input numerical aperture. Linear prisms parallel to the x-axis can limit the output transverse angular distribution, and also improve output brightness when used with a fluorescent lamp light source. In other forms of the invention, diffusion of input light is desirable wherein a diffuser 79 is used to diffuse the light distribution to spread out the light to improve light uniformity. The diffuser 79 is preferably a lenticular array, with cylindrical lenslets parallel to the y-axis. The diffuser 79 can also be a standard surface or volume diffuser, and can be a discrete film or coupled integrally to the wedge layer 61. Multiple prismatic or diffuser films can be used in combination. Such a film form of the diffuser 79 and the faceted film 74 can be interchanged in position to vary their effects.

In another preferred form of the invention, a portion of a dielectric total internally reflecting CPC portion 100 (compound parabolic concentrator) can be interposed between the light source 76 and the first layer 61 (see FIGS. 2L, 12O and 12P). The CPC portion 100 adjusts the input light to match more closely the input numerical aperture. The CPC portion 100 is preferably formed integrally with the first layer 61.

Reflector elements 92 and 94 shown in FIGS. 7 and 8, respectively, can be shaped and positioned to maximize the throughput of light from the light source 76 to the light-pipe aperture. This is equivalent to minimizing the reflection of light back to the light source 76, which partially absorbs any returned light. The light source 76 is typically cylindrical and is surrounded by a transparent glass envelope 93, each having circular cross-sections as shown in FIGS. 7 and 8. Typical examples of such light sources include fluorescent robes and long-filament incandescent lamps. The outer diameter of the light source 76 can be less than or equal to the inner diameter of the glass envelope 93. FIG. 7 shows a prior art U-shaped reflector 92 formed by wrapping a specular reflectorized polymer film around the light source 76 and making contact with the wedge layer 12 at each end of the film. The reflector element 92 typically is formed into a shape which is approximately an arc of a circle on the side of the light source 76 opposite the wedge layer 12, with approximately straight sections connecting each end-point of the arc with the wedge layer 12. This manner of coupling the reflector element 92 to the wedge layer 12 is most easily accomplished when the reflector element cross-section lacks sharp corners. In general the light source 76 is not permitted to touch either the wedge layer 12 or the reflectorized film, in order to minimize thermal and electrical coupling which can reduce lamp efficiency.

In one form of the present invention shown in FIG. 8, the reflector element 94 is advantageously designed and the light source 76 is advantageously placed to minimize the fraction of light returned to the light source 76, and thereby increases efficiency. In one preferred embodiment, at least a section of the reflector element 94 is shaped such that a line drawn normal to the surface of the reflector element 94 at each point is tangent to the circular cross-section of the light source 76. The resulting reflector shape is known as an involute of the light source 76.

While an involute provides maximum efficiency, other shapes can generally be more easily manufactured. Polymer films can be readily bent into smooth curves which include almost semicircular arcs, as described above. It can be shown that when the cross-section of the light source 76 and semicircular section of the reflector element 92 are concentric as shown in FIG. 7, then the semicircular section of the reflector element 92 will return all incident rays to the light source 76, leading to poor efficiency. Such inefficiency is a general property of self-absorbing circular sources and concentric semicircular reflectors. This general property can be derived from simple ray-tracing or the principal of skew invariance. Even if the reflector element 92 is not perfectly circular, each portion of the reflector element 92 will tend to return light to the light source 76 if the cross-section of the light source 76 is centered near the center of curvature of that reflector section.

In another preferred embodiment, the cross-section of the reflector element 94 in FIG. 8 includes one or more almost semicircular arcs, and efficiency is increased by displacing the center of the light source 76 away from the center of curvature of the reflector element 94. Ray-tracing and experiments have shown that such preferred embodiments can be determined using the following design rules:

1. The cross-section of the reflector element 94 has a maximum extent in the x-dimension equal to the maximum thickness of the wedge layer 12 (or light pipe);
2. The cross-section of the reflector element 94 has no optically sharp corners;
3. The radius of curvature of the reflector element 94 is as large as possible; and
4. The light source 76 is as far as possible from the wedge layer 12, but is far enough from the reflector element 94 to avoid contact with worst-case manufacturing variations.

FIG. 8 shows an example of a coupler which satisfies these above described design rules for the light source 76 with inner diameter=2 mm, outer diameter=3 mm, thickness of the wedge layer 12 (or light pipe)=5 mm, and manufacturing tolerances which permit a 0.25 mm spacing between the reflector element 94 and the outer diameter of the glass envelope 93. In this example of a preferred embodiment the radius of curvature of the reflector element 94 is 2.5 mm, and the center of the light source 76 is displaced by 0.75 mm away from the aperture of the wedge layer 12. A coupler constructed according to this design was found to be 10–15% brighter than the comparable concentric coupler shown in FIG. 7.

Figure 6B:
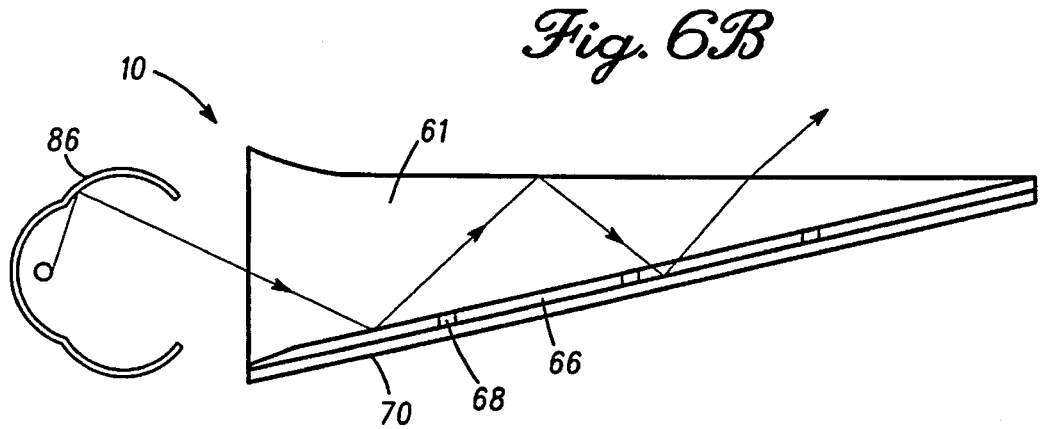
FIG. 6B shows another tapered luminaire in cross section with a compound parabolic light source/concentrator.

The involute and the U-shaped reflector elements 92 and 94 previously described are designed to output light to the aperture of the wedge layer 12 with angles approaching ±90 degrees relative to the aperture surface normal. In another preferred embodiment, the reflector element 94 is shaped to output light with an angular distribution which is closer to the N.A. of the device 10. As shown in FIGS. 6B and 6C, such shapes as the reflector element 94 can include other geometries, such as, a compound parabolic source reflector 86 and a nonimaging illumination source reflector 88. An example of the source reflector 88 is described in Ser. No. 07/732,982 now U.S. Pat. No. 5,289,356 assigned to the assignee of record of the instant application, and this application is incorporated by reference herein.

In another embodiment of the invention shown in FIGS. 6D, 12L, 12N, and 12O, the wedge layer 90 has a non-monotonic varying wedge cross sectional thickness over various selected portions of the wedge shaped cross section. It has been determined that one can exert control over the light distribution being output by control of this cross section. Further, it has been determined that optical boundary effects, as well as intrinsic light source effects, can combine to give an output light distribution with unwanted anomalies. One can therefore also compensate for these anomalies, by providing a wedge cross section with nonlinear changes in the actual dimensions of the wedge layer 90, for example, near the thicker end which typically receives the input light. By control of these dimensions one can thus have another degree of freedom to exert control over the light distribution, as well as provide virtually any design to compensate for any boundary effect or light source artifact. Furthermore, one can vary the index of refraction within the wedge layer 90 in the manner described hereinbefore to modify the distribution of light and also compensate for light input anomalies to provide a desired light distribution output.

Manufacture of Luminaire Devices

In one form of the invention, manufacture of the device 10 can be accomplished by careful use of selected adhesives and lamination procedures. For example, the wedge layer 12 having index $n_1$ can be adhesively bonded to the first layer 28 having index $n_2$. An adhesive layer 60 (see FIG. 3B) can be applied in liquid form to the top surface of the first layer 28, and the layer 28 is adhesively coupled to the bottom surface 16 of the wedge layer 12. In general, the order of coupling the various layers can be in any given order.

In applying the layer 12 to the layer 28 and other such layers, the process of manufacture preferably accommodates the formation of internal layer interfaces which are substantially smooth interfacial surfaces. If not properly prepared such internal layers can detrimentally affect performance because each interface between layers of different indices can act as a reflecting surface with its own characteristic critical angle. If the interfacial surfaces are substantially smooth, then the detrimental effect of uneven surfaces is negligible. Therefore in effectuating the lamination of the various layers of the device 10, the methodology should utilize adhesives and/or joining techniques which provide the above described smooth interfacial layers. Examples of lamination processes include, without limitation, joining without additional adhesive layers, coatings applied to one layer and then joined to a second layer with an adhesive and applying a film layer with two adhesive layers (one on each layer surface to be joined to the other).

In a preferred embodiment lamination of layers is done without any additional internal layer whose potential interfacial roughness will distort the light distribution. An example of such a geometry for the device 10 can be a liquid layer between the wedge layer 12 and the second layer 30. This method works best if the first layer 29 (such as the liquid layer) acts as an adhesive. One can choose to cure the adhesive either before, partially or completely, or after joining together the various layers of the device 10. The optical interface is thus defined by the bottom surface of the wedge layer 12 and the top surface of the second layer 30.

In another embodiment wherein a coating is used with an adhesive layer, the first layer 28 can be the coating applied to the second layer 30. Then, the coated film can be laminated to the wedge layer 12 in a second step by applying an adhesive between the coated film and the wedge layer 12. It is preferable to apply the low index coating to the second layer 30 rather than directly to the wedge layer 12 since the second layer 30 is typically supplied in the form of continuous film rolls. In practice it is more cost effective to coat such continuous rolls than to coat discrete pieces. With this methodology it is more convenient to control thickness of the applied low index layer.

In another embodiment, the second layer 30 is manufactured in such a way that it adheres to the first layer 28 directly without use of additional adhesives. For example, the second layer 30 can be manufactured by applying a layer of polymer material to the first layer 28, and then casting this material to have the desired second layer geometry. In another example, the first layer 28 can serve as a carrier film during the embossing of the second layer 30. By use of appropriate temperatures during the embossing process, the second layer 30 can be heat-fused to the first layer 28. Such heat-fusing can be accomplished using a conventional FEP first-layer film by embossing at almost five hundred degrees F. or higher.

In a further embodiment using a film and two adhesives, the first layer 28 can be an extruded or cast film which is then laminated to the wedge layer 12, or between the wedge layer 12 and the second layer 30 using adhesive between the two types of interfaces. In order to minimize the detrimental light scattering described hereinbefore, the adhesive layer should be flat and smooth. The film can be obtained as a low index material in commercially available, inexpensive forms. Such additional adhesive layers can increase the strength by virtue of the multi-layer construction having adhesive between each of the layers.

In the use of adhesive generally, the performance of the device 10 is optimized when the index of the adhesive between the wedge layer and the first layer is as close as possible to the index of the first layer 28. When the critical angle at the wedge/adhesive interface is as low as possible, then the light undergoes a minimal number of reflections off the lower quality film interface before exiting the device 10. In addition, the index change at the surface of the first layer film is minimized which decreases the effects of film surface roughness.

Manufacture of faceted surfaces can be accomplished by micro-machining a mold using a master tool. Machining can be carried out by ruling with an appropriately shaped diamond tool. The master tool can be replicated by known techniques, such as electroforming or casting. Each replication step inverts the shape of the desired surface. The resulting mold or replicates thereof can then be used to emboss the desired shape in the second layer 30. A directly ruled surface can also be used, but the above described embossing method is preferred. Known "milling" processes can include chemical etching techniques, ion beam etching and laser beam milling.

In yet another method of mechanical manufacture, the faceted surface 34 (see FIGS. 2B and 2M, for example) is manufactured by a welding process, such as embossing or casting, using a hard tool which has on one surface the inverse of the profile of the desired faceted surface 34. Therefore, the manufacturing problem reduces to the matter of machining an appropriate tool. Usually the machined tool is used as a template to form the tools actually used in the casting or embossing process. Tools are typically replicated by electroforming. Since electroforming inverts the surface profile, and electroforms may be made from other electroforms, any number of such inversions can be accomplished and the directly machined "master" can have the shape of the faceted surfaces 3A or its inverse.

The tooling for the faceted surface 34 can be manufactured by single-point diamond machining, wherein the distance between cutting tool and the work is varied to trace out the desired profile. The diamond cutting tool must be very sharp, but in principle nearly arbitrary profiles can be created. A given design can also require specific adaptations to accommodate the non-zero radius of the cutting tool. If curved facet surfaces are required, then circular arcs are preferred to facilitate fabrication. The cutting tool is moved through the cutting substrate and cuts a groove having the approximate shape of the tool. It is desirable to machine the entire piece using a single diamond tool. When this method is used for making a "focusing" type of the faceted surface 34, the variable groove profile therefore should be designed such that the various groove profiles can be machined by the same tool. The required shape variations can still be accomplished by varying the angle of the tool, as well as the groove spacing and depth.

Design of the faceted surface 34 preferably satisfies a few general constraints:

1. Approximately linear variation in the center of the illumination angular distribution as a function of position. A variation of 11 degrees (±5.5°) from top to bottom of typical computer screens is effective;

2. The width of the variable angular distribution of light output should be approximately proportional to the local illuminance in order to achieve approximately uniform brightness to an observer. Examples given below show the spatial distribution is approximately uniform, so the angular cones have approximately uniform width; and 3. Spacing between grooves of the facets 38 should be large enough or irregular enough to avoid diffraction effects, but also be chosen to avoid Moiré patterns when used with an LCD panel. In practice these requirements limit the allowed spatial variations.

In the manufacture of the device 10, for example, the viewing angle depends on the tilt and curvature of each of the facets 38. Focusing is accomplished by rotating the facet structure as a function of position. Using the example of a 150 mm screen viewed from 500 mm away, the illumination cone can be varied by 17 degrees (i.e., ±8.5 degrees) from top to bottom. For typical materials, acrylic and FEP, this requires the facet structure to rotate by approximately 5.7 degrees from top to bottom of the screen 89 (see FIG. 9B).

Design constraints can result when limitations (1)–(3) are combined with the need to machine variable curved grooves with a single tool. For example, maintaining a constant angular width (Constraint #1) at a constant cutting depth requires a compensating variation in groove spacing or groove depth. Specifically, a linear change in groove spacing can reduce the brightness variation to a negligible level when the form tool which cuts the groove is shaped so that portions of each curved reflector facets (see FIG. 2M) are shadowed by the top edge of the adjacent facets. This spacing variation can be small enough to satisfy Constraint #3.

Further methods of manufacture can include vapor deposition, sputtering or ion beam deposition of the first layer 28 since this layer can be quite thin as described hereinbefore. Likewise, the second layer 30 can be controllably applied to form the faceted layer 30 shown in FIG. 2B (such as by masking and layer deposition).

Wedge Light Pipe as a Simple Collimator Device

Figure 15:
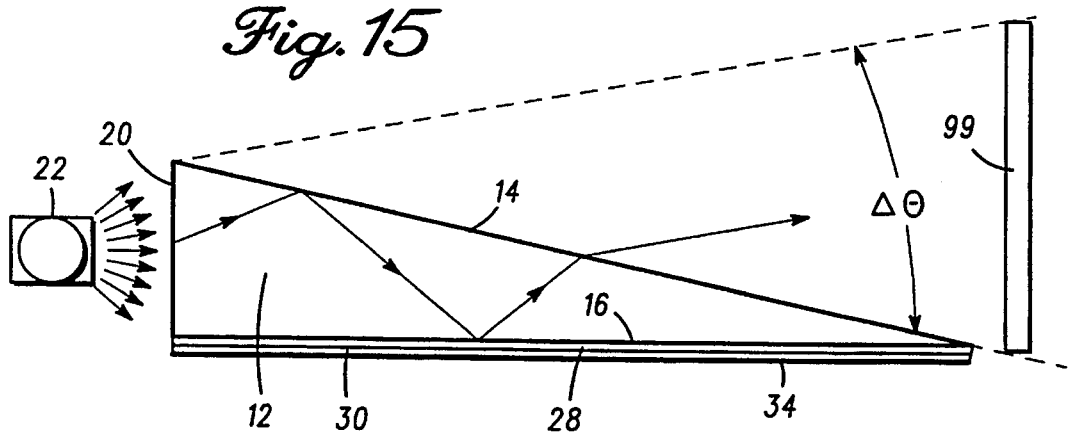
FIG. 15 illustrates a luminaire operating to provide a collimated light output distribution.

In the most general embodiment the wedge layer 12 can function in the context of the combination as a simple collimating optical element. The substantially transparent wedge layer 12 has an optical index of refraction $n_1$ and the top surface 14 and the bottom surface 16 converge to establish at least one angle of inclination $\phi$ (see FIG. 15). The wedge layer 12 also includes the back surface 20 spanning the top surface 14 and the bottom surface 16. Adjacent to the wedge layer 12 is the transparent first layer 28 having index of refraction $n_2$ including an air gap. Adjacent to the first layer 28 is a specular reflective layer, such as the faceted surface 34 of the second layer 30.

Substantially uncollimated light is introduced through the back surface 20 by the source 22. The light propagates within the wedge layer 12, with each ray decreasing its incident angle with respect to the top and bottom surfaces 14 and 16 until the incident angle is less than the critical angle $\theta_c$. Once the angle is less than $\theta_c$, the ray emerges into ambient. Rays which emerge through the bottom surface 16 are reflected back into the wedge layer 12 and then output into ambient. By virtue of the angle-filtering effect previously described, the output light is collimated within a cone of angular width approximately:

$$\Delta\theta \cong 2\phi^{1/2}(n^2-1)^{1/4} \tag{8}$$

An area 99 to be illuminated lies beyond the end of the wedge layer 12 and substantially within the above-defined cone of width $\Delta\theta$.

In another preferred embodiment a light-redirecting means can be positioned beyond the end of the wedge layer 12 and substantially within the above-defined cone of width $\Delta\theta$. The light-redirecting means can be a lens, planar specular reflector, or curved reflector. The light-redirecting means reflects or refracts the light to the area to be illuminated. Further details and uses of such redirecting means, such as lenticular diffusers, will be described hereinafter.

In the embodiments of FIG. 6 having two air gaps or transparent dielectric layers, the light redirecting layers are independent, and thus one can construct devices having layers of different types. For example, the use of two transmissive redirecting layers is preferred when light is to be emitted from both sides of the device 10 or whenever maximum collimation is desired. Examples of the redirecting layer 82 in general for all inventions for two redirecting layers can include the examples in FIG. 12 where the letter in parenthesis corresponds to the appropriate figure of FIG. 12: (a) diffraction gratings 120 or a hologram 122 in FIG. 12A, (b) two refracting facet layers 124 with diffusers 126 in FIG. 12B, (c) two faceted layers 128 with facets 130 designed to refract and internally reflect light output from the wedge layer 12; such facets 130 are capable of turning the light output through a larger angle than is possible by refraction alone; (d) two refracting single facet layers 132 (prisms); (e) a top surface redirecting layer for the wedge layer 12 having a refracting single facet layer 134 with a curved output surface 136 for focusing. A bottom surface 138 includes a redirecting layer for refracting and internally reflecting light using a faceted layer 140; facet angles are varied with position to focus output light 142 at F; (f) a top surface redirecting layer 144 comprised of a refracting faceted layer 146 and a bottom redirecting layer comprised of a refracting/internally reflecting layer 148 with narrow angle output for the light, and a diffuser layer 150 can be added to smoothly broaden the light output angular distribution; (g) a top surface redirecting layer of refracting/ internally reflecting faceted layer 152 with refracting surfaces 154 convexly curved to broaden the output angular distribution; the facet angles can be varied with position and thereby selectively direct the light output angular cones to create a preferred viewing region at a finite distance; this arrangement can further include a transverse lenticular diffuser 156 to diffuse nonuniformities not removed by the curved facet layer 152; the bottom redirecting layer comprises a refracting/internally reflecting faceted layer 158 with a reflecting surface 160 being concavely curved to broaden the light output angular distribution in a controlled manner; (h) a top redirecting layer, including a refracting faceted layer 162 with curved facets 164 to broaden the output angular distribution in a controlled manner and to improve uniformity; a bottom redirecting layer, including a refracting/internally-reflecting faceted layer 166 with flat facets 168 for narrow-angle output, with facet geometry varied with position to focus output light at a finite distance; a parallel lenticular diffuser 170 can be used to smoothly broaden the output angular distribution in a controlled manner and to improve uniformity; the transparent image shown in phantom can be printed on or adhesively based to a lenticular diffuser; a transverse lenticular diffuser 172 is used to diffuse nonuniformities not removed by the parallel lenticular diffuser 170. The combination of a focused flat-faceted layer 166 and the diffuser 170 cooperate to create a preferred viewing zone at a finite distance, similar to using focused curved facets. Also shown is an LCD component 173 (in phantom) usable with this and any other form of the device 10 for illumination purposes.

Figure 12H:
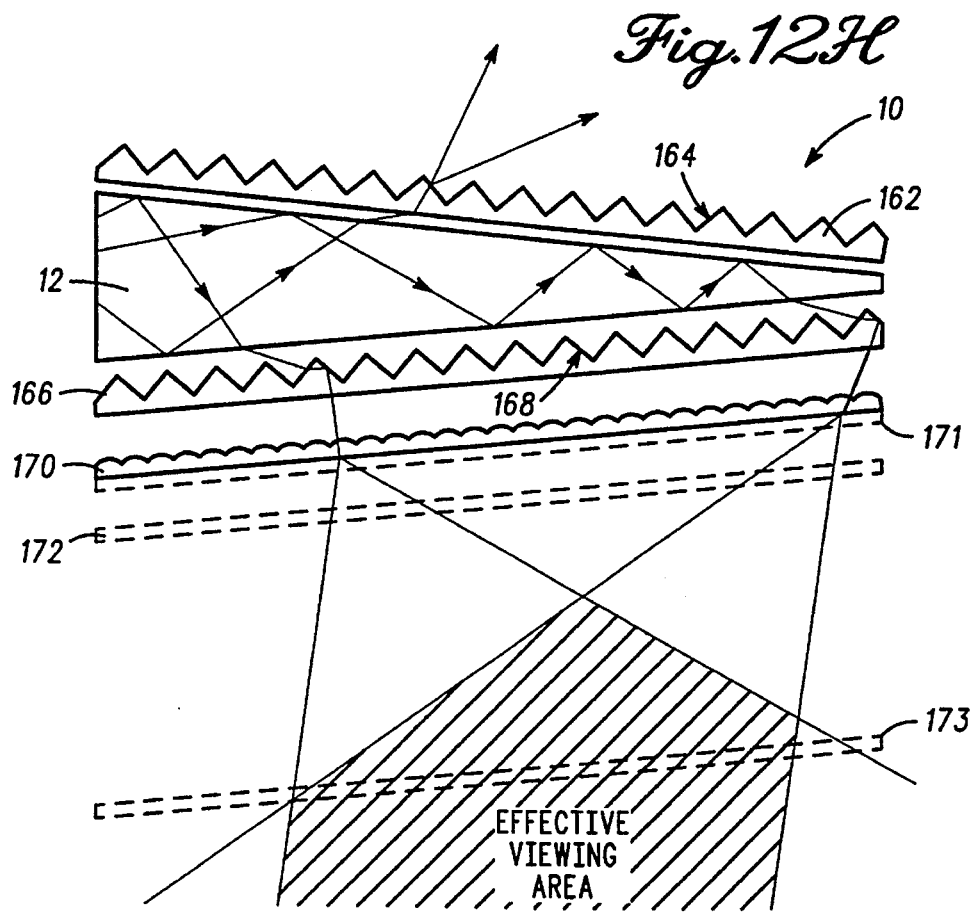
FIG. 12H shows a luminaire with a top surface refracting faceted layer and a bottom surface refracting/internally reflecting faceted layer.
Figure 12I:
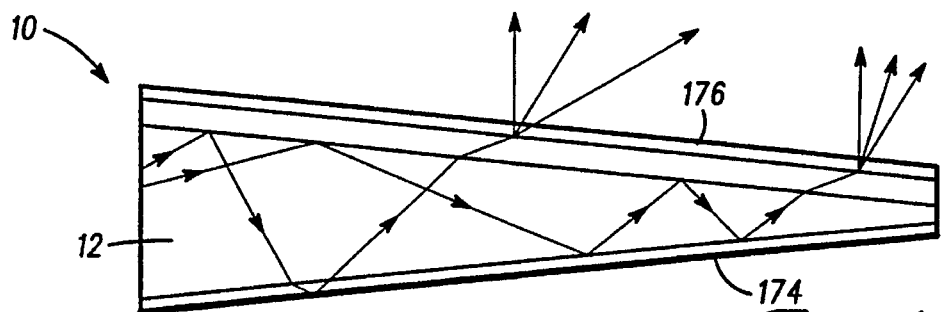
FIG. 12I illustrates a luminaire with a bottom surface specular reflector and a top layer transmission diffraction grating or transmission hologram.
Figure 12J:
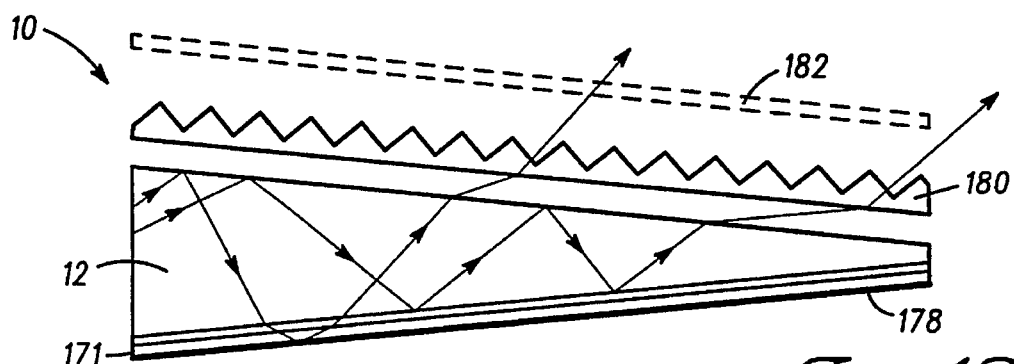
FIG. 12J shows a luminaire with a bottom surface specular reflector and a top surface refracting faceted layer and diffuser.
Figure 12K:
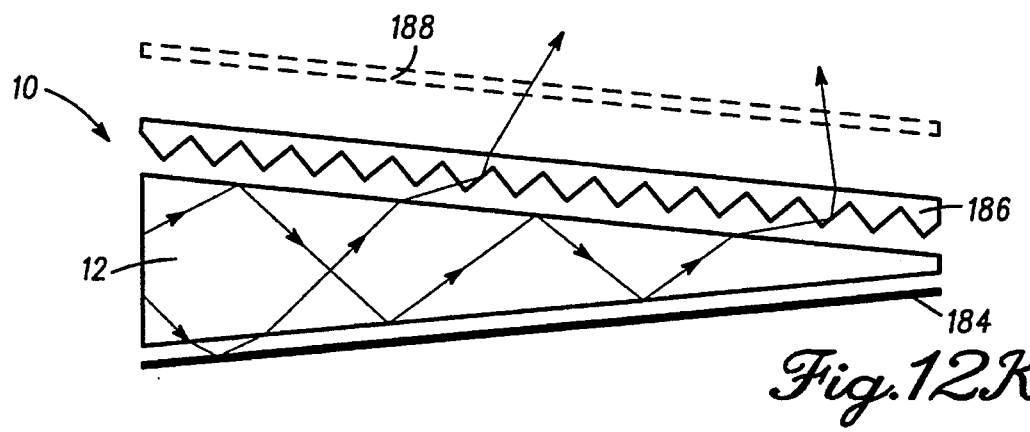
FIG. 12K illustrates a luminaire with a bottom layer specular reflector and a top layer refracting/internally reflecting faceted layer.
Figure 12L:
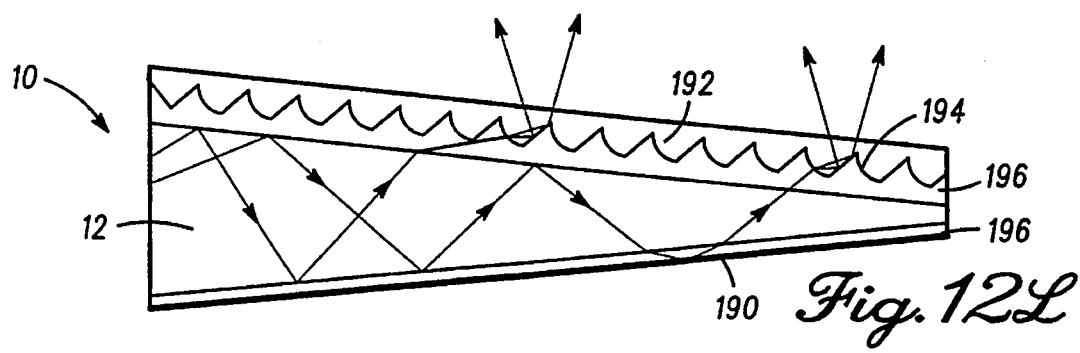
FIG. 12L shows a luminaire with a bottom specular reflector and a top layer refracting/internally reflecting faceted layer.
Figure 12M:
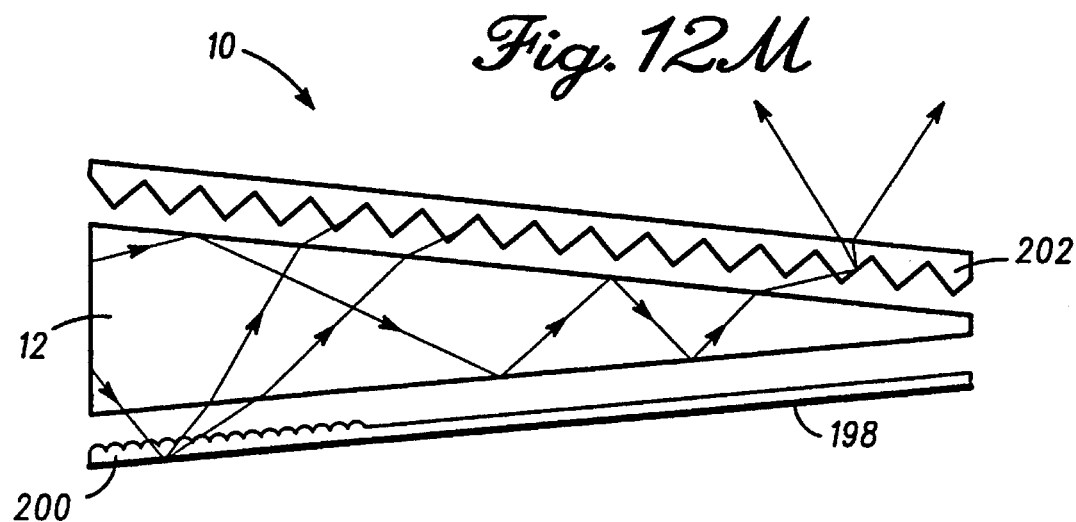
FIG. 12M illustrates a luminaire with an initial reflector section including an integral lenticular diffuser.
Figure 12N:
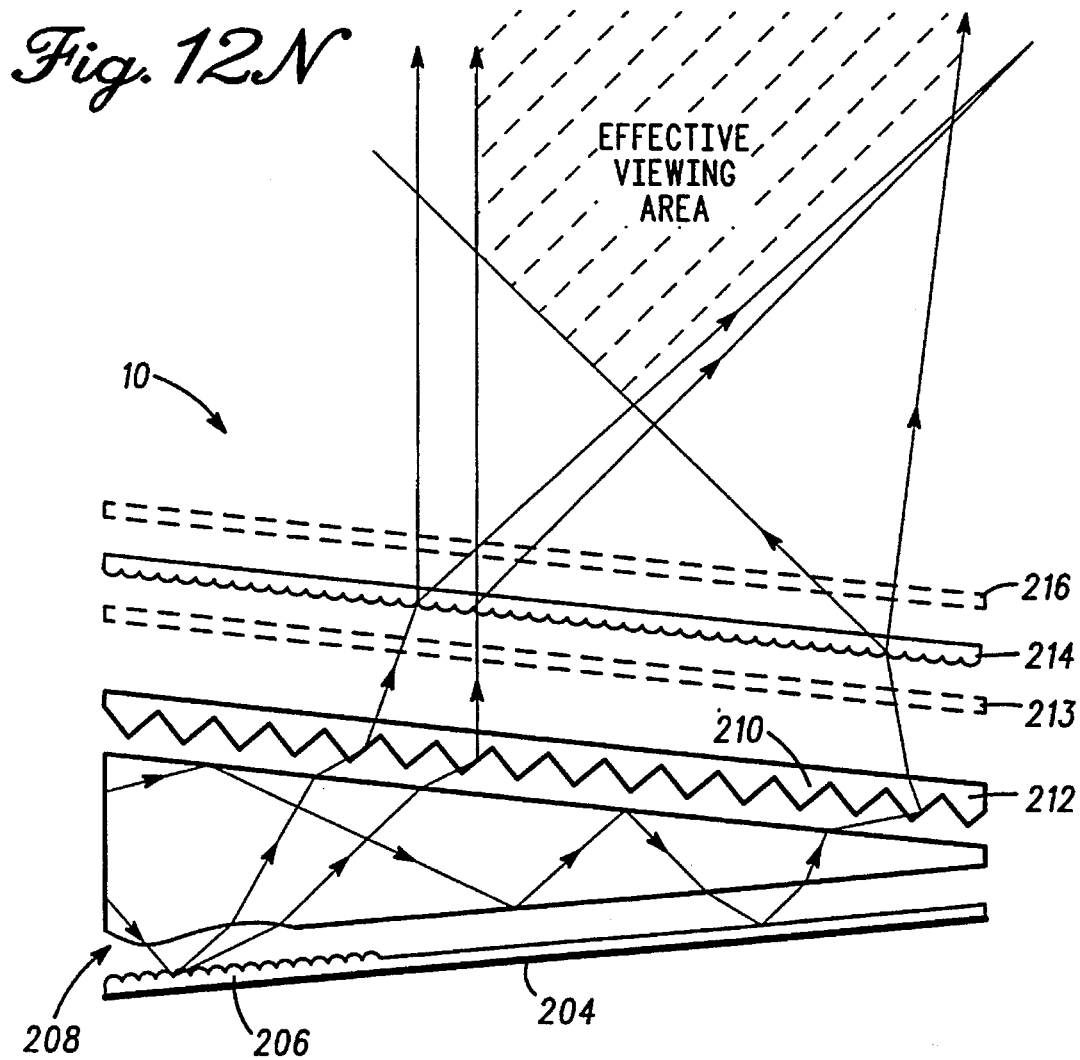
FIG. 12N shows a luminaire with a roughened initial reflector section of a layer.
Figure 12Q:
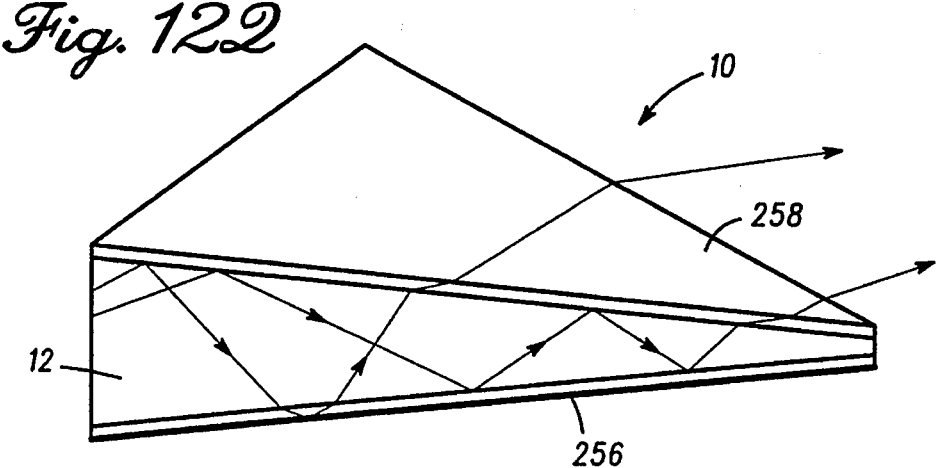
FIG. 12Q illustrates a luminaire with a bottom specular or diffusely reflecting layer and a top refracting layer and FIG. 12R shows a luminaire for generating a "bat wing" light output.

In other architectures, one transmissive and one reflective redirecting layer can be combined. These are combinations of reflective redirecting layers with the various types of transmissive redirecting layers discussed above. Reflective redirecting layers can be specular, partially diffuse, diffuse, faceted or any combination thereof. These architectures are preferred when light emission is desired from one side only, or in some cases when minimum cost is paramount. Examples of such architectures are in FIG. 12: (i) a bottom surface specular reflector 174 combined with a top layer transmission diffraction grating or transmission hologram 176; (j) a bottom surface specular reflector 178 combined with a top surface refracting faceted layer 180, with a diffuser 182 (shown in phantom in FIG. 12J and an intervening image-forming layer 171; (k) a bottom layer specular reflector 184 with a top layer refracting/internally-reflecting faceted layer 186, with facet geometry being varied with position to focus output light at a finite distance; a diffuser 188 is shown in phantom; (l) a bottom layer specular reflector 190 with a top layer refracting/internally-reflecting faceted layer 192, and curved facets 194 are used to smoothly broaden the angular output of light in a controlled manner and to improve uniformity. The thickness of the wedge layer 12 and of both top and bottom surface low-index layers 196 (e.g., air gaps) are varied to influence the light output spatial distribution; (m) a bottom reflector 198 is partially specular, partially diffuse to improve uniformity; FIG. 12M shows the initial reflector section made controllably diffuse by addition of an integral lenticular diffuser 200; the diffuser 200 is designed to selectively reduce nonuniformities which would otherwise appear in the output near the thicker end, and running in the general direction of the y-axis; also included is a top redirecting layer 202 which is refracting/internally-reflecting and has a reflecting surface which is curved; and (n) a bottom reflector layer 204 which is partially specular, partially diffuse to improve uniformity; FIG. 12N shows the initial reflector section 206 which is slightly toughened to reduce specularity, and thereby selectively reduces nonuniformities which would otherwise appear in the output near thicker end 208; a top redirecting layer 210 is used which is refracting/internally-reflecting with a flat-faceted layer 212, and the facet geometry is varied to redirect light from each facet to a common focus at finite distance; a transverse lenticular diffuser 213 is shown in phantom; a parallel lenticular diffuser 214 is used to smoothly broaden the output angular distribution in a controlled manner, converting the focal zone of the flat-faceted layer 212 to a wider preferred viewing zone; the lenticular diffuser 213 also improves uniformity; an LCD display 216 or other transparent image is show in phantom; (o) in a preferred embodiment an eccentric coupler 218 uses a uniformity-enhancing lenticular diffuser 220 shown in phantom in FIG. 12O. A converging tapered section 222 or CPC (integral to the wedge layer) transforms the output angular distribution to match more closely the input N.A. of the wedge layer 12. The wedge layer 12 thickness is smoothly varied to influence output spatial distribution and improve uniformity; a bottom redirecting layer 224 is a specular or partially diffuse reflector; a top redirecting layer 226 is a refracting/internally-reflecting faceted layer 228 with reflecting surfaces 230 convexly curved to smoothly broaden output angle in a controllable manner; facet geometry is varied with position to selectively direct the angular cone of light from each face to create a preferred viewing zone 232 at a finite distance; a transverse lenticular diffuser 234 is shown in phantom; an LCD display 236 or other transparent image is also shown in phantom; the more converging N.A.-matching section is advantageous in combination with the faceted redirecting layers, because the redirecting and low-index layers do not need to overly the more converging section; therefore, the input aperture (and thus efficiency) of the device 10 is increased with minimum increase in total thickness of the device; (p) another preferred embodiment for LCD backlighting uses an eccentric coupler with a uniformity-enhancing diffuser shown in phantom in FIG. 12P; a converging half-tapered section 240 or half-CPC (integral to the wedge layer 12) transforms a coupler output angular distribution to match more closely the input N.A. of the wedge layer 12. A diffuser 239 (in phantom) can also be interposed between light source 217 and the wedge layer 12. The sufficiently truncated half-CPC 240 is just a simple tapered section. A bottom reflector 242 which is partially specular, partially diffuse is used to improve uniformity; FIG. 12P further shows an initial reflector section 244 which is slightly roughened to reduce specularity, or alternatively shaped into a series of parallel reflective grooves, which thereby selectively reduces non-uniformities which would otherwise appear in the output near the thicker end; a top redirecting layer 246 is a refracting/internally-reflecting faceted layer 248, with refracting surfaces 250 convexly curved to smoothly broaden output angle in a controllable manner; facet geometry is varied with position to selectively direct angular cones of light from each facet to create a preferred viewing zone at a finite distance; a transverse lenticular diffuser 252 is shown in phantom. Also included is an LCD display 254 or other transparent image shown in phantom.

Figure 12R:
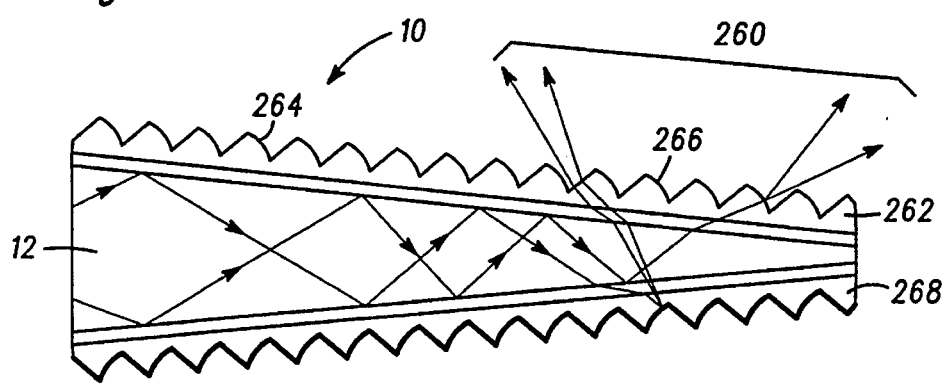

The more converging N.A.-matching section (such as half tapered section 240) is advantageous in combination with the faceted redirecting layers, because the redirecting and low-index layers do not need to overly the more converging section; therefore, the light-accepting aperture of the device 10 is increased without increasing the total thickness. The advantage is also conferred by the fully-tapered section 222 shown in FIG. 12O; but in comparison the half-tapered section 240 in FIG. 12P provides greater thickness reduction on one side, at the expense of being longer in the direction of taper for equivalent N.A.-matching effect. It can be desirable to concentrate the thickness reduction to one side as shown, because the top surface low-index layer can be made thicker to improve uniformity. This configuration can be more easily manufactured because the bottom reflector layer can be integral to the coupler reflector cavity, without need to bend a reflective film around a corner; (q) a bottom specular or diffusely reflecting layer 256 can be combined with single-facet refracting top layer 258 in yet another embodiment (see FIG. 12Q); and (r) in cases for interior lighting usage, a bimodal "bat-wing" angular light distribution 260 is preferred; in FIG. 12R is shown a top refracting layer 262 with facets 264 and has a curved front surface 266 to smoothly broaden angular output and improve uniformity, with output light directed primarily into a forward quadrant; a bottom reflecting layer 268 reflects light primarily through a back surface of a top redirecting layer, with output directed substantially into a backwards quadrant.

Figure 13:
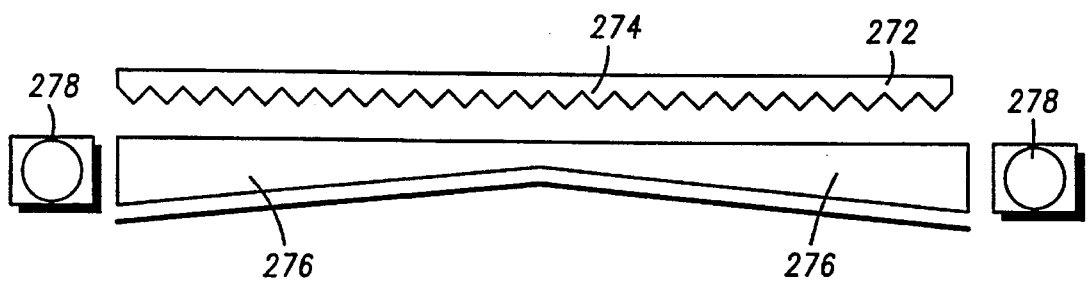
FIG. 13 illustrates a combination of two wedge shaped sections formed integrally and using two light sources.
Figure 14:
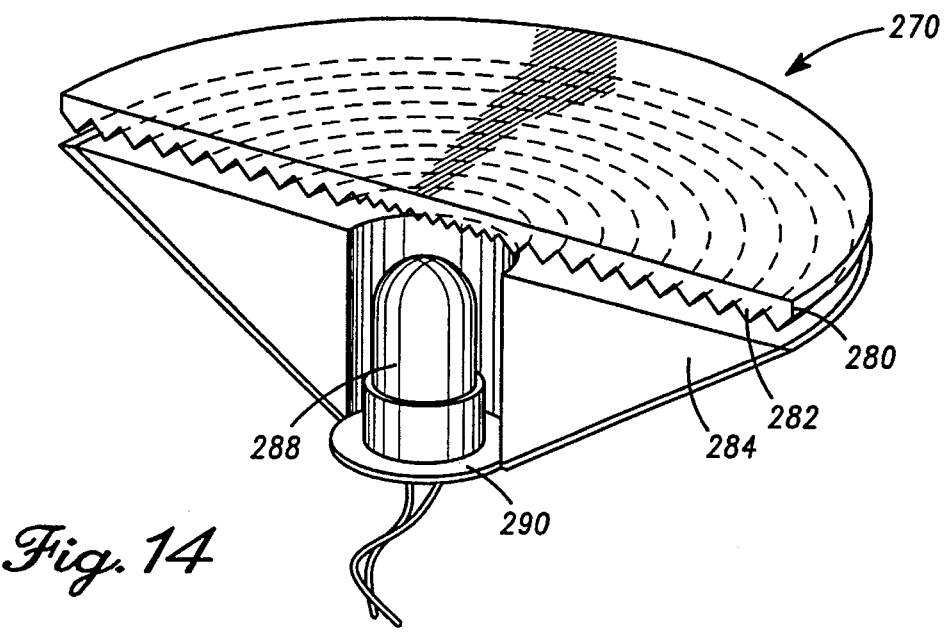
FIG. 14 shows a tapered disk luminaire including a faceted redirecting layer.

As understood in the art the various elements shown in the figures can be utilized with combinations of elements in tapered luminaire devices. Examples of two such combination geometries are shown in FIGS. 13 and 14, each figure also including features specific to the geometry shown. As illustrated in FIG. 13, two wedges 276 can be combined and formed integrally. This combination can provide higher brightness than a single wedge having the same extent because it permits two light sources to supply light to the same total area. While brightness is increased for this device, efficiency is similar because two sources also require twice as much power as one source. A redirecting film 272 with facets 274 can be a single, symmetric design which accepts light from both directions as shown. Alternatively, the redirecting film 272 can have a different design for each wing of the butterfly.

In FIG. 14 is shown a three dimensional rendition of a tapered disk 270, such as shown in FIG. 5, and is sectioned to show the appearance of the various layers. A faceted redirecting layer 280 comprises concentric circular facets 282 overlying a tapered light-pipe portion 284. Directly over a light source 288, overlying the gap at the axis of the light-pipe portion 284, the redirecting layer 280 takes the form of a lens (a Fresnel lens 280 is shown, for example). Directly below the light source 288 is a reflector 290 positioned to prevent light from escaping and to redirect the light into the light-pipe portion 284 or through the lens. At least one opening is provided in the reflector to permit passage of elements, such as wires or light-pipes.

Use of Imaging or Colored Layers

All embodiments of the invention can incorporate one or more layers which have variable transmission to form an image, or which impart color to at least a portion of the angular output. The image-forming layer can include a static image, such as a conventional transparent display, or a selectively controlled image, such as a liquid crystal display. The image-forming or color-imparting layer can overlay one of the redirecting layers, or alternatively it can comprise an intermediate layer between one of the low-index layers and the associated redirecting layer, or an internal component of a redirecting layer. For example, overlying image-forming layers 129 are shown in phantom in FIGS. 12C and 12G. Examples of an internal image-forming layer 171 are shown in FIGS. 12H and 12J.

In one preferred embodiment, the image-forming layer (such as 129 and 170) is a polymer-dispersed liquid crystal (PDLC) layer. By proper arrangement of the layers, the image or color may be projected from the device within selected portions of the output angular distribution. The image or selected color can be substantially absent in the remaining portions of the output angular distribution.

Bi-modal Reflective Wedge for LCD Panel Illumination

In some applications it is desired to illuminate a single LCD panel selectively with either ambient light or by active back-lighting. In these applications ambient illumination is selected in well-lit environments in order to minimize power consumption by the display. When available environmental illumination is too low to provide adequate display quality, then active backlighting is selected. This selective bi-modal operating mode requires a back-illumination unit which can efficiently backlight the LCD in active mode, and efficiently reflect ambient light in the alternative ambient mode.

Figure 16A:
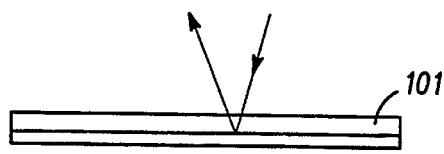
FIG. 16A shows a prior art ambient mode LCD and FIG. 16B illustrates a prior art transflective LCD unit.
Figure 16B:
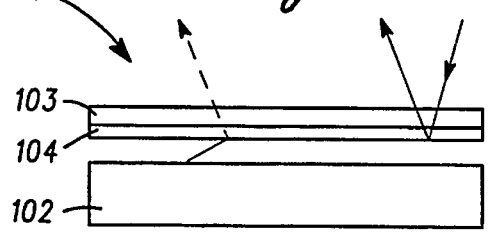

The most widespread prior art bi-modal liquid crystal display is the "transflective display" 101, such as is shown in FIG. 16B. This approach uses a conventional backlight 102 and a transmissive LCD panel 103, with an intervening layer 104 which is partially reflective and partially transmissive. In order to achieve adequate ambient mode performance, it is typically necessary for the intervening layer 104 to be 80–90% reflective. The resulting low transmissivity makes the transflective display 101 inefficient in the active mode of operation.

Another embodiment of the invention is shown in FIG. 17. This embodiment outperforms prior art transflective displays in the active mode, and demonstrates comparable performance in the ambient mode. In this embodiment the wedge layer 12 (index=$n_1$) having the bottom surface 16 is coupled to a transparent layer 28 of index $n_2 < n_1$, which can be an air gap. The $n_2$ layer is coupled to a partially diffuse reflector layer 105. This reflector layer 105 is, for example, preferably similar to the reflectors used in conventional LCD panels used in ambient mode only, as shown in FIG. 16A. Overlaying the wedge layer top surface 14 is a faceted redirecting layer 106, such as a lenticular diffuser with micro lenses approximately parallel to the y-axis. A liquid crystal display panel 107 overlays the faceted redirecting layer 106. The back surface 20 of the wedge layer 12 is coupled to the light source 22.

The lenticular redirecting layer 106 and the wedge-layer 12 are substantially transparent to the incident and reflective light, so that in ambient mode the device 10 operates in a manner similar to conventional ambient-mode-only displays. When an active mode is selected, the light source 22 is activated, and the multiple layers act to spread the light substantially uniformly over the device 10 by virtue of the relationship between the indices of refraction and convergence angles of the layers, as described before. The resulting uniform illumination is emitted through the top surface 14 of the wedge layer 12. In a preferred embodiment, the reflector layer 105 is nearly specular in order to maximize ambient-mode performance. In this preferred embodiment the light emitted from the top surface is emitted largely at grazing angles, unsuitable for transmission by the LCD display panel 107. The redirecting layer 106 redirects a fraction of this light by a combination of refraction and total internal reflection, as described hereinbefore. The redirecting layer 106 is preferably designed such that at least 10–20% of the light is redirected into angles less than 30 degrees from the LCD normal, because typically the LCD transmission is highest in this angular range. It is sufficient to direct only a fraction of the back-illumination into suitable angles, because the prior art transflective display is quite inefficient in the active mode of operation.

Processing Polarized Light

In another aspect of the invention, the light being processed by the optical device 10 has an inherent polarization (such as, linear, circular and elliptical) that can be used to advantage in improving the illumination from a liquid crystal display ("LCD") system or other output which depends on using polarized light. In a system which employs an LCD, it is necessary to remove one type of polarized light 308 and pass to the LCD layer only the other type of polarized light. For example in FIG. 30 a conventional polarization layer 312 preferentially absorbs one polarization of light amounting to about one-half the input light from light source 306, with the preferred polarization light being transmitted to LCD layer 316. The polarized light of the proper polarization is processed by the liquid crystals and a second polarizer 314 in the desired manner to provide the displayed feature of interest. In such a conventional system about half the light from the light source is "unwanted" and thus is lost for purposes of providing an LCD output of interest. Consequently, if a means could be found to utilize both types of polarized light (not removing light of an unwanted polarization), a substantial gain in efficiency and brightness can result for the liquid crystal display. The subject invention is directed in part to that end, and the following embodiments are preferred structures and methods for accomplishing that goal.

In the most general explanation of a polarization filter, referring to FIG. 30B, the function of a polarization filter layer 307 is to take the input light 308 consisting of two polarization states of type 1 and 2 and create transmitted light 309 consisting of polarization states 3 and 4 and reflected light 311 consisting of polarization states 5 and 6. This can be related to our specific references hereinafter to a "first" and "second" state as "states" 1,3 and 5 as the "first polarization light 218" and 2,4 and 6 as the "second polarization" light 220. If we thus assume that the form of states 3 and 5 are chosen so that they alone specify the light that is transmitted and reflected due to the light portion incident in polarization state 1, and let states 4 and 6 be associated with polarization state 2. However, the form of the polarization states need not be related in any more specific way. For some range of incident angles over some spectral wavelength range and for some specific selection of input polarization states, the polarization filter layer 307 processes the input light 308 and produces output light 309 with a specific total power relationship. If we define the powers ($P_i$) in each of the polarization states (i, where i=1,2,3,4,5,6), the condition is:

$$\frac{P_3}{P_1} > \frac{P_4}{P_2}$$

By definition, any layer which exhibits the above characteristics over a suitable angular and spectral range is a form of the polarization filter layer 307. Generally, the polarization states considered can be of arbitrary type such as linear, circular, or elliptical. In later sections we will quantify the performance of the polarization filter layer 307 by a degree of polarization ($P_T$) defined as:

$$P_T = \frac{T_{31} - T_{42}}{T_{31} + T_{42}}$$

where $$T_{31} = \frac{P_3}{P_1}, T_{42} = \frac{P_4}{P_2}$$

For lossless layers, the transmittance is related to the reflectance, R, by $$T_{31} = 1 - R_{51}, T_{42} = 1 - R_{62}$$

where $$R_{51} = P_5/P_1 \text{ and } R_{62} = P_6/P_2$$

There are a variety of implementations of a layer medium which has the properties described above for the polarization filter layer 307. These include, but are not restricted to, implementations containing one or more of the following types of layers: (1) thin-film layers produced by coating, extrusion, or some other process which are either non-birefringent or birefringent and are designed to operate as optical interference coatings; (2) "thick" film layers which are more than a single quarter wavelength optically thick somewhere in the spectral band of interest and may be produced by stacking, coating, extrusion, lamination, or some other process and are designed to operate as a Brewster Stack even when the angles and indexes do not exactly match the Brewster angle conditions; (3) a combination of the thin-film and thick film approaches; (4) correlated, partially correlated, or uncorrelated surface roughness or profile which results in polarization dependent scattering and produced by any method including etching, embossing, micro-machining, or other method; (5) and layers based on dichroic material. In general, an aggregate layer formed by one or more the above layer types is a suitable form of the polarization filter layer 307 layer if it satisfies the general functional specifications described above for polarization filter layers.

The implementations of the polarization filter layer 307 can consist of either thin-film or thick-film birefringent or non-birefringent layers. Particular examples and discussion of birefringent layers will be provided in a labeled subsection presented hereinafter.

Figure 30C:
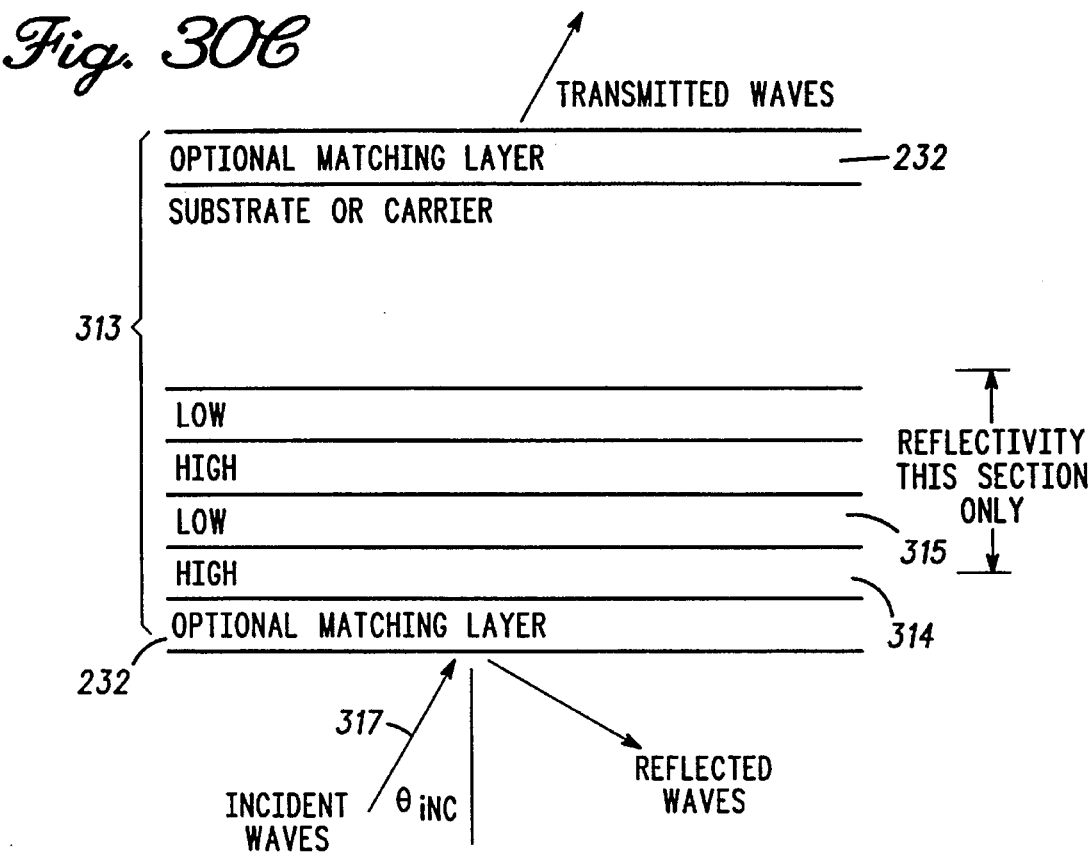
FIG. 30C illustrates a multilayer thin film form of polarization filter.
Figure 30D:
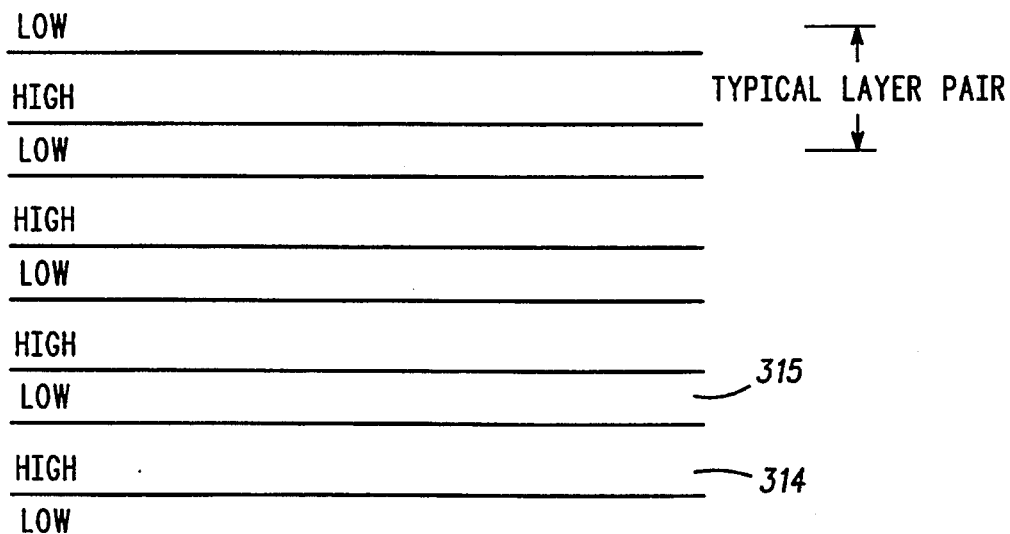
FIG. 30D shows a Brewster Stack form of polarization filter.

One example embodiment of a thick film form of the polarization filter layer 307 is based on a specific design center wavelength ($\lambda_o$) and a specific design operating angle ($\theta_{inc}$) as shown in FIG. 30C and based on isotropic planar layers. Layers 313 in this design example consist of two types of alternating layers, called high (H) layer 314 and low (L) layer 315 of optical refractive index $n_H$ and $n_L$ respectively. From Snell's law, we know the angle with respect to the surface normals ($\theta_L$, $\theta_H$) at which the light 317 are traveling in any of the layer 313 in terms of the refractive indexes of the layers ($n_{inc}$, $n_L$, $n_H$) if we know the incidence angle. This implies:

$$n_{inc} \sin \theta_{inc} = n_L \sin \theta_L$$

$$n_{inc} \sin \theta_{inc} = n_H \sin \theta_H$$

For p-polarized form of the light 317 incident on an interface between two optically isotropic regions, there is an angle called the Brewster's Angle at which the reflectivity of the interface is zero. This angle measured to the surface normal ($\theta_{H/L}$, $\theta_{L/H}$) is:

$$\tan \theta_{H/L} = \frac{n_L}{n_H}$$

$$\tan \theta_{L/H} = \frac{n_H}{n_L}$$

The reflectivity of the interfaces to s-polarized light at Brewster's Angle can be significant. The layers 313 which preferentially transmits the p-polarization state is designed by spacing these interfaces by quarter-wave optical thicknesses. Such quarter wavelength thicknesses ($t_L$, $t_H$) are given by:

$$t_L = \frac{\lambda_o}{4 n_L \cos \theta_L}$$

$$t_H = \frac{\lambda_o}{4 n_H \cos \theta_H}$$

One can show that the H and L indexes of refraction are related by the a design equation:

$$\left(\frac{n_L}{n_H}\right)^2 = \frac{\left(\frac{n_{inc}}{n_H}\right)^2 \sin^2 \theta_{inc}}{1 - \left(\frac{n_{inc}}{n_H}\right)^2 \sin^2 \theta_{inc}}$$

As an example, consider the specific case of:

$$n_H = 1.5, n_{inc} = 1.0, \theta_{inc} = 80°, \lambda_o = 500 \text{ nm}.$$

This implies that the design index of refraction of the low index layer and the physical thicknesses of the low and high index layers 314 and 315 should be respectively $n_L = 1.31$, $t_L = 145$ nm, $t_H = 110$ nm. These can be achieved by using sputtered glass and vacuum deposited lithium chloride for $n_H = 1.5$ and $n_L = 1.31$, respectively. Assuming that the design is a matched design as in FIG. 30C, with the layers 313 surrounded by an index of refraction of 1.5, the reflectivity can be easily calculated with the well-known Rouard's Method. This matching assumption is quite general as the outer surfaces could always be anti-reflection coated. The reflectivity for a variety of basic layer counts for the layers 313 is shown in Table 1 below:

TABLE 1

Performance data for the polarization filter layer 307

| Layer Count | s-Reflectivity | $P_T$ |
|---|---|---|
| 1 | 0.069 | 0.036 |
| 5 | 0.45 | 0.29 |
| 11 | 0.85 | 0.75 |
| 15 | 0.95 | 0.90 |
| 21 | 0.99 | 0.98 |

There are a variety of similar alternative designs. More than a single refractive index may be used as part of the thin-film structure of the layers 313. The surrounding layers need not be air and the exact number of low and high index layers is variable. The carrier or substrate could have other refractive index values. The layers 313 can be varied from their quarter-wave thickness at the design angle and the wavelength so as to improve spectral and angular bandwidths. In fact, the operability of the layers 313 can be quite broad band and the Brewster angle design does not have to be followed with great precision in index and angle. For example, you can trade off s-reflectivity with p-transmission by changing refractive indexes. The whole system can be flipped without changing its function.

A variety of preferred embodiments include at least two layers of different indices. Such arrangements have the $n_H$ and $n_L$ such that $n_H/n_L > 1.15$ in order to minimize the number of layers required for high polarization selectivity. Further, optical interference is most preferably used to enhance performance by using at least one layer with index n and thickness t such that $50 \text{ nm}/(n^2-1)^{1/2} < t < 350 \text{ nm}/(n^2-1)^{1/2}$. This relationship derives from the equations provided hereinbefore regarding $t_L$ and $t_H$, by noting that the wavelength is in the visible light range 400 nm to 700 nm, that the incident light is near the critical angle so that $n \sin \theta \approx 1$ and optical interference effects are promoted by layers with an optical thickness between ⅛ and ½ of the light wavelength. Materials and methods for fabricating such layers are well-known in the art of multi-layer dielectric coatings.

The Brewster Stack approach is similar to the thin-film approach described above except that the layers are many wavelengths thick and tend to function largely on the basis of the incoherent addition of the waves rather than the coherent effect that occurs in optical interference coatings. The design of this form of the polarization filter layer 307 is the same as the design of the thin-film polarizer described above except that layer-thicknesses are not important as long as they are at least several wavelengths thick optically. The lack of optical thickness effects suggest that the performance of the Brewster Stack implementation should generally be less sensitive to spectral wavelength and angular variations. The transmission ratio defined in terms of the transmission of the s and p polarized light $(T_s, T_p)$ of the set of N layer pairs in the geometry of FIG. 30D can be estimated using the approximate formula:

$$T_s/T_p \approx \left[ \frac{4(n_H^2-1)}{n_H^4} \right]^{2N}$$

The results of applying this formula to a geometry with varying numbers of layer pairs is shown in Table 2 below:

TABLE 2

Performance data for a Brewster Stack Form of the Filter Layer 307

| Layer Pairs | $T_s/T_p$ | $P_T$ |
|---|---|---|
| 1 | 0.9755 | — |
| 20 | 0.61 | — |
| 50 | 0.29 | 0.55 |
| 100 | 0.08 | 0.85 |

Generally speaking, this type of the polarization filter layer 307 requires much larger index differences and many more layers for the same reflectivities. There is no sharp dividing line between the thin-film design and the Brewster stack approach. As thickness increases, coherence effects slowly decrease and beyond some point which is dependent on the spectral bandwidth of the light signal, the coherence effects become small compared to incoherent effects. These examples described herein are simply the extreme of cases of the coherent and incoherent situations.

Figure 19A:
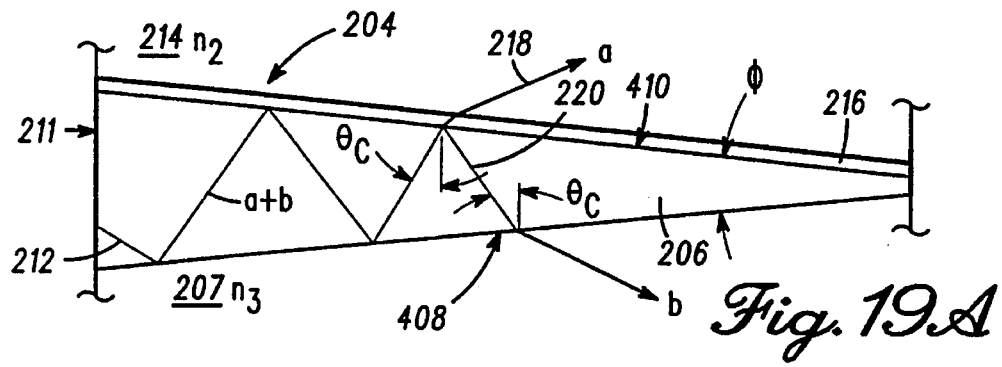
FIG. 19A illustrates a luminaire having a polarization filter layer.
Figure 19B:
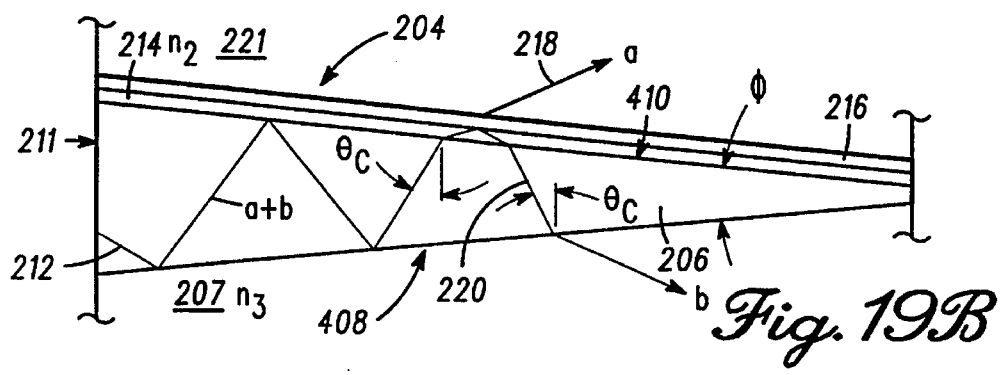
FIG. 19B shows a luminaire with a plurality of layers including a polarization filter layer.

In FIG. 19 are shown variations on one form of a polarized light luminaire system 204. In particular, in FIG. 19B, the system 204 includes a base layer 206 having a wedge-shaped, cross-sectional area with optical index of refraction $n_1$, and a first surface 208 and second surface 210 converging to define at least one angle of inclination Φ. The base layer 206 further includes a back surface 211 spanning the first surface 208 and the second surface 210. Light 212 injected by a source (not shown) through the back surface 211 reflects from the first and second surfaces and exits the base layer 206 when the light 212 decreases its angle of incidence relative to a normal to the first and second surfaces with each reflection from the surfaces 208 and 210 until the angle is less than a critical angle $\theta_c$ characteristic of an interface between the base layer 206 and a first layer means, such as a layer 214. This layer 214 includes at least a layer portion having index $n_2$ less than $n_1$ disposed beyond the second surface 210 relative to the base layer 206. The first layer 214 enables the light 212 to enter the first layer 214 after output from the base layer 206 when the light 212 in the base layer 206 achieves the angle of incidence less than the critical angle $\theta_c$ characteristic of an interface between the base layer 206 and the layer portion having index $n_2$ in the layer 214.

The system 204 also includes a layer means for preferential processing of polarized light of one state relative to another state, such as a polarization filter layer 216 (see previous generic description of the polarization filter layer 307). In addition to the samples described for the filter layer 307, a further example of the polarization filter layer 216 is a birefringent material which will be described hereinafter in the context of particular embodiments in a separate subsection. In FIG. 19, the injected light 212 includes light 218 of a first polarization and light 220 of a second polarization. The filter layer 216 then interacts with the light 212 to preferably output the light 218 of a first polarization state compared to the light 220 of a second polarization state. This filter layer 216 is disposed beyond the second surface 210 relative to the base layer 206, and this filter layer 216 is also able to reflect at least part of the light 220. This reflected light 220 is then transmitted through both the first layer 214 and the base layer 206 and into a medium 207 having index $n_3$ (such as air). The light 218 on the other hand is output from the system 204 on the side of the base layer 206 having the polarization filter layer 216. In FIG. 19B, the light 218 is shown being output into a media 221 having index $n_4$. In this embodiment in FIG. 19B, the relationship among indices is:

$$n_4 \geq n_2$$

and $$\text{arc sin } (n_2/n_1)-2\Phi < \text{arc sin } (n_3/n_1) < \text{arc sin } (n_2/n_1)+2\Phi \quad (9)$$

In this preferred embodiment $n_2$ and $n_3$ can be air layers with "n" being approximately one.

This same index relationship can apply to FIG. 19A which is a variation on FIG. 19B, but the first layer 214 of index $n_2$ is disposed further from the base layer 206 than the polarization filter layer 216. In the embodiment of FIG. 19B, the first layer 214 is closer to the base layer 206 than the polarization filter layer 216.

Figure 19C:
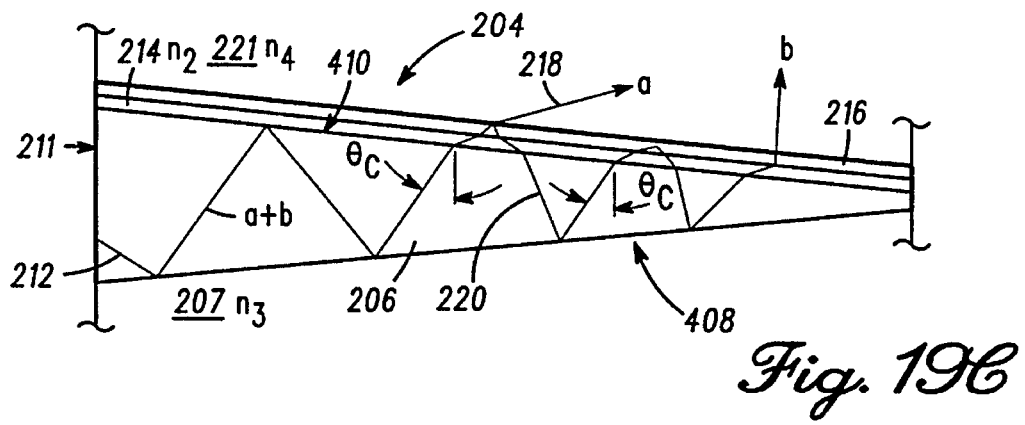
FIG. 19C shows a variation on FIG. 19B with layer indices enabling output of both polarizations of light on one side of the luminaire.

In another embodiment shown in FIG. 19C, the indices are such that Equation (10) below is followed and this results in the light 220 of second polarization sate continuing to undergo internal reflection, rather than exiting through the first surface 208 as shown in FIGS. 19A and 19B. The angle of incidence made relative to the polarization filter layer 216 decreases with each cyclic reflection. The index $n_3$ can thus be made small enough such that the light 220 will decrease its angle beyond the range where the filter layer 216 exhibits its preferred reflectivity of the light 220. Consequently, at least part of the light 220 can pass through the second surface 210, but is separated in angle of output relative to the light 218 of first polarization state. In the embodiment of FIG. 19C the indices have the following relationship:

$$n_4 \geq n_2 \text{ and arc sin } (n_3/n_1) < \text{arc sin } (n_2/n_1)-4\Phi \quad (10)$$

The polarization filter layer 216 most preferably outputs the light 218 and reflects the light 220 when the angle of incidence is greater than:

$$\theta_p = \text{arc sin } [1-4\Phi((n_1/n_2)^2-21)^{1/2}] \quad (11)$$

When light is incident at angles less than $\theta p$, the filter layer 216 can therefore be substantially transparent to light of both polarization states (i.e., the light 218 and the light 220).

Figure 20A:
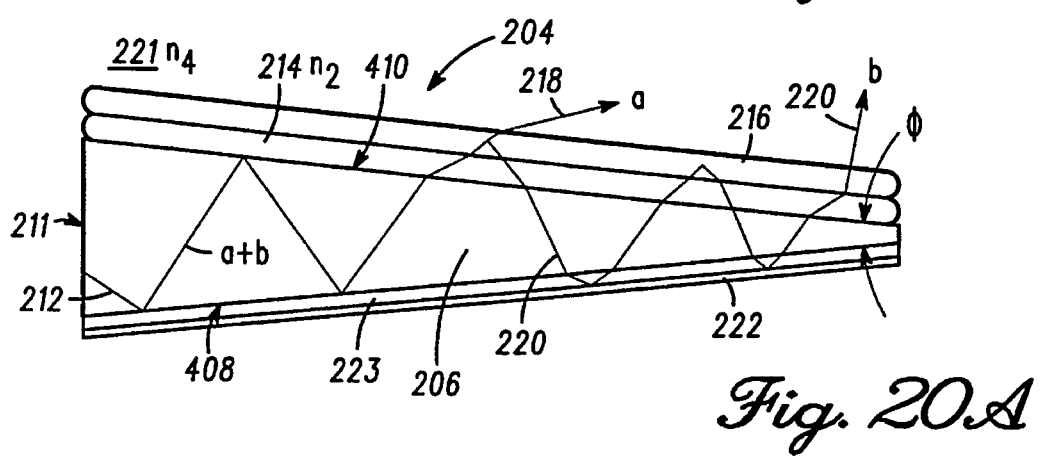
FIG. 20A illustrates a luminaire similar to FIG. 19B but further includes a reflector layer.
Figure 20B:
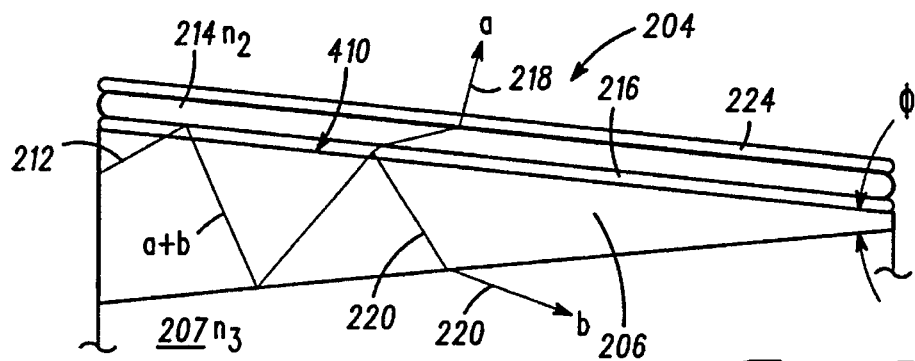
FIG. 20B illustrates a luminaire as in FIG. 20A but a redirecting layer is disposed on the same side of the base layer as the polarization filter.
Figure 20C:
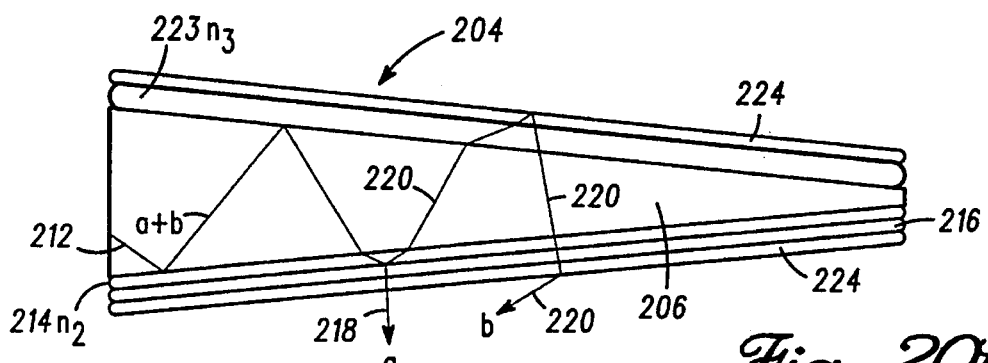
FIG. 20C is a variation on FIG. 20B with an additional redirecting layer and rearranged $n_2$/filter/redirecting layers.

In another embodiment of the invention shown in, for example, FIGS. 20A–C, the system 204 includes light redirecting means, such as a light reflector layer 222 in FIG. 20A, or more generically, a light redirecting layer 224 as shown in FIGS. 20B and 20C. In general for the inventions of the device 10, we can define light redirecting means in terms of the propagation directions of light rays incident on, and departing from, the light redirecting layer 224. Consider the case of a light ray propagating parallel to a unit vector $\bar{r}_i$ in an optical medium having an index of refraction $n_i$. If u is a unit vector perpendicular to the redirecting layer 224 at the point of light ray incidence and directed away from the redirecting layer 224 toward the side from which the incident light ray originates, then the incident light ray interacts with the light redirecting layer 224 to produce light rays which depart from the region of interaction. If the departing light rays propagate parallel to a distribution of unit vectors $\bar{r}_c$ in an optical medium having index of refraction $n_c$, then light redirecting means includes any layer which processes the incident light ray such that the departing light ray has one of the following properties with respect to incident light rays throughout the operative angular range:

(1) $n_c(\bar{r}_c \times \bar{u})$ is not equal to $n_i(\bar{r}_i \times \bar{u})$ for at least 25% of the departing light rays; (12)

(2) $\bar{r}_c = \bar{r}_i - 2(\bar{u} \cdot \bar{r}_i)\bar{u}$ for at least 90% of the departing light rays. (13)

The light redirecting layer 224 can redirect light according to condition (1) in Equation (12) if (a) the light interacts with optical surfaces which are rough, (b) if the light interacts with optical surfaces which have a different slope from the incident surface, or (c) if the redirecting layer 224 diffracts the light into appropriate angles. For example, light redirecting means according to condition (1) may be any combination of transmissive or reflective, diffusive or non-diffusive, and prismatic or textured layer. In addition, the light redirecting means can be a diffraction grating, a hologram, or a binary optics layer.

A light redirecting means which redirects light in accordance with condition (2) of Equation (13) is a specular reflector. Examples of such a specular reflector can be a metallic coating (e.g., the light reflector layer 222 in FIG. 20A can be a metallic coating), a multi-layer dielectric coating or a combination of these. In each case, the internal and external surfaces are preferably smooth and mutually parallel.

In FIG. 20A one of the preferred embodiments includes light reflecting, redirecting means in the form of the reflector layer 222 which reflects the light 220. The reflector layer 222 is disposed beyond, or underlying, the first surface 208 of the base layer 206 and preferably is a flat, specular reflector, such as a metallic coating. Also shown is an intervening layer 223 of index $n_3$ disposed between the base layer 206 and the reflector layer 222. This intervening layer 223 can be considered to be part of the base layer 206, or a separate layer, depending on the functional interaction between the base layer 206 and the intervening layer 223. The index of refraction $n_3$ of this intervening layer 223 can be adjusted to controllably affect the resulting spatial and angular distribution of the light 212 after encountering the layer 223.

As can be seen, for example, in FIGS. 20B and 20C the light redirecting layer 224 can be positioned at different locations, and each layer 224 can also have different characteristics enabling achievement of different light output characteristics as needed for a particular application. Further examples of light redirecting means and uses, as well as specific embodiments, are illustrated in the remaining figures and will be described in detail hereinafter.

In another embodiment of the polarized light luminaire system 204, light converting means is included and is illustrated as a polarization converting layer 226 in FIGS. 21 and 22, for example. In these illustrated embodiments, the indices have $n_4 \geq n_2$ and the conditions of Equation (9) must in general be met. In these embodiments, a light converting means includes a layer which changes at least part of one polarization state (such as the light 220) to another polarization state (such as the light 218, or even light 227 of a third polarization state, which can be, for example, a combination of the first and second state).

The polarization converting layer 226 has the function of changing the polarization state to another state, such as rotating polarization by 90° ($\pi/2$). Moreover, such conversion is most preferably done for oblique incidence. As one example we describe the nature of such conversion for a uniaxial birefringent material where the index of refraction perpendicular to the optic axis is independent of direction. Many preferred materials, such as stretched fluoropolymer films are of this type. More general birefringent materials where the index of refraction is different in all directions can also be used following the general methods described herein. To understand the polarization conversion process, we first review the case for normal incidence.

Figure 30E:
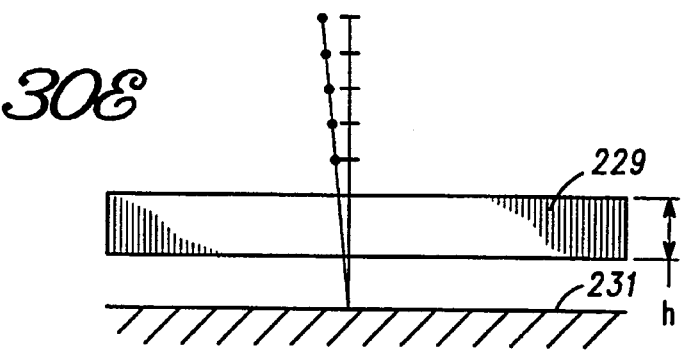
FIG. 30E illustrates a birefringent plate and interacting polarized light.
Figure 30F:
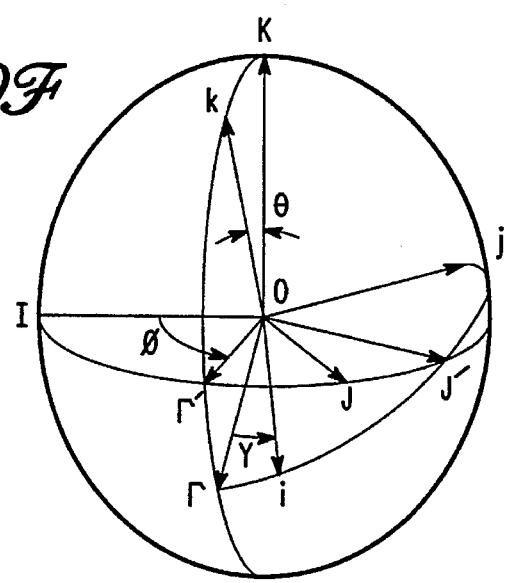
FIG. 30F shows Eulerian angles and optical vectors.
Figure 30H:
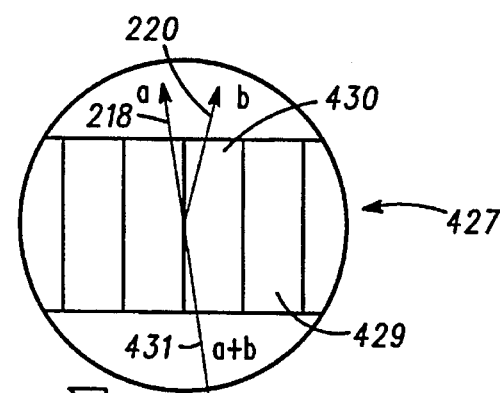
FIG. 30G shows a backlight providing collimated light in the xz plane and FIG. 30H shows a detail of zone from FIG. 30G.

As shown in FIG. 30E, a plate 229 of birefringent material has its transverse axis along vector K and the optic axis is along vector I (see vectors in FIG. 30F). For a stretched birefringent film, the direction of stretch would be along vector I. Vectors I, J, K are an orthogonal triad of unit vectors along the x,y,z axes. For normal incidence, the wave normal is along vector K. We can describe the polarization of the electromagnetic wave by its displacement vector D. Let D' be the polarization of the ordinary ray, and D" the polarization of the extraordinary ray. Let n' be the ordinary index of refraction, and let n" be the extraordinary index of refraction. We can orient the optic axis of the birefringent plate 229 so that it makes an angle of 45° ($\pi/4$) to the incident polarization vector $D_0$. This vector has two components $D_0x=(1/\sqrt{2})D_0\cos \omega t$ and $D_0y=(1/\sqrt{2})D_0\cos \omega t$. Upon emerging from the birefringent plate 229, the D vector has components $D_0x=(1/\sqrt{2})D_0\cos (\omega t-\delta")$ and $D_0y=(1/\sqrt{2})D_0\cos (\omega t-\delta')$, where $\delta'=(2\pi/\lambda)n'h$ and $\delta"=(2\pi/\lambda)n"h$, where h is the plate thickness. Hence the phase difference introduced is $\delta'-\delta"=|(2\pi/\lambda)(n"-n')|h$. In particular, if the emergent light has polarization vector D at right angles to the intial polarization vector D', we need $\delta'-\delta"=\pi$ (or more generally $\delta'-\delta"=(2m+1)\pi$, where m is any integer). This means the thickness h should be chosen as $h=|(2m+1)/(n"-n')|\lambda/2$.

In summary, we choose the thickness h in accordance with the above relation and orient the optic axis at 45° to the incident polarization. In a preferred form of the invention such as in FIG. 26B, the light traverses the converting layer 226 birefringent plate 229 twice, so that the actual thickness should be one-half of that specified above. In other words, the thickness is the well known $\lambda/4$ plate. Any reflections from a metallic mirror 231 introduces an additional phase shift of approximately $\pi$ to both components and does not change the conclusions.

In an embodiment wherein the light has oblique incidence with the converting layer 226 (see FIG. 26B), it is first necessary to show that splitting of the incident beam into two beams (the well-known birefringent effect) does not cause difficulties. The reason this is not a problem is that the two beams emerge parallel to the initial direction, but slightly displaced from one another. The two beams are coherent with each other and the displacement is $<\lambda$. The angular splitting is $\Delta\theta \approx \tan \theta_c \Delta n/n$ where $\theta_c$ is the critical angle and $\Delta n=(n"-n'), n=(n"+n')/2$. The displacement is $\approx h\Delta\theta/\cos \theta_c = h(n/n)\tan \theta_c/\cos \theta_c$. But, we will choose $h\Delta n/\cos \theta \approx \lambda/4$, so automatically the displacement is $<\lambda$ and the two light beams can be treated as one.

The geometry of oblique incidence on a uniaxial form of the birefringent plate 229 is somewhat complicated, and thus to simplify matters, we introduce the Eulerian angles as shown in FIG. 30F. The relations between the (i,j,k) vector triad and the (I,J,K) ventor triad can be read from Table 3.

TABLE 3

| | I | J | K |
|---|---|---|---|
| i | $-\sin \phi \sin \psi$ $+ \cos \theta \cos \phi \cos \psi$ | $\cos \phi \sin \psi$ $+ \cos \theta \sin \phi \cos \psi$ | $\sin \theta \cos \psi$ |
| j | $-\sin \phi \cos \psi$ $- \cos \phi \cos \theta \sin \psi$ | $\cos \phi \cos \psi - \cos \theta \sin \phi$ $\sin \psi$ | $\sin \theta \sin \psi$ |
| k | $\sin \theta \cos \phi$ | $\sin \theta \sin \phi$ | $\cos \theta$ |

Let the normal to the air/plate interface=K, the direction of the incident wave normal=k, and the optic axis of the plate 229=I. We wish to rotate the incident polarization $D_0$ by 90°. Since the incident polarization $D_0$ is in the interface plane, it is consistent to let $D_0$ be along $i_0$ so that $\psi_0=\pi/2$. The polarization D' of the ordinary ray is perpendicular to both I and k. Therefore, let D' be along i'. Now $i'_x=0$. From Table 3 we conclude that $\tan\psi'=\cot\phi\cos\theta$. The polarization of the extraordinary ray D" is perpendicular to both D' and k. Therefore, $\psi"=\psi'\pm\pi/2$. We choose $\psi"=\psi'-\pi/2$, and then $\tan \psi"=\tan\phi/\cos\theta$. To achieve the desired output, we can appropriately orient the birefringent plate 229. Just as in the normal incidence case, we let $\psi_0$ to be at 45° to the D' and D" directions. Therefore, we chose $\psi'=\pi/2$, and then $\tan\phi=\cos\theta$. For a typical case, where $\theta$ is close to $\theta_c \approx 40°$, $\phi \approx 37°$. In practice, for a range of incidence angles and wavelengths one would readily adjust $\phi$ experimentally to get the most complete polarization conversion, using the above formulae as a starting point and guide. We next determine the thickness, h, of the birefringent plate 229. As in the case of normal incidence, the condition is: $h=|(2m+1)/(n"-n')|\lambda 2$. However, the extraordinary index of refraction n" now depends on the angle of incidence $\theta$ and must be read off the index ellipsoid: $(1/n")^2=(1/n_0)^2 \sin^2 \theta + (1/n_e)^2 \cos^2 \theta$ where $n_0$ is the ordinary index of refraction and $n_e$ is the extraordinary index of refraction. Also note that $n'=n_o$. Typically, the index of refraction differences are small, <0.1 and approximately, $(n"-n')\approx(n_e-n_o)\cos^2 \theta$. In addition, the light path length for oblique incidence is greater than that for normal incidence. The length h for oblique incidence is greater than the thickness of the plate 229 by a factor of $1/\cos \theta$. Therefore, since the effective index difference is reduced by $\cos^2\theta$, but the path length is increased by $1/\cos \theta$, it follows that the thickness required for oblique incidence is larger than for normal incidence by $\approx 1/\cos \theta$. In practice, for a range of incidence angles and wavelengths one would adjust h experimentally to obtain the most complete polarization conversion. In practice, for a range of incidence angels and wavelengths, one can adjust $\phi$ experimentally to obtain the most complete polarization conversion, using the above formulae as a starting point and guide.

In another example embodiment, the conversion of light of one polarization into another polarization state can be considered as involving three steps:

(1) separation of different polarization states into substantially distinct beams at every point on the system 204, (2) polarization conversion without affecting the desired polarization and (3) light diffusion into an appropriate angular distribution without depolarization of the light output.

As described herein, a variety of methods can be used to separate the different polarization states in the system 204. For example, the low index layer 214 can be birefringent, as shown, for example, in FIGS. 31A–C. The layer 214 can be, for example, an oriented fluoropolymer convertor layer which creates two light beams 218 and 220 of orthogonal polarization emerging from every point along the system 204. This can be used provided two conditions are met. The first condition requires that the birefringence of the layer 214 is large enough to significantly prevent substantial overlap between the two polarized beams 218 and 220. This condition is summarized by Equations (15)–(17) where C is at least 1 and preferably greater than 4. The second condition is that the direction of birefringence orientation (direction of stretch) of the first layer 214 is substantially parallel to the y axis.

For $\phi=1–1.5$ degrees, the birefringence must be at least 0.03–0.05 to satisfy Equations (15)–(17). Measurements of the birefringence of various commercial fluoropolymer films yielded the following data (average index, birefringence):

Tefzel 250 zh: (1.3961,0.054)

Tefzel 150 zm: (1.3979,0.046)

Teflon PFA 200 pm: (1,347,0.030)

The wedge layer 206 laminated with the 250 zh material produced just-separated polarized beams where even the Fresnel reflected parts did not overlap.

In another embodiment, one can achieve even greater angular separation of polarization by using a faceted redirecting layer comprised of a highly birefringent material.

Figure 30G:
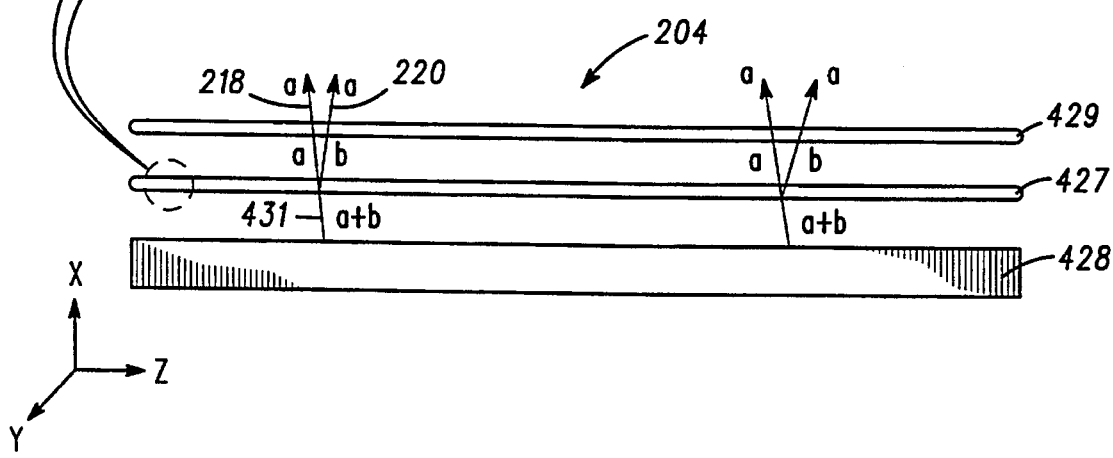

A third approach for separation of polarization states uses a sheet of polymeric beam splitters consisting of an alternating structure of birefringent/transparent layers 427 shown in FIG. 30G and H. Such an array can rest on top of a collimated backlight 428 and polarizes by selective total internal reflection. The index of the film of polymeric layers 429 parallel to the plane of light incidence is lower than that of a transparent layer 430, and the index perpendicular to the plane of light incidence is closely matched to the transparent layer 430, so that an incoming collimated light beam 431 from the backlight 428 (inclined to the beam splitter layers 427) is split: the parallel polarized beam 431 is totally internally reflected, but the perpendicular component is transmitted.

One example of this arrangement can be Mylar/Lexan layers. Mylar indexes are: (1.62752,1.6398,1.486). The Lexan index is: 1.586. The complement of the critical angle is twenty degrees; therefore, the beam splitter layer 427 will function as long as the complement of the incidence angle is less than twenty degrees (in the Lexan). However, at glancing angles, Fresnel reflection causes reduction in the degree of polarization. For example, for thirteen degrees the Fresnel reflected perpendicular component is 9%.

Another example of this arrangement of the layer 427 is uniaxial Nylon/Lexan. Nylon indexes are: (1.568,1.529, 1.498). Here there are two critical angles, the complements of which are nine and nineteen degrees for perpendicular and parallel, respectively. So, the obliquity must be inside this angular range for polarization to be operative. Taking the same case for Fresnel reflection as for Mylar (thirteen degree angle), the Fresnel reflected perpendicular component is only 5%, because the index matching is better.

For either of these examples, each beam splitter layer 427 needs to have the appropriate aspect ratio such that all rays of the beam 431 have exactly one interaction with the film/Lexan interface.

Figure 31A:
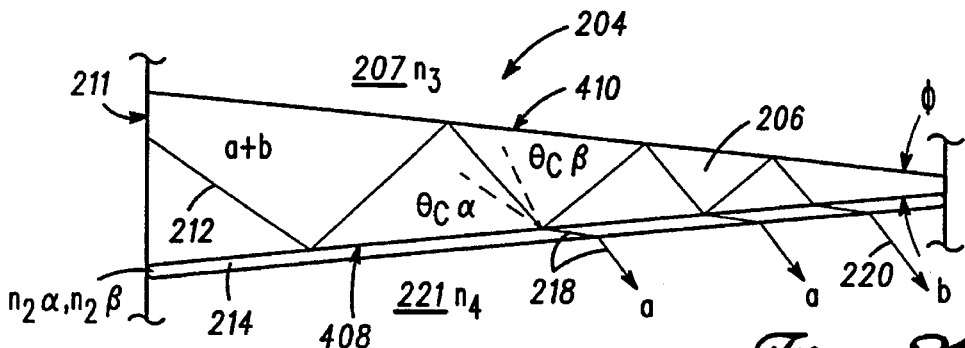
FIG. 31A illustrates a luminaire with a coupled birefringent layer.
Figure 31B:
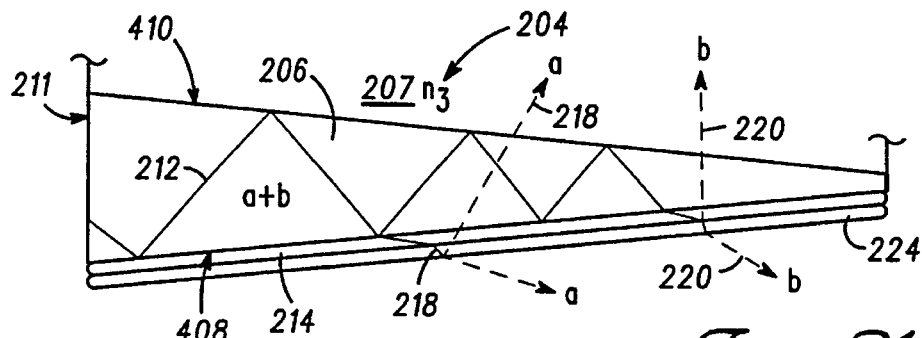
FIG. 31B shows a luminaire and birefringent layer and an added light redirecting layer.
Figure 31C:
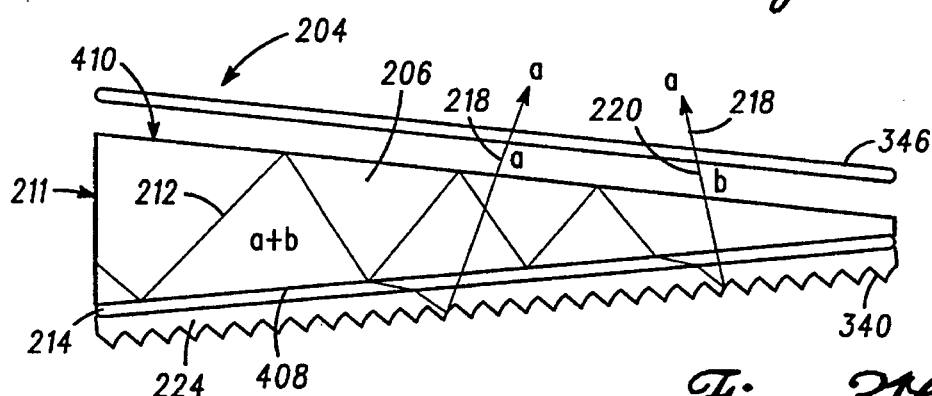
FIG. 31C illustrates a luminaire system similar to FIG. 31B with an added light polarization converting layer.

In one embodiment, once the light of different polarization states is separated into two orthogonally polarized beams at every position along the backlight 428, there must be a means of converting the undesired polarization to the desired one, such as the polarization convertor layer 227 (see FIG. 31C (as well as 30G and H).

One method of performing the polarization conversion is by an alternating waveplate combined with a lens or lens array. In the single lens method, a light beam 218 and 220 will fall upon lenses focused to two nonoverlapping strips of light of orthogonal polarization at the focal plane. The alternating wave plate acts to rotate the polarization of only one of the beams (220) by ninety degrees, the emergent light will be completely converted to light 218. This can be effected by the presence of a half-wave retarder placed to capture only the light 220 of one polarization. This has been demonstrated visually with a large lens, a plastic retardation plate, and Polaroid filters (Polaroid is a registered trademark of Polaroid Corporation).

In a second approach using a lenticular array, one uses a thin sheet of lenses and an alternating waveplate structure (with the frequency equal to the lens frequency), where the retardation changes by 180 degrees for each lens. For a lenticular array 1 mm thick, each image can be of the order of 5 thousandth of an inch in size so the registration of the lenticular array with the waveplate would have to be exact enough to prevent stack-up errors of less than one thousandth of an inch.

Another method of performing the polarization conversion is by use of a double Fresnel rhombus ("DFR") which is another embodiment layer 227. The DFR avoids registration problems by selectively retarding according to angle instead of position. Such a DFR causes the light of first polarization state to suffer from total internal reflection events corresponding to 4×45°=180° of phase shift, while the other polarization state light is only transmitted, so that the output light is completely polarized to the light of first polarization in one plane in the end. The DFR can be constructed, for example, by having four acrylic or Lexan films each embossed with 45 degree prisms, all nested. For the DFR to cause retardation the two orthogonal plane polarized beams L and R (by a ¼-wave plate). If the L is transmitted by the DFR then the R beam will get convened to the L beam by the DFR. Finally the L beam is converted to plane polarized by another ¼-wave plate, the orientation of which determines the final plane of polarization.

Figure 21A:
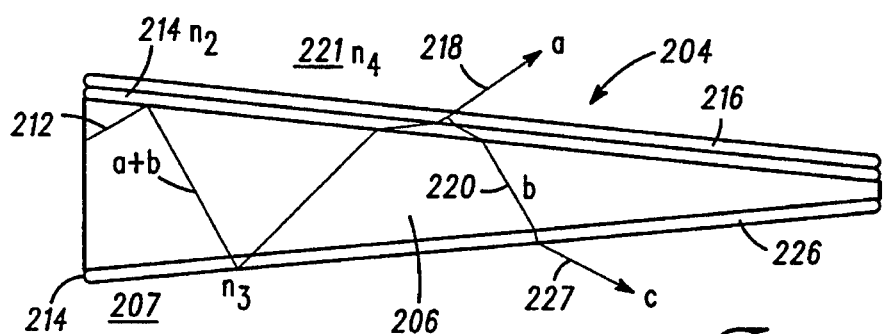
FIG. 21A illustrates a luminaire having a polarization converting layer and polarization filter layer.
Figure 21B:
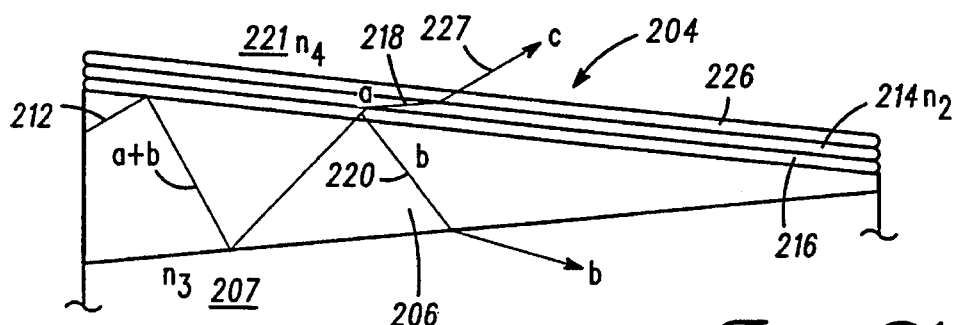
FIG. 21B is a variation on FIG. 21A with the polarization filter layer and polarization converting layer on the same side of the base layer.

In a preferred embodiment shown in FIG. 21A, the converting layer 226 is disposed on the opposite side of the base layer 206 relative to the polarization filter layer 216. In the embodiment of FIG. 21B, the converting layer 226 is disposed on the same side as the polarization filter layer 216. As can be seen by reference to FIGS. 21A and B, the converting layer 226 can even convert the light 218 and 220 to the light of 227 of another third polarization state. This light 227 can be, for example, the light of a third polarization state or even a variation on, or combinations of, the first or second polarization states discussed hereinbefore. The resulting light polarization is dependent on the response characteristics of the converting layer 226. The converting layer 226 can therefore be designed to respond as needed to produce a light of desired output polarization state; and in combination with appropriate positioning of the layer 226, one can produce an output light in the desired direction having the required polarization characteristics.

Figure 22A:
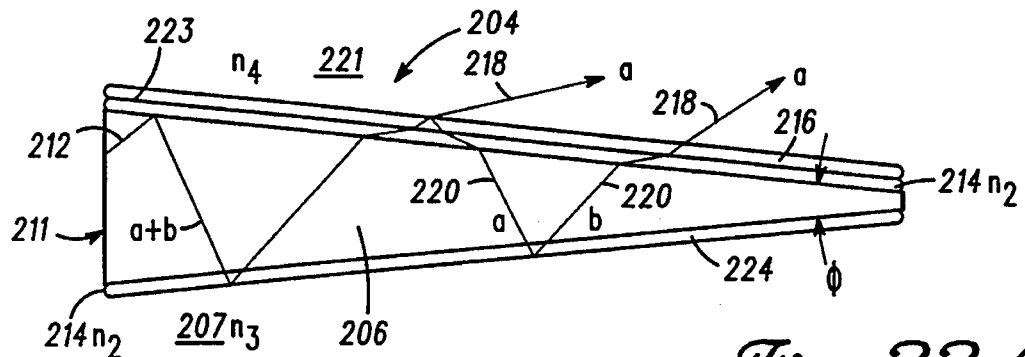
FIG. 22A illustrates a luminaire with a polarization filter layer one side of the base layer and a polarization converting layer on the other side.
Figure 22B:
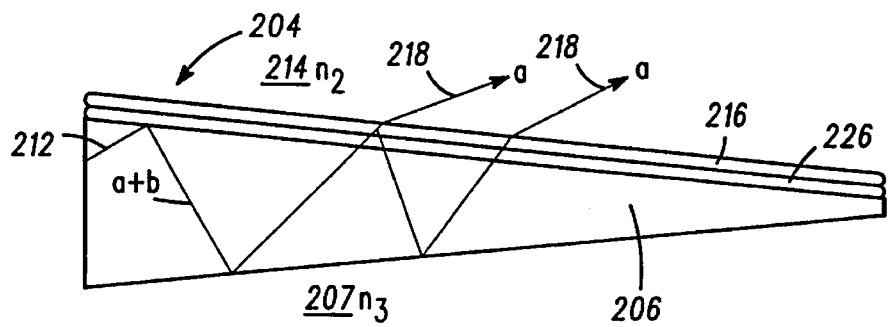
FIG. 22B shows a variation on FIG. 22A with the filter and converting layers adjacent one another on the same side of the base layer.

In another form of the invention illustrated in FIGS. 22A–E, the converting layer 226 is utilized for other optical purposes. FIGS. 22, 23, 24E–F, 25–27, 28A and C, and 29 all illustrate use of the converting layer 226 to change the light 220 of the second polarization state to the light 218 of the first polarization state. In addition, the elements of the luminaire system 204 are arranged such that the light being processed will pass through, or at least encounter, one or more of the polarization filter layer 216 at least once after passing through the converting layer 226. For example, in the case of processing the light 220, the arrangement of elements enables return of the light 220 to pass through the polarization filter layer 216 after passing through the converting layer 226. In some instances, the light 220 can encounter the polarization filter layer 216 two or more times before being output as the light 218 of the first polarization state. FIGS. 22A–E illustrate examples of a variety of constructions to achieve a desired output. In FIG. 22A, after the light 212 encounters the polarizing filter layer 216, the reflected light 220 passes through the converting layer 226, and is convened to the light 218. The light is then returned to the polarization filter layer 216 via internal reflection. In addition, in FIG. 22B, the light 220 also passes through the converting layer 226, is converted to the light 218, and is then returned again to the filter layer 216 after internal reflection. In these cases, $n_3$ is low enough such that the relationship among $n_1$, $n_2$ and $n_3$ in Equation (10) is met.

Figure 22C:
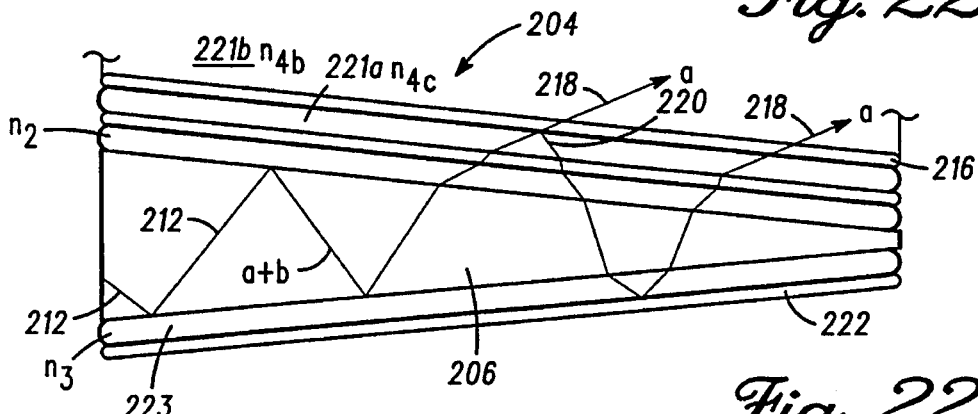
FIG. 22C shows a further variation of FIGS. 22A and B and with a reflector layer added.
Figure 22D:
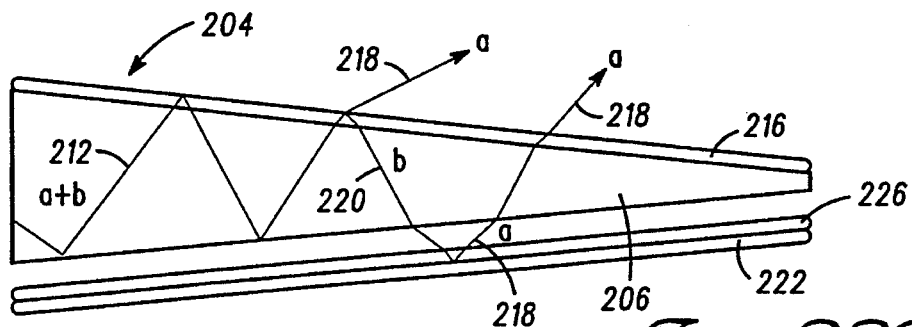
FIG. 22D illustrates a further variation on FIG. 22C with the converting layer moved to the other side of the base layer and FIG. 22E shows another variation on FIG. 22D.
Figure 22E:
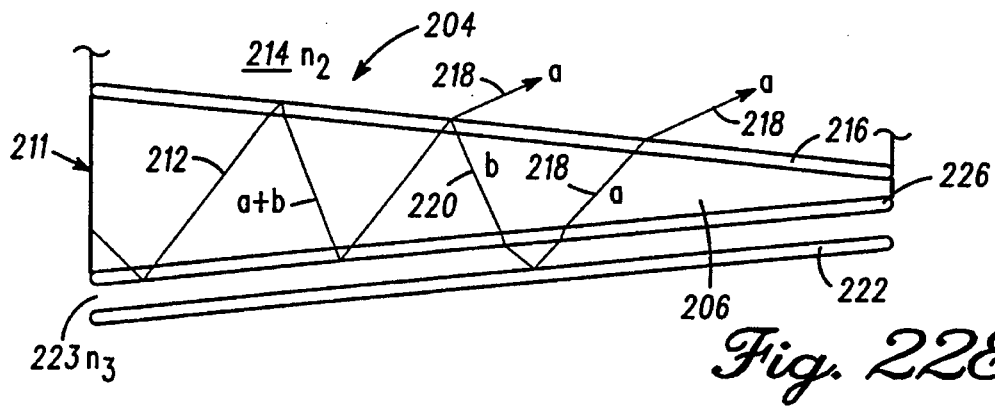

In the embodiments of FIGS. 22C–E, a redirecting means in the form of the light reflector layer 222 is added to return the light 220 to the polarization filter layer 216. As described hereinbefore for the embodiment of FIG. 20A, the intervening layer 223 has an index of refraction $n_3$ which can be adjusted to affect the spatial and angular distribution of light encountering the layer 224. In a preferred form of the invention shown in FIGS. 22C–E, the layers of index $n_2$ and $n_3$ can include air gaps, and in the most preferred form of the invention the layers of index $n_2$ are air gaps.

Figure 24A:
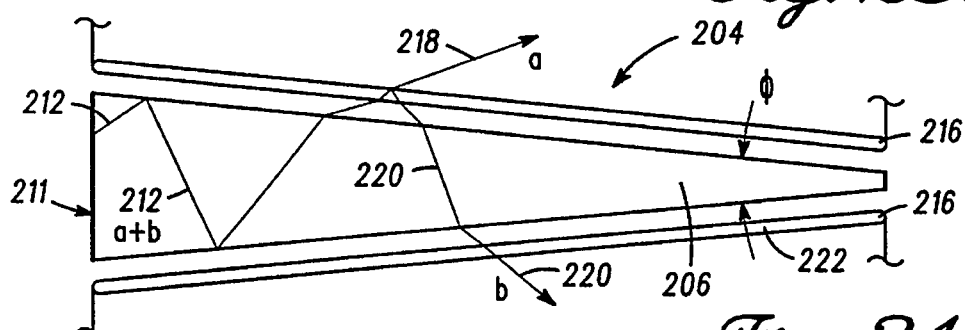
FIG. 24A illustrates a luminaire with two polarization filter layers for two polarization states.
Figure 24B:
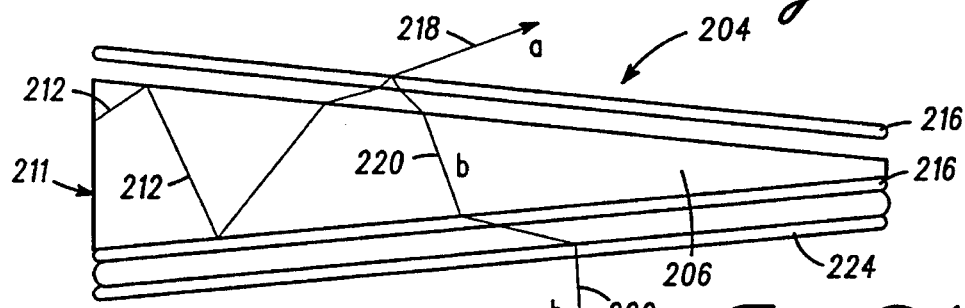
FIG. 24B shows a variation on FIG. 24A plus an added light redirecting layer.
Figure 24C:
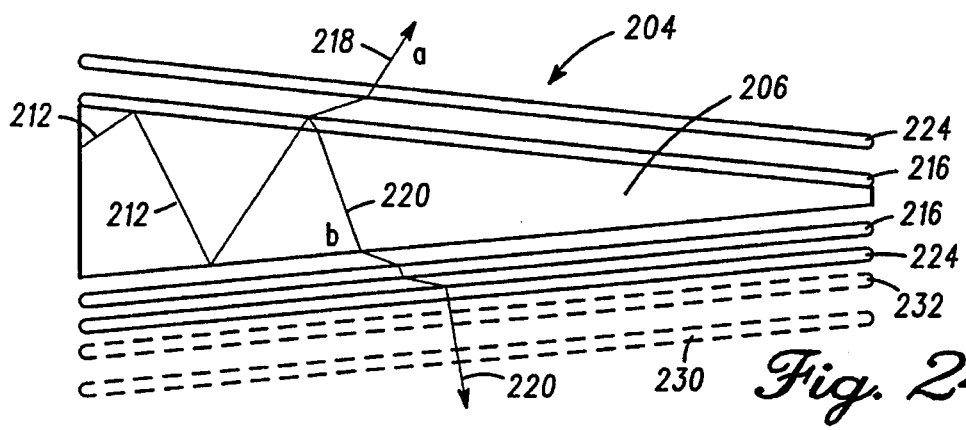
FIG. 24C is a further variation on FIG. 24B with a matching layer and a second redirecting layer, an LCD layer.
Figure 24D:
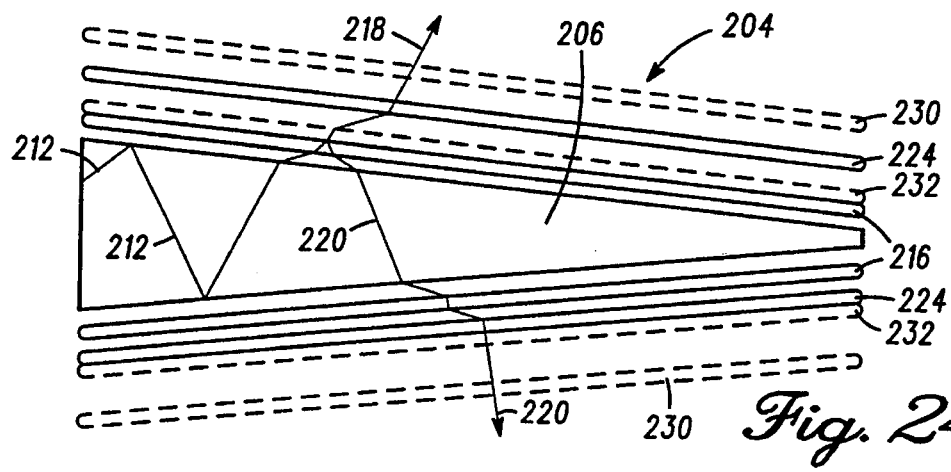
FIG. 24D is yet another variation on FIGS. 24B and C.
Figure 24E:
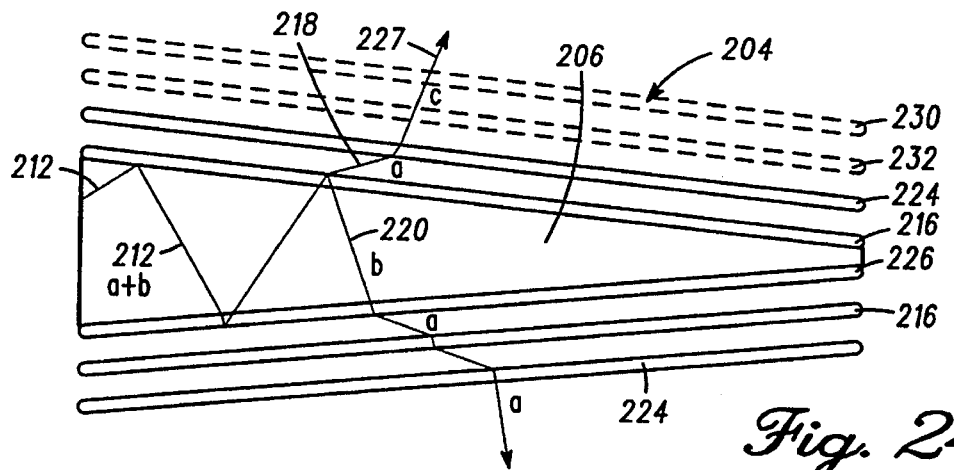
FIG. 24E is a variation on FIG. 24D with an added converting layer and two polarization filter layers and two redirecting layers and FIG. 24F is still another variation on FIG. 24E with LCD layers on both sides of the base layer.
Figure 24F:
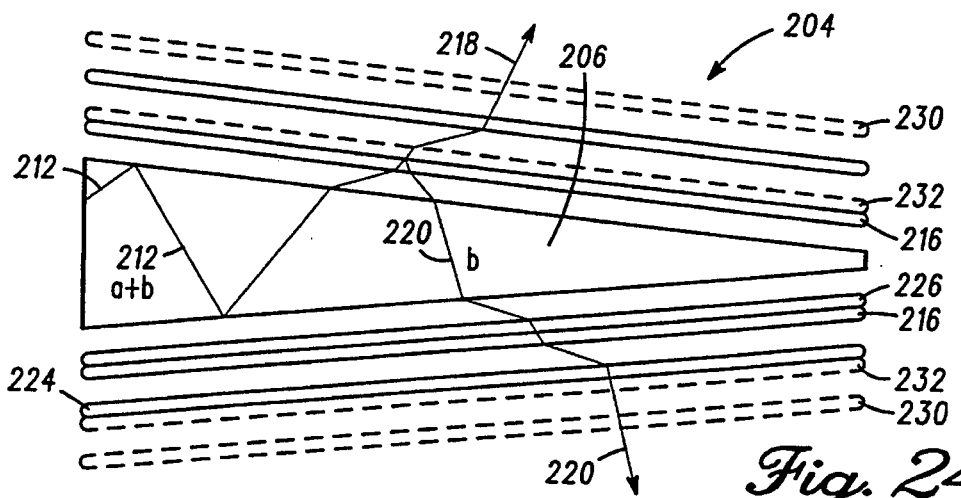
Figure 25A:
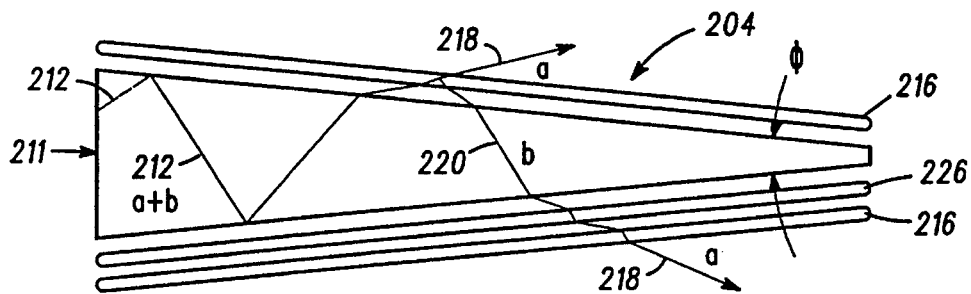
FIG. 25A illustrates a general construction utilizing two polarization filter layers and a polarization converting layer.
Figure 25B:
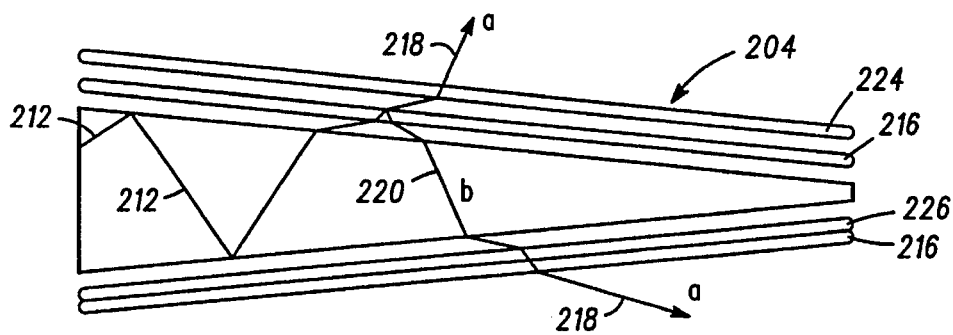
FIG. 25B shows a variation on FIG. 25A with an added redirecting layer.

FIGS. 24A–F illustrate a sequence of constructions starting with use of one of the polarization filter layer 216 in FIG. 24A and continuing construction of more complex forms of the luminaire system 204. In FIGS. 24C–F, there is added one or more of the light redirecting layer 224, at least one liquid crystal display ("LCD") layer 230 and light matching means, such as a matching layer 232. The matching means acts to convert the light output by the assembly of the other layers to a particular polarization state preferred by a target device or additional layer, such as the LCD layer 230. The matching layer 232 is thus a special case of the converting layer 226.

Figure 23A:
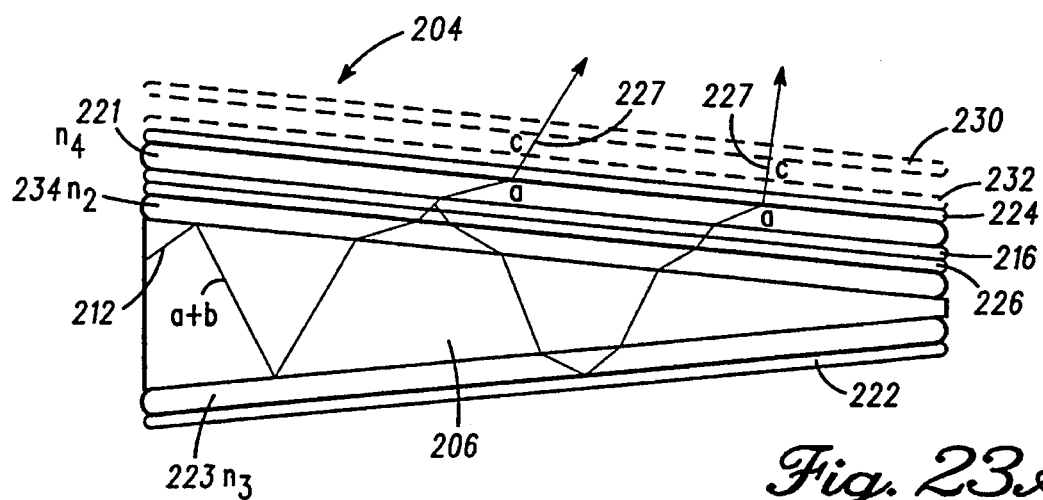
FIG. 23A illustrates a luminaire having plural layers including a polarization filter, a converting, a redirecting, a reflector and an LCD.
Figure 23B:
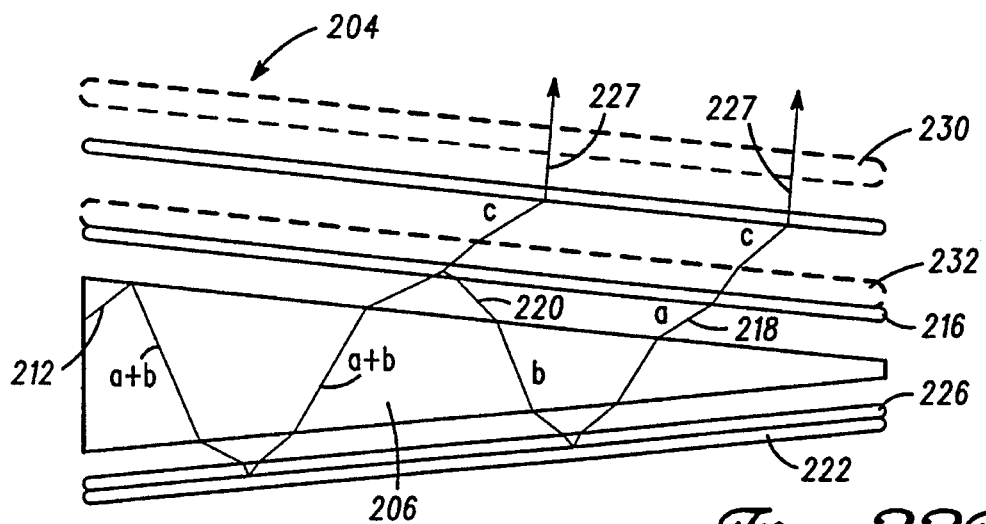
FIG. 23B shows a variation on FIG. 23A.
Figure 23C:
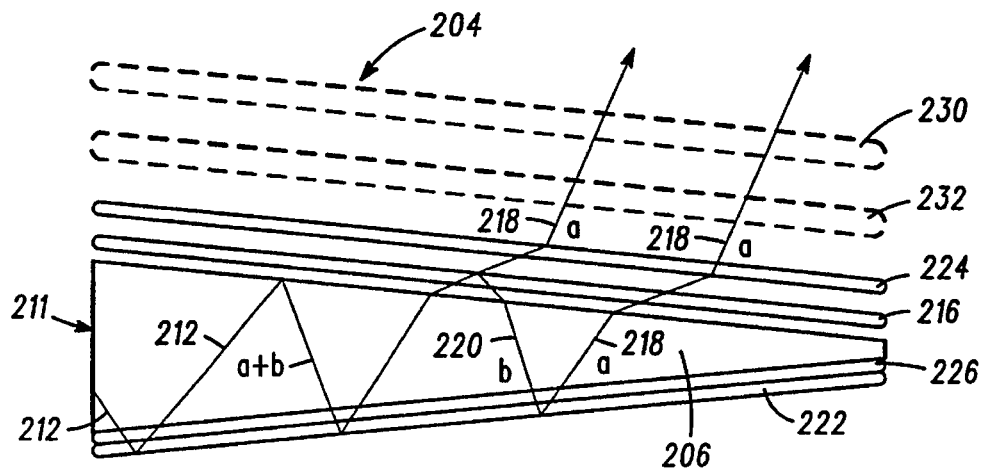
FIG. 23C illustrates yet another variation on FIG. 23A.

In FIGS. 23A–C are illustrated other forms of the polarized light luminaire system 204 in combination with the LCD layer 230. In one general form of the embodiment of FIG. 23A, a layer 234 is included. In more particular forms of the inventions, for example as in FIG. 23, the preferred value of $n_2$ is about 1 (see, for example, FIGS. 23B and C). In certain forms of FIG. 23A, $n_2 > 1$ can also be utilized. Alternatively, preferably choices for the relationship among indices of refraction are set forth in Equation (9) and (10).

Figure 26A:
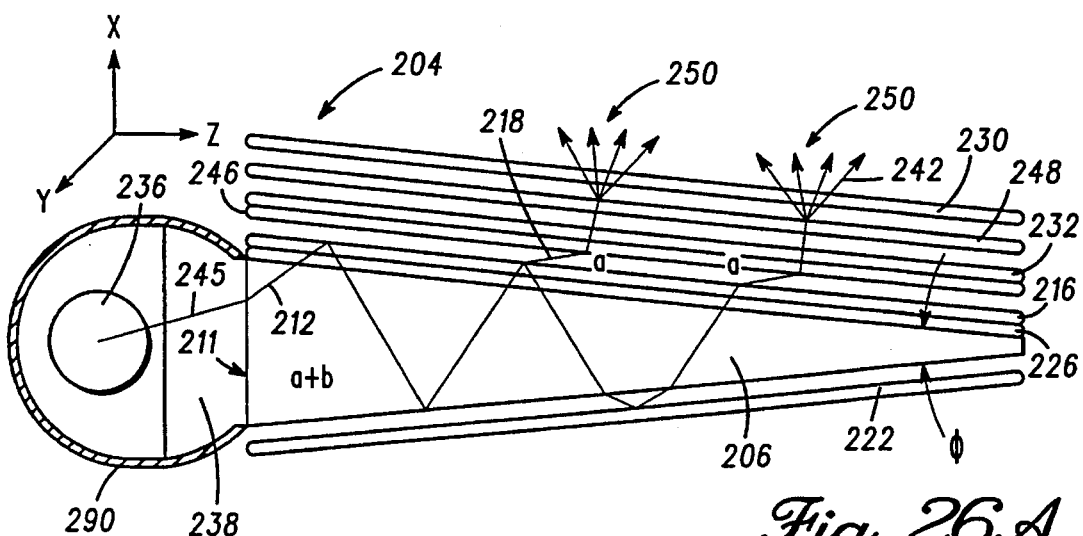
FIG. 26A illustrates a multilayer luminaire with a light source coupled to a light angle transformer to control spatial uniformity of light ouput from the device.

Further examples of preferred embodiments are shown in FIGS. 26A and B, and in FIG. 26A is included a cold cathode fluorescent tube ("CCFT") light source 236. This embodiment further includes an angle transformer layer 238 which operates to change the angular distribution of the light. This angle transformer layer 238 can, for example, change the distribution in the xz-plane to control the spatial uniformity of light output from the device 10. In the preferred embodiment, the distribution of the output light 250 is substantially uniform in its spatial distribution over at least 90% of the output surface. In addition, the angular distribution of the light 212 in the xz-plane is approximately $\pm\theta_{max}$ with respect to the normal to the back surface 211, where $$\frac{\pi}{2} - \theta_c + 6\Phi \geq \theta_{max} \geq \frac{\pi}{2} - \theta_c \qquad (14)$$

and the back surface 211 is about perpendicular to at least one of the first surface 208 and the second surface 210. The angle transformer layer 238 can be a tapered light-pipe section, a compound parabolic concentrator (a "CPC"), a micro-prismatic film (FIG. 28C) a roughened-surface layer, or a hologram. The angle transformer layer 238 is most preferably optically coupled to the base layer 206 without an intervening air gap. The angle transformer layer 238 can also operate to change, and preferably narrow, the light distribution in the yz-plane to improve brightness, LCD image quality, and viewer privacy as well. In addition, in FIG. 26A, an output diffuser layer 248 has been added before the LCD layer 230 to broaden the angular distribution and enhance uniformity of output light 242 provided to the LCD layer 230.

Figure 26B:
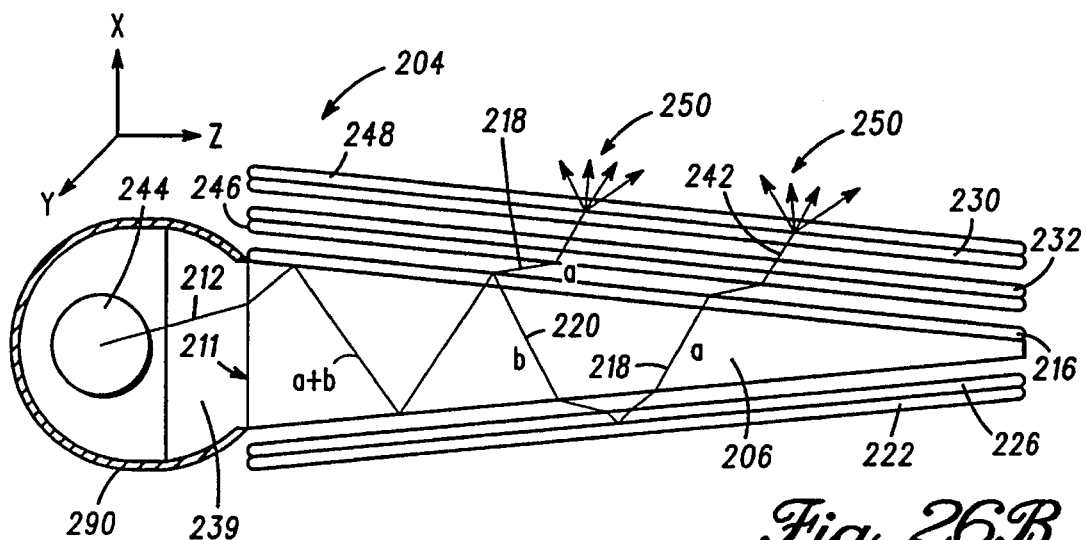
FIG. 26B is a variation on FIG. 26A.
Figure 28A:
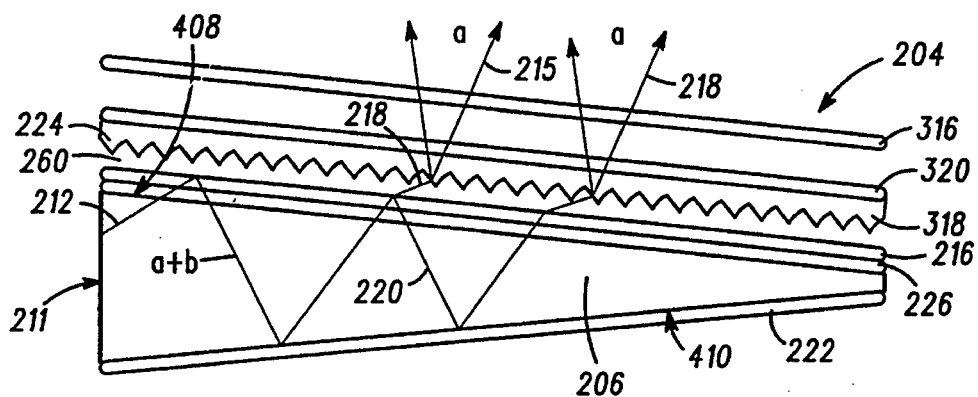
FIG. 28A illustrates a luminaire including a polarization light filter, polarization converter and a faceted redirecting and diffusing layer.
Figure 28B:
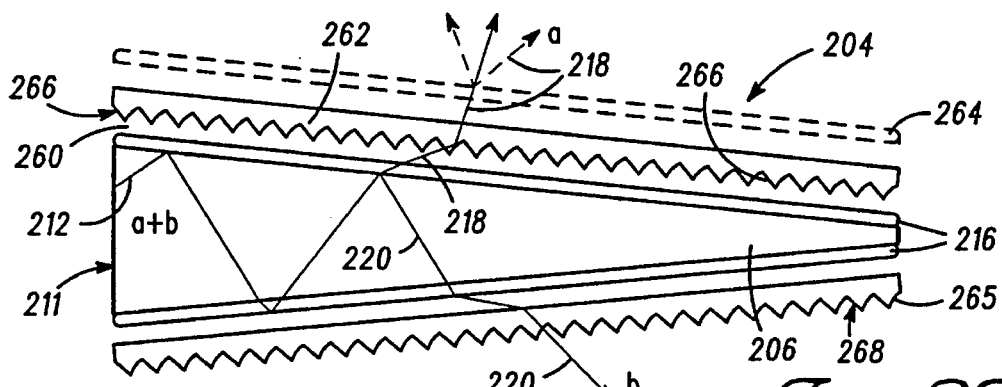
FIG. 28B shows a variation on FIG. 28A with two polarization filter layers and two faceted redirecting layer.
Figure 28C:
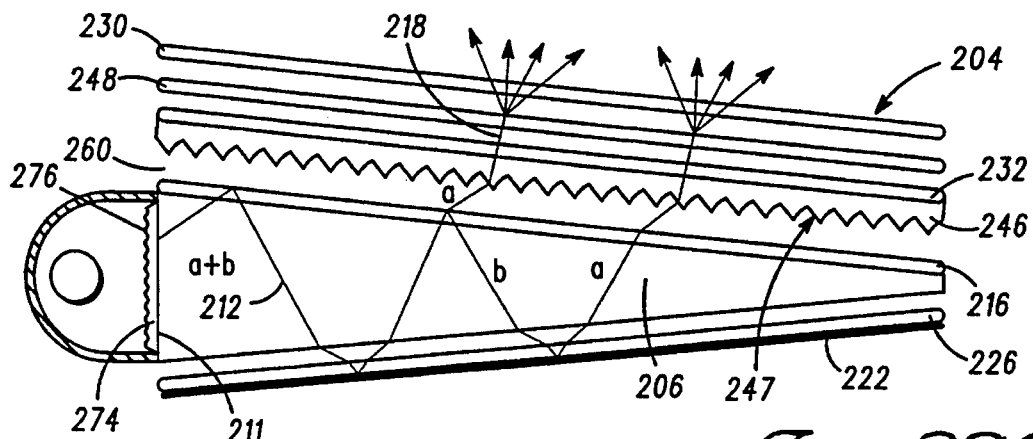
FIG. 28C shows a light source coupled to a luminaire and is a variation on FIG. 28A.

In another preferred embodiment of FIG. 26B, a CPC 239 is coupled to a light source 244 operating to help maintain output light 250 within the proper angular distribution in the xz plane. In addition, one can control the range of angular output by use of a light redirecting means, such as a prismatic redirecting layer, such as the layer 246, using flat prismatic facets, such as the facets 247. See, for example, this type of layer and prismatic facets in FIGS. 28C, D and E and FIGS. 29A and B and the description in detail provided hereinafter. This embodiment as shown in FIG. 28E refers to the prismatic layer 251 and facets 253, and this embodiment also adds after the LCD layer 302 a light diffuser layer 304 for broadening light distribution in a specific plane. In a most preferred form of this embodiment, for example, shown in FIG. 28E, the light 242 is directed to pass through the LCD layer 302 within a narrow angular range in the xz-plane. The elements of the luminaire system 204 are therefore constructed to assist in providing transmission of the light 242 through the LCD layer 302 at an angle where the image forming properties are optimized. With the diffuser layer 304 positioned on the other side of the LCD layer 302 relative to the base layer 206, the diffuser layer 304 can broaden the angular distribution of viewer output light 250 without diffusing the light 250 in the xy-plane. For example, the diffuser layer 304 can be a "parallel" diffuser which can take the form of a holographic diffuser or lenticular diffuser with grooves substantially parallel to the y-axis. Viewers at a wide range of angles can then see the image which is characteristic of the optimal angle for the light 242 which is subsequently transmitted through the LCD layer 302 to form the light 250. Example configurations utilizing this form of general construction are thus shown in FIGS. 28D and E and FIGS. 29A and B. Further, FIGS. 28D and E and FIG. 29A also include a transverse diffuser layer 252 (see FIGS. 28D, 28E and 29A) which diffuses the output light 242 provided to the LCD layer 302 only in the xy-plane in order to improve uniformity without broadening the distribution of the light 242 in the xz-plane. For example, the transverse diffuser 252 can be a holographic diffuser or a lenticular diffuser with grooves substantially parallel to the z-axis. Further details will be described hereinafter.

Figure 27A:
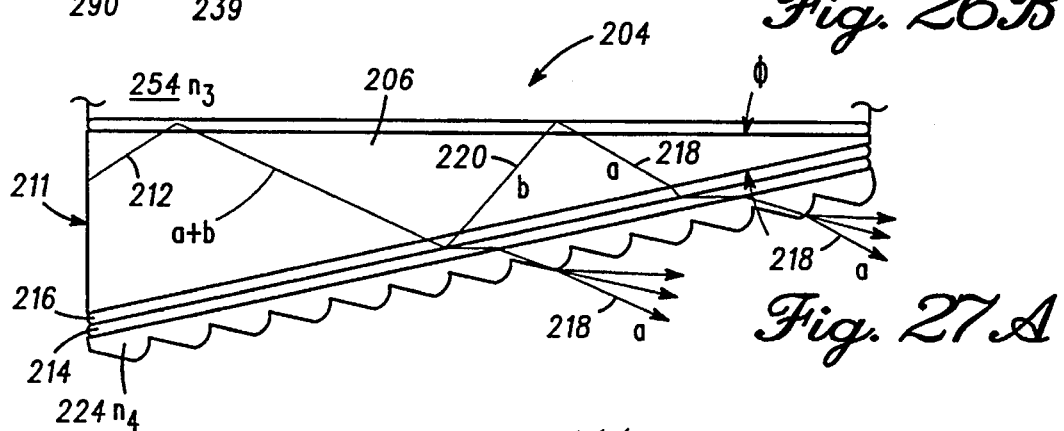
FIG. 27A illustrates a luminaire with a faceted redirecting layer and light polarization and polarization converting layers.
Figure 27B:
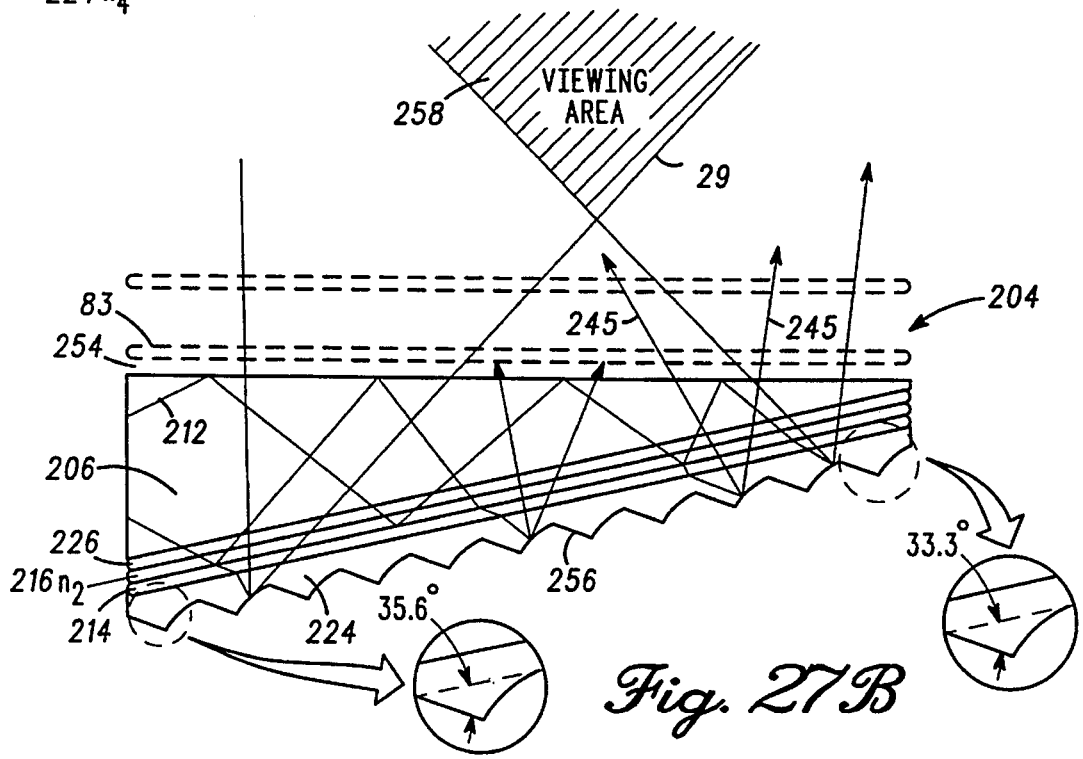
FIG. 27B is a variation on FIG. 27A, wherein the redirecting layers includes a reflecting layer with curved facets for focusing light in a preferred viewing zone.

In FIGS. 27A and B are additional preferred embodiments wherein the first layer means of index of refraction $n_2$ is most preferably not air. These embodiments show different examples of the light redirecting layer 224. Further, in FIG. 27A medium 254 having index $n_3$ need not be air, but the various indices of the system 204 must meet the requirements of Equation (10) to achieve the total internal reflection illustrated. In FIG. 27B the medium 254 is air, the light redirecting layer 224 has curved facets 256, and the light 245 is focused within a preferred viewing zone 258.

The embodiments of FIGS. 28 and 29 preferably utilize an air gap layer 260 as the first layer means. The layer 260 enables light to enter the layer 260 after the light 212 has achieved an angle of incidence less than the critical angle $\theta_c$ characteristic of an interface between the base layer 206 and the air gap layer 260. The embodiment of FIG. 28B includes a first redirecting layer 262 between the base layer 206 and a diffuser layer 264 and a second redirecting layer 265 on the other side of the base layer 206. This first redirecting layer 262 includes refracting/internally reflecting prisms 266 while the second redirecting layer 265 includes refracting prisms 268. Two of the polarization filter layer 216 are disposed either side of the base layer 206, each transmitting the appropriate light 218 or 220 which is passed through the associated light redirecting layer, 262 and 265, respectively. In FIG. 28C is a more preferred embodiment wherein the light redirecting layer 246 comprises a refracting/internally reflecting layer having the relatively small prisms 247. The surface angles of each of the prisms 247 can vary across the illustrated dimension of the redirecting layer 246 in a manner described hereinbefore. This variation in angle enables focusing different cones of light coming from the prisms 247 onto the preferred viewing zone 258 (see FIG.

27B). The light reflector layer 222 can be a metallic coating as described hereinbefore.

The reflector layer 222 can be applied to the converting layer 226 by conventional vacuum evaporation techniques or other suitable methods. The other layers, such as the redirecting layer 246 can be formed by casting a transparent polymeric material directly onto the matching layer 232 (see FIGS. 24C–F and 28C and D). The polarization filter layer 216 can likewise be manufactured by conventional methods, such as deposition of multiple thin layers directly onto the base layer 206. Also included is an angle transformer layer 274 coupled to the back surface 211 (see FIG. 28C). This angle transformer 274 includes prisms 276 which broaden the angular distribution of input light 212 to the base layer 206 to help provide a more spatially uniform form of the output light 218 to the LCD layer 230. Other forms of the angle transformer layer 274 can be a toughened layer and a hologram (not shown) coupled to the back surface 211 (or other input surface) without an intervening air gap.

Figure 28D:
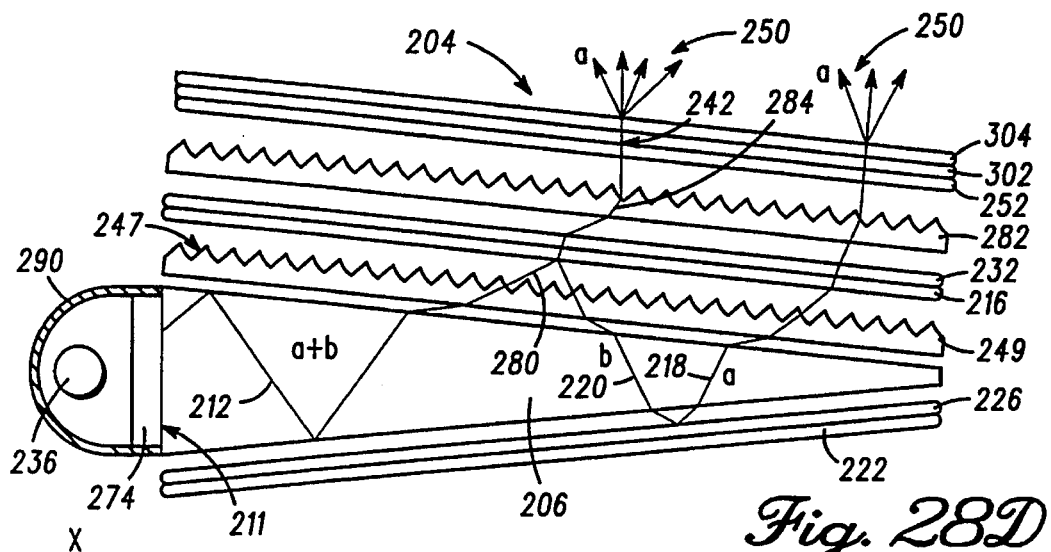
FIG. 28D is a variation on FIG. 28C.
Figure 28E:
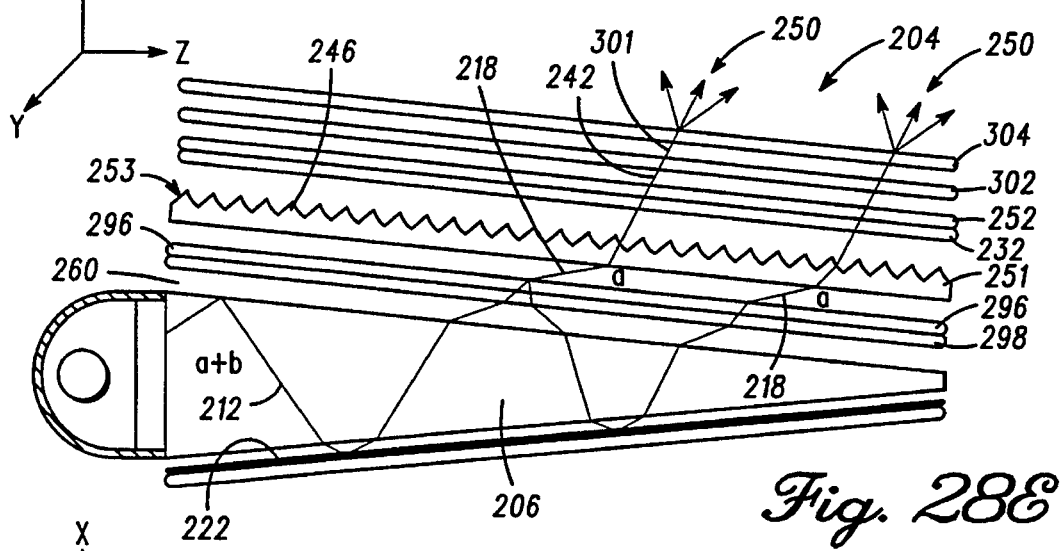
FIG. 28E is yet another variation on FIG. 28C.

In the preferred embodiment of FIG. 28D, a first prismatic light redirecting layer 249 is disposed between the base layer 206 and the polarization filter layer 216. This redirecting layer 249 reduces the angle of incidence of light 280 incident on the polarization filter layer 216. A second prismatic light redirecting layer 282 then redirects light 284 output from the filter layer 216 to an LCD layer 302 with a post diffuser layer 304, operable as a parallel diffuser as described hereinbefore. This embodiment timber includes the CCFT light source 236 with a reflector 290 having a position following at least a portion of an involute of the light source 236 inner diameter. Another portion of the reflector 290 directly opposite the back surface 211 is convexly curved or bent.

In the preferred embodiment of FIG. 28E a light redirecting layer 251 comprises refracting micro prisms 253. A polarization filter layer 296 is disposed adjacent a converting layer 298, and the transverse diffuser layer 252 is positioned between the redirecting layer 251 and the LCD layer 302. A parallel diffuser 304 is disposed on the light output side of the LCD layer 302 with the light 242 directed through the LCD layer 302 at a preferred angle to optimize output light 301 for best image-forming quality of the LCD layer 302 (contrast, color fidelity and response time).

Figure 29A:
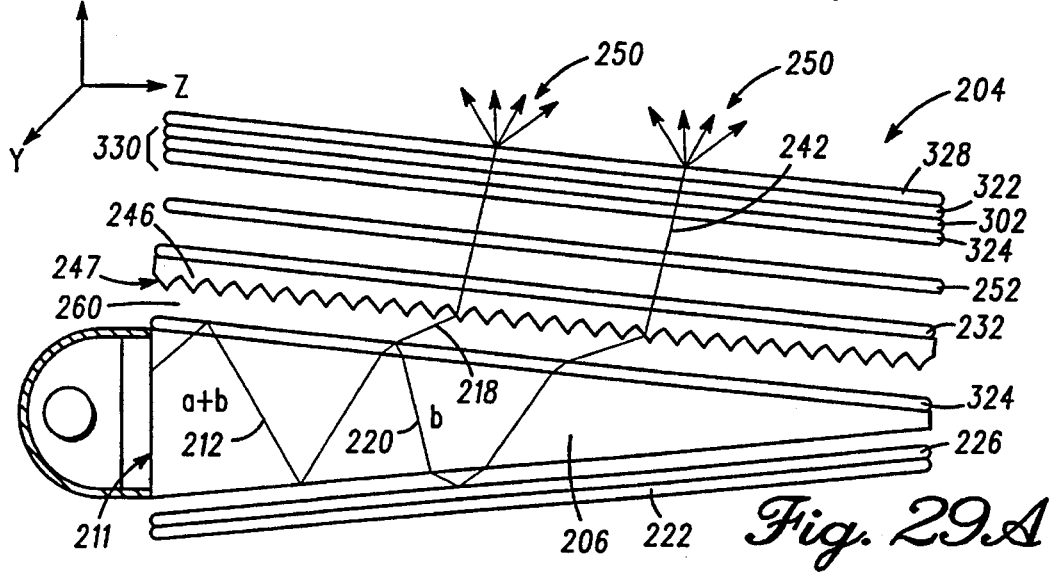

The embodiments of FIGS. 29A and B show some of the advantages of some forms of the invention over a conventional LCD polarizer system 304 shown in FIG. 30A. In FIG. 30A, a prior art backlight 306 emits light 308 of both polarizations in nearly equal proportions. A typical prior art LCD layer arrangement 310 includes a first form of polarization filter 312 and a second form of polarization filter 314 with the liquid crystal layer 316 sandwiched therebetween. In this LCD layer arrangement 310, the first polarization filter 312 must provide a high polarization ratio, that is, it must have an extremely low transmission of light of the second polarization state which is unwanted for input to the liquid crystal layer 316 in order for the LCD layer arrangement 310 to provide adequate LCD contrast. In practice, the polarization filter 312 has a high optical density for the desired light of the first polarization state as well. The resulting losses therefore further degrade the LCD light transmission and image output. In contrast to this prior art arrangement 310, the invention provides a much higher percentage of light which is preferred by the LCD layer arrangement 316 thereby making use of a substantial portion of the light of the unwanted second polarization and also minimizing loss of the desired light of the first polarization state.

In the embodiment of FIG. 28A this advantageous processing of the light 218 and the light 220 for the LCD layer 316 is accomplished by positioning the converting layer 226 adjacent the base layer 206. Disposed adjacent the converting layer 226 is the polarization filter layer 216. The light redirecting layer 224 includes curved microprismatic facets 318 to broaden the angle of light distribution in the xz plane and improve the uniformity of light distribution output from the luminaire system 204. A transverse diffuser 320 is preferably laminated to the light redirecting layer 224 or can be formed on opposite sides of a single polymeric layer (not shown). The polarizing filter layer 216 can be laminated or is disposed directly onto the converting layer 226 which in turn is laminated or deposited directly onto the first surface 208.

In the preferred embodiment of FIG. 29A the advantageous processing of the light 218 and the light 220 for the LCD layer 302 is accomplished by using a first polarization filter layer 324 and a second polarization filter layer 322. The first filter 324 can, however, have a relatively low polarization ratio compared to the prior art polarization filter 312. For example, the polarization filter layer 324 can have a lower dye concentration than the prior art filter 312. This difference enables higher LCD light transmission and improved image-forming properties described hereinbefore. This preferred embodiment utilizes a post diffuser layer 328 which is part of an LCD system 330 (the combination of the layer 324, the liquid crystal layer 302 and the layer 326). Preferably the post diffuser layer 328 is laminated to, or integrally formed with, the second polarization filter layer 322.

In the preferred embodiment of FIG. 29B, the advantages are achieved by using only one polarization filter layer 248 which results in reduced cost for the luminaire system 204 and increased light transmission. In this embodiment the light output through the matching layer 232 is preferably at least 90% composed of light 218 of the LCD preferred polarization state. A coupled angle transformer 334 coupled to the back surface 211 reduces the angular width of light distribution in the yz plane, and this reduced angular distribution further improves quality of the output light 250 making up the LCD image from the luminaire system 204.

Birefringent Layers in Luminaire Systems

A birefringent material can be used to advantage in the polarized light luminaire system 204 discussed hereinbefore. In the embodiment illustrated in FIG. 31A, the first layer 214 can be a birefringent material of index $n_2$ with two different optical indices $n_{2\alpha}$ and $n_{2\beta}$ for the light 212 of two different polarization states "a" and "b", both indices being less than one. This light 212 encounters the layer 214 near the respective critical angles for these two polarization states, $$\theta_{c\alpha} = arc\ sin\ (n_{2\alpha}/n_1) \qquad (15)$$

and $$\theta_{c\beta} = arc\ sin\ (n_{2\beta}/n_1) \qquad (16)$$

The conditions of Equation (10) must be satisfied for $n_2$-equal to both $n_{2\alpha}$ and $n_{2\beta}$, independently. The light 212 of both polarization states decreases its angle of incidence by an angle $2\Phi$ for each cyclic reflection from the first surface 208 and the second surface 210 as described previously. In this embodiment $n_{2\alpha} > n_{2\beta}$ and therefore $\theta_{c\alpha} > \theta_{c\beta}$. As the incidence angle for both polarization states decreases, the light 212 of both polarization states can encounter the interface with the birefringent first layer 214 with the light having an incidence angle less than the first critical angle $\theta_{c\alpha}$, but exceeding the second critical angle $\theta_{c\beta}$. Therefore, light 218 of the first polarization state is at least partially transmitted through the birefringent first layer 214, while the light 220 of the second state is preferentially reflected by total internal reflection. This reflected second-state light 220 and the residual first-state light 218 continue to decrease their angles of incidence with successive reflections. The light 218 of the first polarization state is transmitted at each successive encounter with the interface between the first layer 214 and the base layer 206. The light 220 of the second state continues to undergo total internal reflection at this interface until its angle of incidence becomes less than the second critical angle θcβ, at which point this second-state light 220 also is at least partially transmitted through the birefringent first layer 214. By virtue of this mechanism and of the difference in indices $n_{2\alpha}$ and $n_{2\beta}$, the light exiting the birefringent first layer 214 has a different angle distribution for the two polarization states "a" and "b".

Birefringent materials can in general include crystalline materials having an anisotropic index of refraction. A preferred material is a stretched polymeric film such as stretched fluorinated film. The stretching orients the film and makes the index of refraction different along that direction. Elsewhere we give birefringence values of these stretched fluoropolymer film with Δn ranging from 0.030–0.054. Other rims are PVA (Polyvinylalcohol). Polypropylene, Polyolefin or even Polyester (Mylar). Mylar is actually biaxial, but may still be used to rotate polarization. More traidtional uniaxial birefringent materials are: Calcite and Quartz. These are not as practical as the strethced films. In practice the two polarization states are well-separated only if the two indices are sufficiently different. This condition may be expressed as, $$\theta_{c\alpha} \geq \theta_{c\beta} + s\Phi \quad (17)$$

where s must be at least 1 and is preferably greater than four. This condition may be achieved, for example, using uniaxially oriented fluoropolymer material for the birefringent layer, acrylic polymer for the base layer 206 and reasonable values of Φ (between one and one-and-a-half degrees is typical for notebook computer LCD backlighting).

FIG. 31B is like FIG. 31A, but the redirecting layer 224 has been added; and the preferred embodiment uses air for the layer 207 having index $n_3$. The light 218 and the light 220 are output from the system 204 at different angles.

FIG. 31C illustrates another variation on FIGS. 31A and B, but the redirecting layer 224 comprises a flat faceted reflective layer 340. The light 218 and also the light 220 are directed to a converting layer 346 which transmits the light 218 without substantially changing its polarization state; however, the converting layer 346 does convert the light 220 to the light 218 of the desired first polarization state. The converting layer 346 shown in FIG. 31C has a construction that operates to convert the light polarization only within the angular range occupied by the light 220. The converting layer 346 thus utilizes the schematically illustrated angular separation of the light 218 and the light 220 to carry out the conversion of the light 220 to the light 218 without converting the light 218 to the light 220.

Figure 31D:
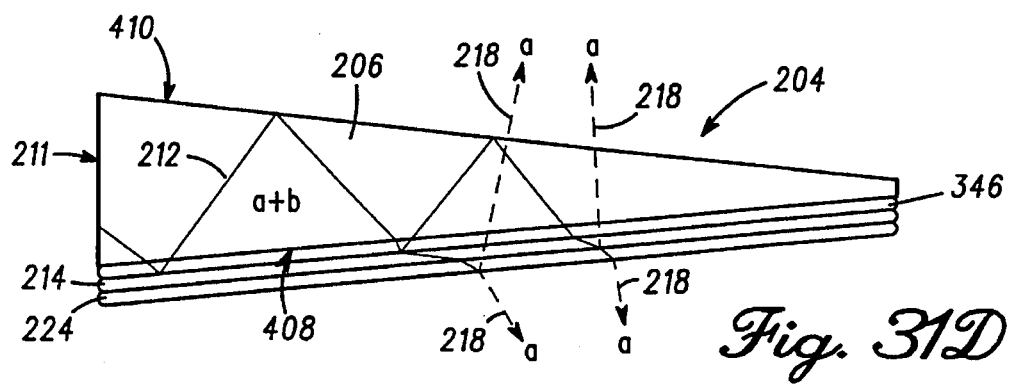
FIG. 31D is similar to FIG. 31C but the converting layer is on the same side of the base layer as the birefringent layer.
Figure 31E:
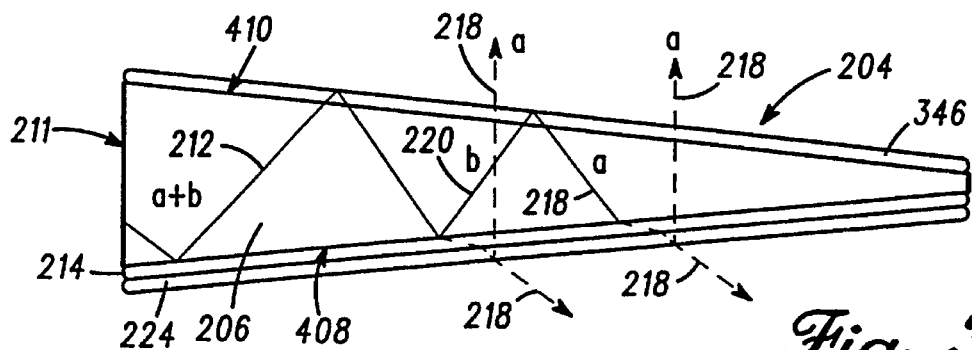
FIG. 31E illustrates a variation on FIG. 31C with the converting layer coupled directly to the base layer.

In the embodiments of FIGS. 31D and E, the reflected form of the light 220 is returned to the interface of the base layer 206 with the birefringent first layer 214. This is accomplished by virtue of total internal reflection of the light 220 together with passing at least twice through the convening layer 346, which results in at least partially converting the light 220 into the light 218 of the first polarization state. Since this light 218 has an incidence angle less than the first critical angle $\theta_{c\alpha}$, the light 218 is transmitted through the interface between the base layer 206 and the first layer 214. This light 218 can then be reflected or transmitted by the redirecting layer 224, depending on the particular nature of the redirecting layer 224. The alternatives of transmitted and reflected light are shown in phantom in FIGS. 31D and E. Further, in the embodiment of FIG. 31D, the converting layer 346 is on the same side of the base layer 206 as the birefringent first layer 214. The converting layer 346 is also disposed between the base layer 206 and the birefringent first layer 214. The embodiment of FIG. 31E shows another variation on FIG. 31D with the converting layer 226 and the birefringent first layer disposed on opposite sides of the base layer 206.

Figure 31F:
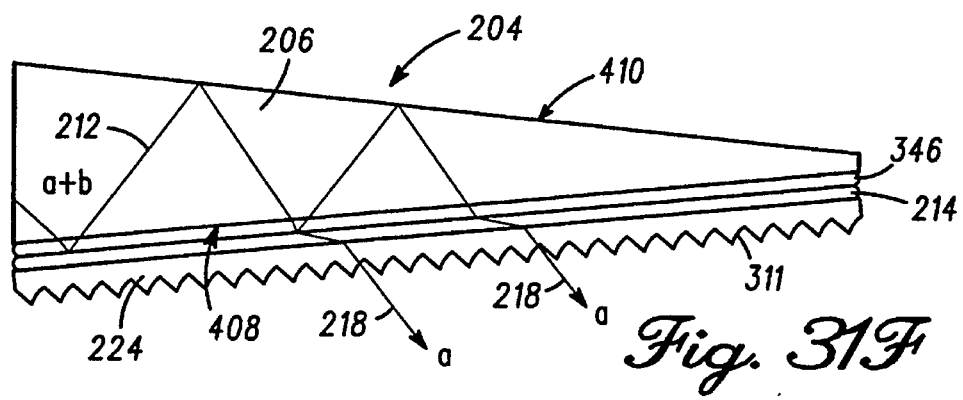
FIG. 31F is similar to FIG. 31D but the redirecting layer comprises a faceted layer.
Figure 31G:
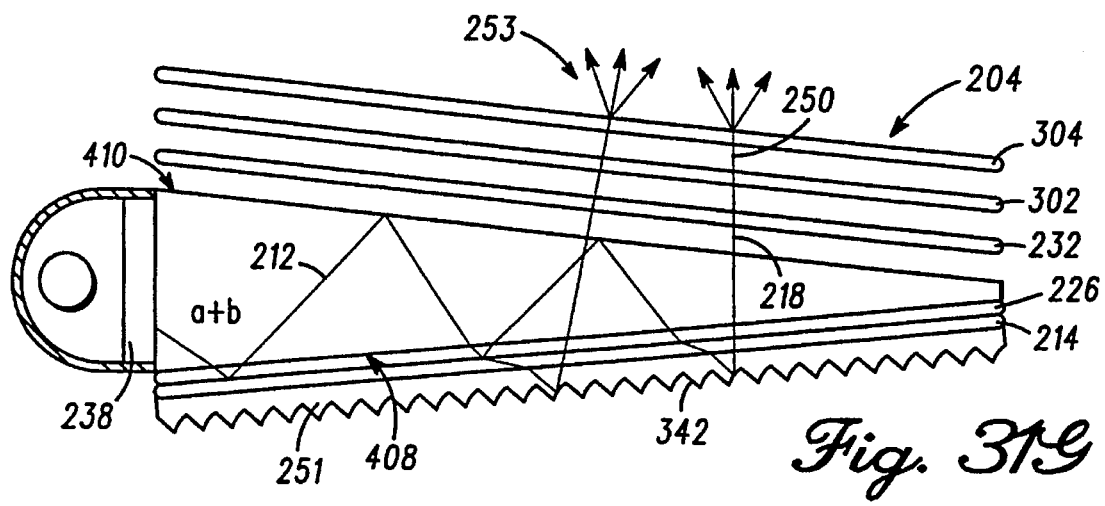
FIG. 31G is based on the embodiment of FIG. 31F but also includes a matching layer, an LCD layer and a diffuser layer.
Figure 31H:
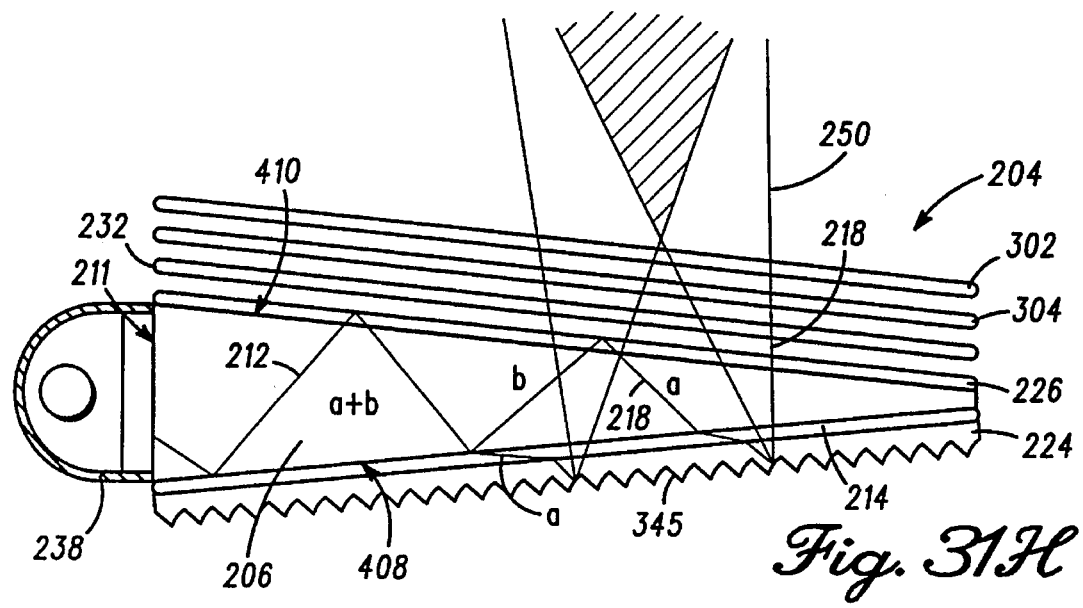
FIG. 31H is a variation on FIG. 31G.

In the embodiment of FIG. 31F the system 204 is similar to the embodiment of FIG. 31D, but the redirecting layer 224 comprises a layer of facets 311. In the embodiment of FIG. 31G, the system 204 further includes the LCD layer 302, the matching layer 232, and the diffuser layer 304 is disposed in a spatial position after the light 218 has passed through the LCD layer 302. The redirecting layer 224 comprises the layer of microprisms 251 having flat faces and a metallic coating 342 for high light reflectivity. Also shown is the angle transformer layer 238 to control the spatial distribution of the light 253 output from the system 204. The embodiment of FIG. 31H is similar to the embodiment in FIG. 31G, but the system 204 uses curved facets 345 for the redirecting layer 224 with facet angles adjusted at different spatial locations to focus the output light 250 onto a preferred viewing zone. The angle transformer 238 is illustrated as a CPC.

Light Diffuser After LCD Layer Processing

In the embodiments shown in FIGS. 12N and 12O the LCD display 216 or 236 provides an output light to the viewer. In a further improvement of these embodiments a post diffuser layer 350 is disposed in the path of the light 250 output from the LCD layer 302 (see FIG. 32A and B). In the preferred embodiments shown in these figures, the general operation is similar to the embodiments illustrated in FIGS. 26B, 28D and E; 29A and B and 31G, but without any of the polarization filter layers 216. As described hereinbefore, it is advantageous to provide light to the LCD layer 302 in a collimated angular range, preferably substantially perpendicular to the LCD layer 302 to optimize the image output therefrom. The use of the post diffuser layer 350 allows the output light 253 to provide an image to viewers over a wide angular range without compromising light contrast and color fidelity.

Figure 32A:
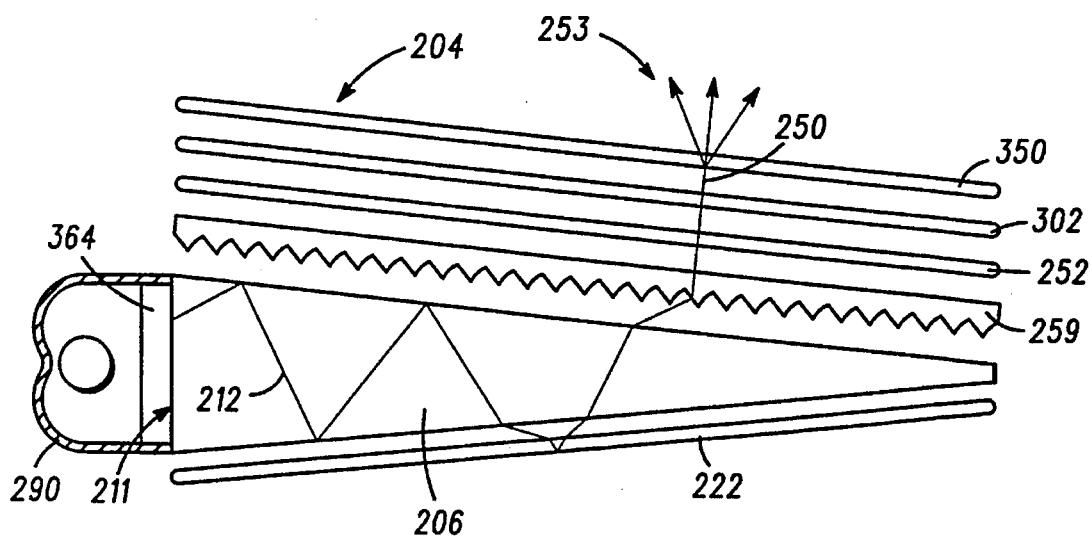
FIG. 32A illustrates a luminaire system including an LCD layer and a post LCD diffuser layer for processing unpolarized light.

One aspect which is preferably controlled in a system including the post diffuser layer 350 is the width in the xz-plane of the angular distribution transmitted through the LCD layer 302. The output angular distribution preferably has a full width less than $$\Delta\theta_{pd} = (2n_{lcd})\left(\frac{l}{d}\right) \quad (18)$$

and a full width less than half of this value is even more preferred. In this equation $\Delta\theta_{pd}$ is in radians, $n_{LCD}$ is the average index within the LCD layer 302, l is the repetition period of display pixel rows in the z-direction, and d is the thickness of the LCD layer 302. For a typical LCD used in notebook computers, $n_{LCD}$ is approximately 1.5, l=0.3 mm, and d=3 mm. For this example, $\Delta\theta_{pd}$ is preferably less than 18 degrees, and a full-width of nine degrees or less is even more preferred. By comparison, Equation (8) can be used to calculate the output angular width of the current invention using a flat-facet prismatic redirecting layer, such as is shown in FIG. 32A (layer 359) or in FIGS. 28B (layer 262). For a typical notebook computer backlighting system, Φ=1.3 degrees and n=1.49. In this example, Equation (8)

gives an output angular distribution of eighteen degrees.

FIG. 32A shows a preferred arrangement of the system 204 having a parallel form of the post diffuser 350 disposed overlying the LCD layer 302. Also included is a holographic angle transformer 364 disposed on the back surface 211.

Figure 32B:
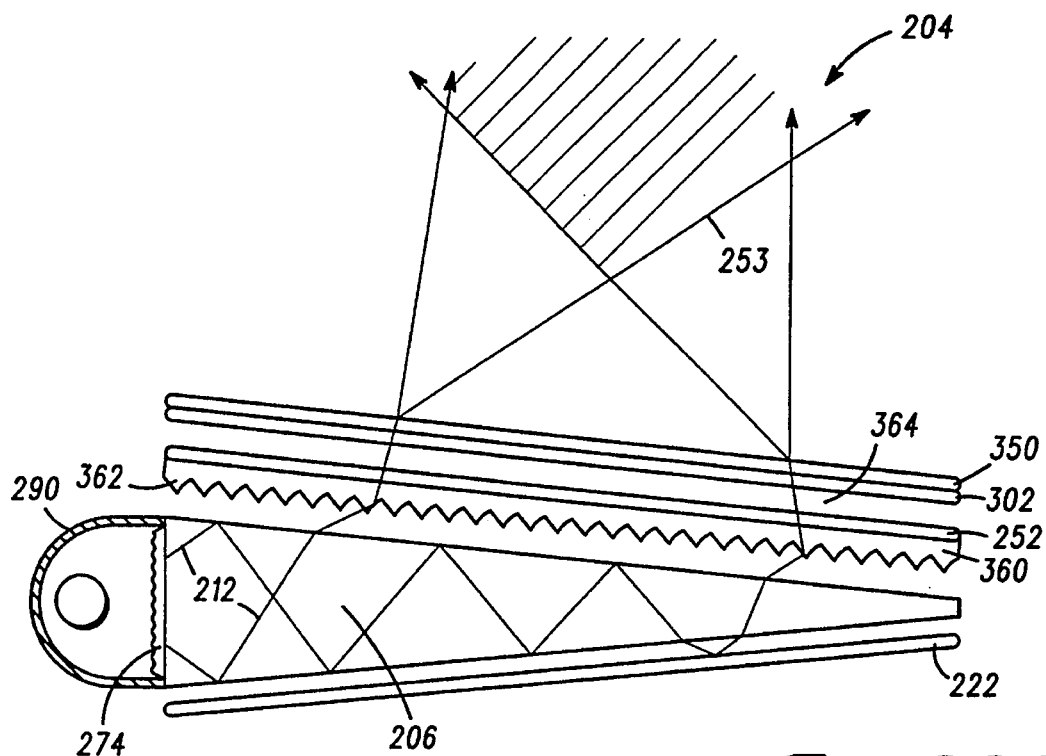
FIG. 32B is a variation on FIG. 32A.
Figure 32C:
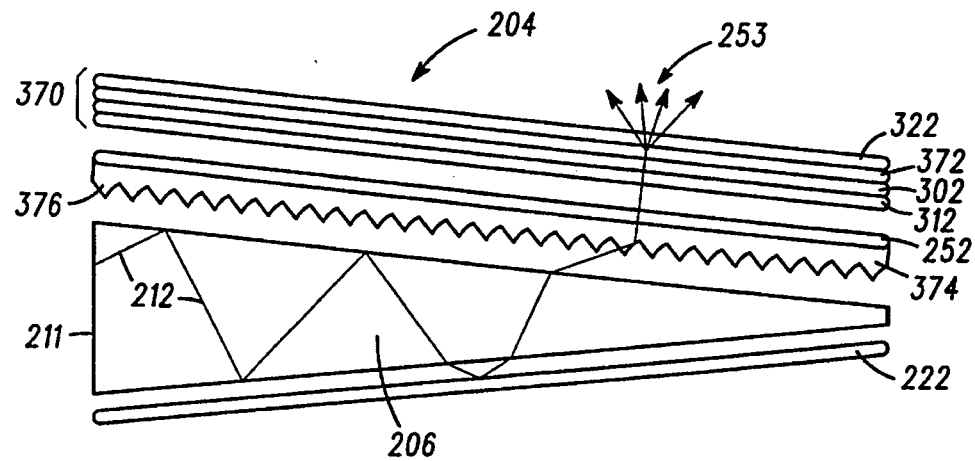
FIG. 32C is a variation on FIG. 32B.

In another embodiment shown in FIG. 32B a refracting/internally reflecting layer 360 includes curved facets 362 in order to narrow the angular distribution in the xz-plane of light 364 directed through the LCD layer 302, and thereby to improve image quality by reducing parallax at the post diffuser layer 350. The embodiment has the curved reflecting facets 362, but flat refracting facets can achieve the desired function as well, as shown in FIG. 32C. In either case, the curved facets 362 preferably have a focal length less than the repetition period between each of the facets 362. The angular distribution in the xz-plane is preferably narrowed beyond the width given in Equation (8), and is most preferably narrowed beyond the width given in the equation above. In addition, the facet angles of the redirecting layer 224 are arranged to focus the light output from different portions of the system 204 onto a preferred viewing zone. This figure also shows the micro-prismatic angle-transforming layer 274.

In FIG. 32C is shown a variation on the embodiment of FIG. 32B. In the system 204 an LCD layer arrangement 370 differs from the prior art LCD layer arrangement 310 illustrated in FIG. 30. In particular, a parallel light diffuser layer 372 (such as a holographic diffuser) is disposed between the LCD layer 302 (layer 316 in FIG. 30) and the second polarization filter layer 322 (layer 314 in FIG. 30). This arrangement enables the second polarization filter layer 322 to reduce the glare which can otherwise be caused by ambient light being reflected by the diffuser layer 372. FIG. 32C further shows a light redirecting layer 374 having curved refracting facets 376 which perform the same angle narrowing function as the curved reflecting facets 362 shown in FIG. 32B.

While preferred embodiments of the inventions have been shown and described, it will be clear to those skilled in the art that various changes and modifications can be made without departing from the invention in its broader aspects as set forth in the claims provided hereinafter.

We claim:

1. An optical device for operating on light from a source and for selectively outputting light to a viewer, comprising:

a wedge-shaped base layer having an optical index of refraction $n_1$ and a first and a second surface, said base layer further including a back surface spanning said first and second surfaces, and the light exiting said base layer when the light being reflected therein decreases its angle relative to a normal to said second surface at a point of incidence and achieves an angle of incidence less than. a critical angle $\theta_c$ relative to the normal at the point of incidence on said second surface;

first layer means including a layer having index $n_2$ less than $n_1$ disposed beyond said second surface relative to said base layer and for enabling light to enter into and pass across said first layer means after output from said base layer when the light in said base layer achieves the angle of incidence less than the critical angle $\theta_c$ characteristic of an interface between the base layer and said first layer means of index $n_2$;

second layer means for preferably outputting light of a first polarization state compared to a second polarization state, said second layer means being disposed beyond said second surface relative to said base layer and said second layer means further able to reflect at least part of the light having the second polarization state; and light redirecting means at least one of overlying and underlying said first layer means, said redirecting means allowing transmission of light thereacross its thickness and for redirecting light output from said first layer means.

2. The optical device as defined in claim 1 further including a liquid crystal display layer and light diffuser means for diffusing light output from said liquid crystal layer.

3. The optical device as defined in claim 1 wherein said light redirecting means includes at least one of a faceted layer, isotropic multi-planar layers and a multi-layer dielectric coating.

4. The optical device as defined in claim 1 wherein said light redirecting means acts to collimate the light over a controlled angular range.

5. The optical device as defined in claim 1 where said second layer means for preferably outputting light is disposed at least one of (a) between said liquid crystal layer and said base layer and (b) further from said base layer then said liquid crystal display layer.

6. The optical device as defined in claim 1 further including converting means for changing light of the second polarization state to the first polarization state.

7. An optical device for operating on light from a source and for selectively outputting light to a viewer, comprising:

a base layer having an optical index of refraction $n_1$ and a first and a second surface, said base layer further including a back surface spanning said first and second surfaces, and the light exiting said base layer when the light contained therein decreases its angle relative to a normal to said second surface at the point of light incidence and achieves an angle of incidence less than a critical angle $\theta_c$ relative to the normal at the point of light incidence on said second surface;

first layer means including a layer having index $n_2$ less than $n_1$ disposed beyond said second surface relative to said base layer and for enabling light to enter into and pass across said first layer means after output from said base layer when the light in said base layer achieves the angle of incidence less than the critical angle $\theta_c$ characteristic of an interface between the base layer and said first layer means of index $n_2$;

first light redirecting means for operating on light having passed through said base layer and for redirecting the light through said base with the light also traversing said first redirecting means;

second light redirecting means for operating on light having passed through said base layer and said first redirecting means and for controlling the angular range of the light output from said optical device; and means for preferably outputting light of a first polarization state compared to a second polarization state and said means for preferably outputting light reflects at least part of the light having the second polarization state.

8. The optical device as defined in claim 7 further including converting means for changing light of the second polarization state to light of the first polarization state.

9. The optical device as defined in claim 8 wherein said converting means reflects at least part of the light having the second polarization state and is disposed at least one of (a) between said liquid crystal layer and said base layer and (b) further from said first surface than said second surface with said liquid crystal layer disposed nearer said base layer first surface.

10. The optical device as defined in claim 8 wherein said converting means comprises a matching layer providing a preferred polarization state for said liquid crystal layer.

11. The optical device as defined in claim 9 wherein said converting means comprises a birefringent layer.

12. The optical device as defined in claim 7 further including light diffuser means for diffusing light output from said base layer and broadening the light over an angular range for the viewer.

13. The optical device as defined in claim 12 wherein said light diffuser means comprises at least on of (a) a transverse diffuser and (b) a parallel diffuser.

14. The optical device as defined in claim 7 wherein said first light redirecting means comprises at least one of a faceted layer, isotropic multi-planar layers, a multi-layer dielective coating, a lens and a curved reflector.

15. The optical device as defined in claim 7 wherein said base layer comprises at least one of a wedge-shaped layer, a disk, an oblate shape, a parallelpiped and a cylinder.

16. The optical device as defined in claim 7 wherein at least one of said second light redirecting means and said first layer means include an air gap.

17. An optical device for operating on light from a source and for selectively outputting light to a viewer, comprising:

a base layer having an optical index of refraction $n_1$ and a first and a second surface, said base layer further including a back surface spanning said first and second surfaces, and the light exiting said base layer when the light being reflected therein decreases its angle relative to a normal to said second surface at the point of light incidence and achieves an angle of incidence less than a critical angle $\theta_c$ relative to the nominal at the point of light incidence on said second surface;

first layer means including a layer having index $n_2$ less than $n_1$ disposed beyond said second surface relative to said base layer and for enabling light to enter and pass across said first layer means after output from said base layer when the light in said base layer achieves the angle of incidence less than the critical angle $\theta_c$ characteristic of an interface between the base layer and said first layer means of index $n_2$;

light redirecting means for operating on light having passed through said base layer and said first layer means and for controlling the angular range of the light output from said optical device;

means for preferably outputting light of a first polarization state compared to a second polarization state and reflecting at least part of the light having the second polarization state; and a liquid crystal display layer positioned to receive the light output from said light redirecting means.

18. The optical device as defined in claim 17 further including converting means for changing light of the second polarization state to light of the first polarization state.

19. The optical device as defined in claim 18 wherein said converting means reflects at least part of the light having the second polarization state and is disposed at least one of (a) between said liquid crystal layer and said base layer and (b) further from said first surface than said second surface with said liquid crystal layer disposed nearer said base layer first surface than said second surface.

20. The optical device as defined in claim 19 wherein said convening means comprises a matching layer providing a preferred polarization state for said liquid crystal layer.

21. The optical device as defined in claim 20 wherein said matching layer is disposed between said base layer and said liquid crystal layer and both of said layers are disposed nearer said second surface than said first surface.

22. The optical device as defined in claim 21 further including means for preferably outputting light of a first polarization state compared to a second polarization state, said means for preferably outputting light being disposed nearer said first surface than said second surface.

23. The optical device as defined in claim 19 wherein said converting means comprises a birefringent layer.

24. The optical device as defined in claim 17 wherein said light redirecting means is disposed nearer said first surface then said second surface and further from said base layer than said means for preferably outputting light.

25. The optical device as defined in claim 17 wherein said light redirecting means comprises at least one of (a) a reflective layer able to reflect light and (b) a transmissive layer able to modify the angular distribution of light passing therethrough.

26. The optical device as defined in claim 17 further including light diffuser means for diffusing light output from said liquid crystal display layer and broadening the light over an angular range for the viewer.

27. The optical device as defined in claim 17 wherein said means for preferably outputting light is disposed at least one of (a) between said liquid crystal display layer and said base layer and (b) further from said base layer than said liquid crystal display layer.

28. The optical device as defined in claim 17 wherein said base layer comprises at least one of a wedge-shaped layer, a disk, an oblate shape, a parallelpiped and a cylinder.

29. The optical device as defined in claim 17 wherein said light diffuser means comprises at least one of (a) a transverse diffuser and (b) a parallel diffuser.

30. An optical device for operating on light from a source and for selectively outputting light to a viewer, comprising:

a base layer having an optical index of refraction $n_1$ and a first and a second surface, said base layer further including a back surface spanning said first and second surfaces, and the light exiting said base layer when the light being reflected therein decreases its angle relative to a normal to said second surface at the point of incidence and achieves an angle of incidence less than a critical angle $\theta_c$ relative to the normal at the point of incidence on said second surface;

first layer means including a layer having index $n_2$ less than $n_1$ disposed beyond said second surface relative to said base layer and for enabling light to enter and pass across said first layer means after output from said base layer when the light in said base layer achieves the angle of incidence less than the critical angle $\theta_c$ characteristic of an interface between the base layer and said first layer means of index $n_2$;

second layer means for preferably outputting light of a first polarization state compared to a second polarization state, said second layer means being disposed beyond said second surface relative to said base layer and said second layer means further able to reflect at least part of the light having the second polarization state; and a liquid crystal display layer positioned to receive the light of first polarization state and output the light to the viewer.

31. The optical device as defined in claim 30 further including light redirecting means for operating on light having passed through said base layer and said first layer means and also for controlling the angular range of the light output from said optical device.

32. The optical device as defined in claim 31 wherein said light redirecting means comprises at least one of (a) a reflective layer able to reflect light and (b) a transmissive layer able to modify the angular distribution of light passing therethrough.

33. The optical device as defined in claim 30 further including light diffuser means for diffusing light output from said liquid crystal layer.

34. The optical device as defined in claim 30 where said second layer means for preferably outputting light is disposed at least one of (a) between said liquid crystal layer and said base layer and (b) further from said base layer then said liquid crystal display layer.

35. The optical device as defined in claim 30 further including converting means for changing light of the second polarization state to the first polarization state.

36. An optical device for collecting light from a source and outputting the light, comprising:

a first layer having an optical index of refraction $n_1$ said layer having a back surface and first and second surfaces spanning said back surface;

at least one second layer with an optical index of refraction $n_2$ and light being input through said back surface of said first layer entering and crossing through said second layer when the light being reflected in said first layer achieves an angle of reflection less than the critical angle of incidence $\theta_c$ relative to a normal with said second surface at the point of incidence, the $\theta_c$ being characteristic of the interface between said first layer and said second layer;

third layer means disposed adjacent said at least one second layer acting cooperatively with said first layer and said at least one second layer to control angular distribution of the light of said optical device and for outputting the light from said optical device after passing across said third layer means; and a diffuser layer at least one of (a) disposed between said first layer and a source of light for said optical device, (b) beyond said first layer relative to said base layer and (c) beyond said third layer means relative to said second layer with said diffuser layer providing broadened light within an angular distribution.

37. The optical device as defined in claim 36 further including means for preferably outputting light of first polarization state relative to a second polarization state, said means for preferably outputting light able to reflect at least part of the light having the second polarization state.

38. The optical device as defined in claim 37 further including converting means for changing light of the second polarization to the first polarization state.

39. The optical device as defined in claim 36 further including a display layer disposed between said base layer and said diffuser layer.

40. The optical device as defined in claim 36 wherein said base layer comprises at least one of a wedge-shaped layer, a disk, an oblate shape, a parallelpiped and a cylinder.

41. An optical device for operating on light from a source and for selectively outputting light to a viewer, comprising:

a base layer having an optical index of refraction $n_1$ and a first and second surface, said base layer further including a back surface spanning said first and second surfaces, and the light exiting said base layer when the light being reflected therein decreases its angle relative to a normal to at least one of said first and second surfaces at the point of light incidence and achieves an angle of incidence less than a critical angle $\theta_c$ relative to the normal at the point of light incidence on said surfaces;

first layer means of index of refraction $n_2$ disposed beyond at least one of said first and second surfaces relative to said base layer and for enabling light to enter and pass across said first layer means after output from said base layer when the light in said base layer achieves the angle of incidence less than the critical angle $\theta_c$ characteristic of an interface between said base layer and said first layer;

second layer means for preferably outputting light of a first polarization state compared to a second polarization state, said second layer means disposed beyond at least one of said first and second surfaces relative to said base layer and said second layer means further enabling reflection of at least part of the light having the second polarization state;

light control layer means for at least one of redirecting and diffusing light output from said first layer means, thereby providing light of controlled angular distribution; and imaging layer means for forming an image from the light of the first polarization state for display to the viewer.

42. The optical device as defined in claim 41 further including converting means for changing light of the second polarization state to the first polarization state.

43. The optical device as defined in claim 42 wherein said convening means is disposed at least one of (a) between said liquid crystal layer and said base layer and (b) further from said second surface relative to said first surface with said liquid crystal layer disposed further said first surface relative to said second surface.

44. The optical device as defined in claim 41 wherein said light control layer means for redirecting light comprises a faceted layer for controlling the angular distribution of light output from said optical device.

45. The optical device as defined in claim 41 wherein said light control layer means for diffusing light is disposed at least one of (a) between said base layer and said imaging layer and (b) between the viewer and said imaging layer.

46. The optical device as defined in claim 41 wherein said base layer comprises at least one of a wedge-shaped layer, a disk, an oblate shape, a parallelpiped and a cylinder.

47. The optical device as defined in claim 41 wherein said imaging layer comprises at least one of a transparent display, a holographic image, a liquid crystal layer and a CCD layer.

48. The optical device as defined in claim 41 further including antireflection layers to reduce scattering.

49. The optical device as defined in claim 41 wherein said light control layer means includes a faceted layer of variable facet angles.

50. The optical device as defined in claim 41 wherein said second layer means is selected from the group consisting of an optical interference layer, a Brewster stack, a combination of the interference coating and the Brewster stack, a roughened surface, specular reflection layer, a dichroic layer, and a birefringent layer.

51. An optical device for operating on light from a source and for selectively outputting light to a viewer, comprising;

a base layer having an optical index of refraction $n_1$ and a first and a second surface with said base layer further including a back surface spanning said first and second surfaces, and the light exiting said base layer when the light achieves an angle of incidence less than a critical angle $\theta_c$ relative to a normal at the point of light incidence on one of said first and second surfaces;

first layer means at least one of disposed above said first surface and below said second surface relative to said base layer and having an optical index of refraction $n_2$ for allowing transmission of light received from said base layer, the light being output from said base layer upon achieving the $\theta_c$ characteristic of the interface between said base layer and said first layer means;

second layer means for preferably outputting light of a first polarization state compared to a second polarization state, said second layer means disposed beyond said second surface relative to said base layer and said second layer means further enabling reflection of at least part of the light having the second polarization state;

a liquid crystal display layer positioned to receive the light of first polarization state; and light diffuser means for diffusing light output from said first layer means and said liquid crystal display layer to broaden the light in a controlled angular distribution thereby outputting light to the viewer without distorting image quality.

52. The optical device as defined in claim 51 further including converting means for changing light of the second polarization state to light of the first polarization state.

53. The optical device as defined in claim 52 wherein said converting means is disposed at least one of (a) between liquid crystal display layer and said base layer and (b) further from said first surface than said second surface with said liquid crystal display layer disposed further from said second surface than said first surface.

54. The optical device as defined in claim 51 further including light redirecting means for operating on light output from said base layer for providing angular control of light output to the viewer.

55. The optical device as defined in claim 54 wherein said light redirecting means comprises at least one of (a) a reflective layer able to reflect light and (b) a transmissive layer able to modify the angular distribution of light passing therethrough.

56. The optical device as defined in claim 51 wherein said means for preferably outputting light is disposed at least one of (a) between said liquid crystal display layer and said base layer and (b) further from said base layer then said liquid crystal display layer.

57. The optical device as defined in claim 51 wherein said base layer comprises at least one of a wedge-shaped layer, a disk, an oblate shape, a parallelpiped and a cylinder.

58. An optical device for operating on light from a source and for selectively outputting light to a viewer, comprising:

a base layer having an optical index of refraction $n_1$ and a first and a second surface, said base layer further including a back surface spanning said first and second surfaces and the light exiting said base layer when the light achieves an angle of incidence less than a critical angle $\theta_c$ relative to a nominal at the point of incidence on said second surface;

first layer means at least one of disposed beyond said first surface relative to said base layer and beyond said second layer surface relative to said base layer and having an optical index of refraction $n_2$ for allowing transmission of light received from said base layer, the light being output from said base layer upon achieving the $\theta_c$ characteristic of the interface between said base and said first layer means;

second layer means for preferably transmitting light of a first polarization state relative to a second polarization state and reflects at least a portion of the light of second polarization state, said second layer means disposed at least one of (a) further from said first surface than said first layer means; (b) nearer said first surface than said second surface and said first layer means relative to said base layer; (c) nearer said second surface than said first surface but further from said base layer than said first layer means; and (d) nearer said second surface than said first layer means;

light redirecting means at least one of overlying and underlying said first layer means for operating on the light reflected by said second layer means and redirecting it back toward said second layer means;

third layer means for convening at least part of the light of the second polarization state to light of the first polarization state; and a display layer positioned to receive the light of first polarization state output from said third layer means.

59. The optical device as defined in claim 58 wherein said means for preferably transmitting light is disposed at least one of (a) between said liquid crystal display layer and said base layer and (b) further from said base layer then said liquid crystal display layer.

60. The optical device as defined in claim 58 wherein said third layer means for converting light is disposed at least one of (a) between said liquid crystal layer and said base layer and (b) nearer said second surface than said first surface with said liquid crystal layer disposed nearer said first surface than said second surface.

61. The optical device as defined in claim 58 wherein said third layer means for converting comprises a matching layer providing a preferred polarization state for said liquid crystal layer.

62. The optical device as defined in claim 58 wherein said light redirecting means comprises at least one of (a) a reflective layer able to reflect light, (b) a transmissive layer able to modify the angular distribution of light passing therethrough, and (c) a faceted layer having a variable facet angle.

63. The optical device as defined in claim 58 wherein said display layer comprises at least one of (a) a liquid crystal layer, (b) a transparent display, (c) a hologram image embedded in a medium and (d) a CCD layer.

64. The optical device as defined in claim 58 further including light diffuser means for diffusing light output from said display layer and broadening the light in a controlled angular range to provide light to the viewer over a range of viewing angle.

65. The optical device as defined in claim 58 wherein said base layer comprises at least one of a wedge-shaped layer, a disk, an oblate shape, a parallelpiped and a cylinder.

66. An optical device for operating on light from a source and for selectively outputting light to a viewer, comprising:

a base layer having an optical index of refraction $n_1$, and a first and a second surface, said base layer further including a back surface spanning said first and second surfaces;

means for incrementally changing an angle of light propagation in said base layer of said optical device, the light achieving an angle of incidence less than a critical angle $\theta_c$ relative to a normal to at least one of said first and second surfaces at the point of incidence, the light thereby exiting said base layer;

layer means for receiving the light from said base layer and preferably outputting light of a first polarization state compared to a second polarization state, said layer means including means for preferably passing said light of first polarization state and reflecting at least part of the light of second polarization state and said layer means further including converting means for changing said light of second polarization state to said light of first polarization state; and a liquid crystal display layer positioned to receive said light of first polarization state.

67. The optical device as defined in claim 66 wherein the reflected light of second polarization state follows a collimated path.

68. The optical device as defined in claim 66 wherein said means for incrementally changing light angle comprises a changing index of refraction in said base layer.

69. The optical device as defined in claim 66 wherein said means for incrementally changing the angle of light comprises a nonlinear shape of said base layer.

70. The optical device as defined in claim 66 further including light diffuser means for diffusing light output from said layer means and said liquid crystal display layer to broaden the light in a controlled angular distribution in a plane thereby outputting light to a viewer over a range of viewing angle without distorting image quality.

71. The optical device as defined in claim 66 wherein said means for incrementally changing angle includes means for causing an angular change of light per reflection cycle of less than $(4 \times (\arc \sin(h/L))$ where h is thickness of the base layer wherein the light is input and L is length of the base layer.

72. The optical device as defined in claim 66 wherein said converting means includes a birefringent layer.

73. The optical device as defined in claim 66 wherein said base layer comprises at least one of a wedge-shaped layer, a disk, an oblate shape, a parallelpiped and a cylinder.

74. An optical device for collecting light from a source and outputting the light, comprising:

a first layer having an optical index of refraction $n_1$ said layer having a back surface and first and second surfaces spanning said back surface;

at least one second layer with an optical index of refraction $n_2$ and light being input through said back surface of said first layer entering and crossing through said second layer when the light being reflected in said first layer achieves an angle of reflection less than the critical angle of incidence $\theta_c$ relative to a normal with said second surface at the point of incidence, the $\theta_c$ being characteristic of the interface between said first layer and said second layer;

third layer means disposed adjacent said at least one second layer acting cooperatively with said first layer and said at least one second layer to control angular distribution of the light of said optical device and for outputting the light from said optical device after passing across said third layer means;

converting means for changing light of the second polarization to the first polarization state; and means for preferably outputting light of first polarization state relative to a second polarization state, said means for preferably outputting light able to reflect at least part of the light having the second polarization state.

75. The optical device as defined in claim 74 further including an imaging layer.

76. The optical device as defined in claim 75 wherein said imaging layer comprises at least one of a transparent display, a holographic image, an LCD layer and a CCD layer.

77. The optical device as defined in claim 74 wherein said converting means comprises a matching layer providing a light of a preferred polarization state.

78. The optical device as defined in claim 74 further including light diffuser means for diffusing light output from said base layer and broadening the light over an angular range for the viewer.

79. An optical device for operating on light from a source and for selectively outputting light to a viewer, comprising:

a base layer having an optical index of refraction $n_1$ and a first and second surface, said base layer further including a back surface spanning said first and second surfaces, and the light exiting said base layer when the light being reflected therein decreases its angle relative to a normal to at least one of said first and second surfaces at the point of light incidence and achieves an angle of incidence less than a critical angle $\theta_c$ relative to the normal at the point of light incidence on said surfaces;

first layer means of index of refraction $n_2$ disposed beyond at least one of said first and second surfaces relative to said base layer and for enabling light to enter and pass across said first layer means after output from said base layer when the light in said base layer achieves the angle of incidence less than the critical angle $\theta_c$ characteristic of an interface between said base layer and said first layer, said first layer means outputting substantially collimated light;

a light redirecting layer disposed adjacent said first layer means receiving said collimated light output from said base layer with said light redirecting layer having facets with faceted face portions, each of said faceted portions being at least partly illuminated by the light and being oriented spatially to redirect the light along a selected direction in cooperation with said first layer means and said base layer;

second layer means for preferably outputting light of a first polarization state compared to a second polarization state, said second layer means disposed beyond at least one of said first and second surfaces relative to said base layer and said second layer means further enabling reflection of at least part of the light having the second polarization state; and light control layer means for at least one of redirecting and diffusing light toward a viewer wherein the light has been output from said base layer and said light redirecting layer thereby providing light of controlled angular distribution to the viewer.

80. The optical device as defined in claim 79 further including converting means for changing light of the second polarization state to light of the first polarization state.

81. The optical device as defined in claim 80 wherein said converting means comprises a matching layer providing light of a preferred polarization state.

82. The optical device as defined in claim 79 further including an imaging layer.

* * * * *

UNITED STATES PATENT AND TRADEMARK OFFICE
CERTIFICATE OF CORRECTION

PATENT NO.: 5,594,830
DATED: January 14, 1997
INVENTOR(S): Roland Winston, Robert L. Holman, Benjamin A. Jacobson, Robert M. Emmons It is certified that error appears in the above-identified patent and that said Letters Patent is hereby corrected as shown below:

Column 44, claim 5, line 4, delete "then" and insert therefore --than--.

Column 45, claim 17, line 10, delete "nominal" and insert therefore --normal--.

Column 46, claim 24, line 3, delete "then" and insert therefore --than--.

Column 48, claim 43, line 5, insert "from" before the word "said".

Column 49, claim 56, line 4, delete "then" and insert therefore --than--.

Column 49, claim 58, line 8, delete "nominal" and insert therefore --normal--.

Column 50, claim 58, line 33, delete "convening" and insert therefore --converting--.

Column 50, claim 59, line 4, delete "then" and insert therefore --than--.

Signed and Sealed this

Twenty-fifth Day of November, 1997

Attest:

BRUCE LEHMAN

Attesting Officer

Commissioner of Patents and Trademarks